(12) United States Patent  (10) Patent No.: US 8,018,616 B2
Kadota  (45) Date of Patent: Sep. 13, 2011

(54) DEVICE INFORMATION MANAGEMENT SYSTEM

(75) Inventor: Masatoshi Kadota, Takahama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 12/801,863

(22) Filed: Jun. 29, 2010

(65) Prior Publication Data

US 2010/0271663 A1 Oct. 28, 2010

Related U.S. Application Data

(62) Division of application No. 10/840,743, filed on May 7, 2004, now Pat. No. 7,773,248.

(30) Foreign Application Priority Data

| Sep. 30, 2003 | (JP) | 2003-339672 |
| Nov. 28, 2003 | (JP) | 2003-399688 |
| Dec. 26, 2003 | (JP) | 2003-434236 |
| Jan. 8, 2004 | (JP) | 2004-003244 |

(51) Int. Cl.
*G06F 3/12* (2006.01)
(52) U.S. Cl. ...... 358/1.15; 358/1.13; 358/1.14; 358/1.16; 709/218; 709/219; 709/221; 709/224
(58) Field of Classification Search .......... None
See application file for complete search history.

(56) References Cited

U.S. PATENT DOCUMENTS

| 4,688,108 A | 8/1987 | Cotton et al. |
| 5,287,194 A | 2/1994 | Lobiondo |
| 5,627,658 A | 5/1997 | Connors et al. |
| 5,898,823 A * | 4/1999 | Sorkin et al. ........... 358/1.15 |
| 5,943,503 A * | 8/1999 | Kai ................. 708/833 |
| 6,055,361 A | 4/2000 | Fujita et al. |
| 6,219,148 B1 | 4/2001 | Takashima |
| 6,219,151 B1 | 4/2001 | Manglapus et al. |
| 6,353,484 B1 | 3/2002 | Takashima |
| 6,453,268 B1 | 9/2002 | Carney et al. |
| 6,502,132 B1 * | 12/2002 | Kumano et al. ........... 709/224 |
| 6,559,965 B1 | 5/2003 | Simpson et al. |
| 6,636,891 B1 | 10/2003 | LeClair et al. |
| 6,734,985 B1 * | 5/2004 | Ochiai ............ 358/1.15 |
| 6,862,100 B2 | 3/2005 | Harada |
| 6,970,923 B1 * | 11/2005 | Mukaiyama et al. ........ 709/223 |
| 7,058,705 B1 * | 6/2006 | Fukasawa et al. ......... 709/223 |
| 7,102,771 B2 * | 9/2006 | Lewis et al. ........... 358/1.14 |

(Continued)

FOREIGN PATENT DOCUMENTS

JP A-2-184876 7/1990

(Continued)

*Primary Examiner* — Chan S Park
*Assistant Examiner* — Dung Tran
(74) *Attorney, Agent, or Firm* — Oliff & Berridge, PLC

(57) ABSTRACT

A device information management system has a plurality of managed computers connected with devices. Device information of each device is to be transmitted to a requestor upon request thereby. That is, each of the plurality of managed computers has a data spooler that adds jobs in a data queue. The jobs in the data queue is transmitted to the device one by one. An information requesting system transmits a request command that requests a device to return the device information when the number of jobs in the data queue is equal to or less than a predetermined value. Then, an information receiving system receives the device information returned from the device, which is stored in the storage. The stored device information is transmitted to the requestor in response to inquiry therefrom.

10 Claims, 29 Drawing Sheets

U.S. PATENT DOCUMENTS

| | | | |
|---|---|---|---|
| 7,106,472 B2 | 9/2006 | Gomez et al. | |
| 7,110,130 B2 * | 9/2006 | Moriyama et al. | 358/1.15 |
| 7,126,709 B2 * | 10/2006 | Moriyama et al. | 358/1.15 |
| 7,167,930 B2 | 1/2007 | Reilly | |
| 7,280,243 B2 * | 10/2007 | Kai | 358/1.15 |
| 7,382,477 B2 | 6/2008 | Wanda | |
| 7,440,706 B2 | 10/2008 | Moriyama et al. | |
| 7,454,482 B2 * | 11/2008 | Barnard et al. | 709/220 |
| 7,502,130 B2 | 3/2009 | Harada | |
| 7,518,746 B2 | 4/2009 | Leiman et al. | |
| 7,752,290 B2 * | 7/2010 | Ebata | 709/222 |
| 2002/0138612 A1 * | 9/2002 | Sekizawa | 709/224 |
| 2002/0171864 A1 | 11/2002 | Sesek | |
| 2003/0131072 A1 * | 7/2003 | Kobayashi | 709/218 |
| 2004/0190967 A1 | 9/2004 | Mizuno et al. | |
| 2004/0218936 A1 | 11/2004 | Dougherty et al. | |

FOREIGN PATENT DOCUMENTS

| | | |
|---|---|---|
| JP | A-7-175613 | 7/1995 |
| JP | A-9-6555 | 1/1997 |
| JP | A-9-190306 | 7/1997 |
| JP | A 09-244827 | 9/1997 |
| JP | A 11-338652 | 12/1999 |
| JP | A-2000-163330 | 6/2000 |
| JP | A 2000-293324 | 10/2000 |
| JP | A 2001-256166 | 9/2001 |
| JP | A 2002-229751 | 8/2002 |
| JP | A-2002-278735 | 9/2002 |
| JP | A-2002-312265 | 10/2002 |
| JP | A-2003-223294 | 8/2003 |
| JP | A-2003-285507 A | 10/2003 |

* cited by examiner

| ID=N – 1 | PRIORITY=1 |
| ID=N – 2 | PRIORITY=10 |
| ID=N – 3 | PRIORITY=5 |

|  | COMMANDO | KEY | LABEL |
|---|---|---|---|
| Device1 ¥Decice2 | INFO | PAGES | Pages |
| * − Device1 ¥Decice2 | INFO | PAGECOUNT | Pages |
| * | INFO | DRUMLIFE | Drum Life |
| * | DINQUIRE | JAMCOUNT | Jam count |
| ... | ... | ... | ... |
| ... | ... | ... | ... |

|  |  |  |  |
|---|---|---|---|
| Device1 | LPT1 | Page | 2098 |
| Device1 | LPT1 | Drum Life | 4039 |
| Device1 | LPT1 | Jam count | 29 |
| ... | ... | ... | ... |
| Device2 | USB001 | Page | 186 |
| Device2 | USB001 | Drum Life | 3305 |
| Device2 | USB001 | Jam count | 16 |
| ... | ... | ... | ... |
|  | USB002 | 1284ID ERROR |  |
| Device3 | USB003 | PE ERROR |  |
|  | USB004 | Not connect |  |
| Device4 | USB005 | NotResponse |  |

FIG.33

```
PC1
Device1 on LPT1
Page=2098
Drum Life=4039

Device2 on USB001
Page=186
⋮

PC2
Device1 on LPT1
Page=4456
Drum Life=2399

Device2 on USB001
⋮
```

FIG.34

| Page | Exchange the drum of %s connected to %s, and exchange the toner |
|---|---|
| Drum Life | Exchange the drum of %s connected to %s |
| Jam count | Put through a cleaning paper in %s connected to %s |
|  | ······ |

DEVICE INFORMATION MANAGEMENT SYSTEM

This is a Division of application Ser. No. 10/840,743 filed May 7, 2004, which claims priority to Japanese Patent Application No. 2003-339672 filed Sep. 30, 2003, Japanese Patent Application No. 2003-339688 filed Nov. 28, 2003, Japanese Patent Application No. 2003-434236 filed Dec. 26, 2003, and Japanese Patent Application No. 2004-003244 filed Jan. 8, 2001. The disclosure of the prior applications is hereby incorporated by reference herein in its entirety.

BACKGROUND OF THE INVENTION

The present invention relates to a device information management system, and particularly to such a system for managing devices connected to a network.

Conventionally, there has been known a program called as a status monitor, which is executed on a computer to investigate and/or manage the status (e.g., on-line/off-line, busy, error, etc.) of each device (e.g., a printer or an MFP (multi-function peripheral) having a printer function connected to the computer. There has also been known a program called as a maintenance tool, which is executed on a computer to manage maintenance information (e.g., remaining amount of toner or ink, remaining amount of a recording sheet, a term for exchanging a photosensitive drum, etc.) of an imaging device connected to the computer.

The conventional status monitor and maintenance tool have been executed locally. Recently, however, a plurality of computers are interconnected through a network, and therefore, it is desirable that the status and/or maintenance information of devices connected to respective computers are managed at a particular computer (e.g., one used by a system administrator).

In response to the above-described desire, a central management system has been suggested in Japanese Patent Provisional Publication No. P2000-293324A. In this publication, each computer on a network obtains status/maintenance information of a locally connected printer, and transmits the thus obtained information to another computer connected to the network.

Specifically, according to the publication, an operational status of an imaging device is monitored, and when the operational status is changed, the changed status is obtained, and is transmitted to another computer which is connected to the network. Such a procedure is called as a trapping procedure in the publication. The publication also provides a response to request procedure which obtains the status of the imaging device immediately when a request for such information is received from another computer through the network, and provides the obtained status information to the computer which has issued the request.

In the conventional information management system as exemplified above, the computer attempts to obtain the latest status/maintenance information from the local imaging device when the trapping procedure or the request procedure is executed. According to such a system, if the response is not provided by the imaging device, the computer is unable to transmit the information immediately. That is, due to the delay of the response form the imaging device, transmission of the information from a requested computer to a requesting computer is delayed.

Specifically, for obtaining information from the imaging device, a method of transmitting a command described using a PJL (Printer Job Language) to the imaging device, and reading back (receiving) the information transmitted by the imaging device in response to the PJL command has been known.

According to the above method, the PJL command is treated as a printing job in the imaging device. That is, the PJL command is added to a print data queue, and then processed as one of a plurality of printing jobs in the print data queue. Therefore, if a relatively large number of printing jobs have already been included in the print data queue or a relatively large number of print jobs have previously been added in the print data queue, the PJL command will not be processed until all the print jobs are processed. In such a case, the response to the PJL command will not be transmitted from the imaging device to the computer immediately, and the information will not be provided immediately.

For another example, due to running out of the recording sheet, the imaging device may turn to a busy status. In such a case, the print jobs in the print queue cannot be processed, and thus, the PJL command will not processed either. Also in this case, the response to the PJL command will not be transmitted from the imaging device to the computer, and the information will not be provided to another computer immediately. Additionally, in such a case, the PJL command remains in the print data queue as one of the print jobs. If the user of the printer (or the computer to which the printer is connected) does not know the reason why the PJL command was issued, the user may consider that an unknown print job is included in the print data queue. In such a situation, the user may not determine whether the job (PJL command) should be remained or deleted. In particular, since a computer virus may generate such a job, the unknown job remained in the queue causes an uneasy feeling to the user.

As indicated, according to the conventional method, in some cases, the response from the imaging device may not be obtained for a relatively long period, and in such a case, transmission of the information of the imaging device may not be done immediately.

Further, the conventional system may cause problem since a print job that cannot be recognized by the user may be added and remained in the print data queue.

SUMMARY OF THE INVENTION

The present invention is advantageous in that information of a device can be provided immediately to a requesting station.

According to an aspect of the invention, there is provided a device information management system having a plurality of managed computers each of which is connected with at least one device, device information of each of the at least one device being transmitted to a requestor upon request thereby. Each of the plurality of managed computers has a data spooler that adds data jobs in a data queue, the jobs in the data queue being transmitted to the at least one device one by one, a storage that stores device information, an information requesting system that transmits a request command to a device requesting to return the device information when the number of jobs in the data queue is equal to or less than a predetermined value, an information receiving system that receives the device information returned from the at least one device in response to the request command, the device information returned from the at least one device being stored in the storage, and an information providing system that provides the device information stored in the storage to the requestor.

Optionally, the information requesting system may transmit the request command to the device when the number of the jobs in the data queue becomes zero.

Further optionally, the information requesting system may be configured to check the number of the jobs currently output to the at least one device and determines the number of the jobs in the queue when the currently output job is finished, and the information requesting system may be configured to transmit the request command to the device when the number of the jobs in the data queue is determined to be equal to or less than a prescribed value. In a particular case, the value is zero.

Still optionally, the information requesting system may transmit the request command to the device when current time coincides with a predetermined time.

Further optionally, the requestor may include client software running on another computer that can execute data communication with each of the managed computers through a network.

Furthermore, the requestor may include client software running on one of (a) each of the managed computers, and (b) another computer that can execute data communication with each of the managed computers through a network.

In a particular case, the at least one device includes at least one imaging device having a printer function, the data spooler including a print spooler, the jobs including print jobs, the data queue including print data queue, and the request command is a PJL command.

Still optionally, the information requesting system may be configured to transmits the request command to the device at a predetermined first time point, and the requestor may request the managed computers to provide the device information to the requestor at a second time point which is later than the first time point.

According to another aspect of the invention, there is provided a device information management system that employs a plurality of managed computers, each managed computer being connected with at least one device, device information of each of the at least one device being transmitted to a requestor upon request thereby, and each of the plurality of managed computers may be configured to include a data spooler that adds jobs in a data queue, the jobs in the data queue being transmitted to the at least one device one by one, a storage that stores device information, a status determining system that determines whether the device information can be obtained from the device immediately, an information requesting system that transmits a request command to a device requesting to return the device information when the status determining system determines that the device information can be obtained immediately, an information receiving system that receives the data information returned from the at least one device in response to the request command, the device information returned from the at least one device being stored in the storage and an information providing system that provides the device information stored in the storage to the requestor.

According to a further aspect of the invention, there is provide a computer program product for a device information management system having a plurality of managed computers each of which is connected with at least one device, device information of each of the at least one device being transmitted to a requestor upon request thereby, the computer program product comprising computer readable instructions that cause each of the plurality of managed computers to add jobs in a data queue, the jobs in the data queue being transmitted to the at least one device one by one, to transmit a request command that requests a device to return the device information when the number of data jobs in the data queue is equal to or less than a predetermined value, to receive the data information returned from the at least one device in response to the request command, the device information returned from the at least one device being stored in a storage, and to provide the device information stored in the storage to the requestor.

According to a further aspect of the invention, there is provided with a computer program product for a device information management system having a plurality of managed computers each of which is connected with at least one device, device information of each of the at least one device being transmitted to a requestor upon request thereby, the computer program product comprising computer readable instructions that cause each of the plurality of managed computers to add jobs in a data queue, the data jobs in the data queue being transmitted to the at least one device one by one, to determine whether the device information can be obtained from the device immediately, to transmit a request command to a device requesting to return the device information when the device information can be obtained immediately, to receive the data information returned from the at least one device in response to the request command, the device information returned from the at least one device being stored in a storage, and to provide the device information stored in the storage to the requestor.

According to another aspect of the invention, there is p device information management system that employs a plurality of managed computers, each managed computer being connected with at least one device, device information of each of the at least one device being transmitted to a requestor upon request thereby. Each of the plurality of managed computers are configured to include a data spooler that adds jobs in a data queue, each of the jobs in the data queue being transmitted to the at least one device one by one through an input/output interface, a status determining system that determines whether when an additional job can be transmitted to the device immediately when the additional job is added to the data queue, an information requesting system that add the additional job including a request command that requests a device to return the device information when the status determining system determines that the additional job can be transmitted to the at least one device immediately, an information receiving system that receives the data information returned from the at least one device in response to the request command, the device information returned from the at least one device being stored in the storage, and an information providing system that provides the device information stored in the storage to the requestor.

The device information may be information regarding exchange of exchangeable parts of the at least one device, information regarding consumed amount of consumable parts of the at least one device and/or information regarding the number of occurrences of error of the at least one device.

Optionally, the status determining system may determine that the data spooler is capable of transmitting the additional job immediately when at least a first condition is satisfied, the first condition being satisfied one of (a) when a status of the input/output interface represents that data communication can be performed and (b) when a status of the input/output interface does not represent that the data communication cannot be performed.

According to a further aspect of the invention, there if pro device information management system that employs a plurality of managed computers, each managed computer being connected with at least one device, device information of each of the at least one device being transmitted to a requestor upon request thereby. Each of the plurality of managed computers may be configured to include a data spooler that adds data jobs in a data queue, the data jobs in the data queue being transmitted to the at least one device one by one through an input/output interface, an information requesting system that adds a request command that requests a device to return the device information to the data queue as additional job, an output checking system that determines whether the data spooler has completed transmission of the additional data job to the at least one device when a predetermined first period has elapsed since the information requesting system added the request command to the data queue, an information receiving system that receives the data information returned from the at least one device in response to the request command when the output checking system determined that the data spooler had completed transmission of the additional data job to the at least one device, and a job deleting system that deletes the additional job when the output checking system determined that the data spooler has not completed transmission of the additional job.

Optionally, the jobs may respectively have job IDs which are assigned by the data spooler. Further, the output checking system may include a job detecting system that determines whether the job subject to be checked remains in the data queue based on the job ID assigned to the checked job, and an output completion determining system that determines that the data spooler has completed transmission of the command to the at least one device when the job detecting system detects that the job subject to be checked does not remain in the data queue.

Optionally, when the request command cannot be transmitted to the at least one device through the input/output interface, the first period is shorter than a second period during which the input/output interface is to detect a timeout of data communication.

The device information management system may further include a retry control system that controls the information requesting system to add the request command to the data spooler after the job deleting system deleted the additional job.

According to another aspect of the invention, there is provided a device information management system that employs a plurality of managed computers, each managed computer being connected with at least one device, device information of each of the at least one device being transmitted to a requestor upon request thereby. Each of the plurality of managed computers may be configured to include a data spooler that adds jobs in a data queue, the jobs in the data queue being transmitted to the at least one device one by one through an input/output interface, a command processing system that processes a plurality of commands respectively requesting the at least one device to provide a plurality of pieces of device information, the command processing system processing the plurality of commands one after another by executing repetitive processes, the number of the repetitive processes being equal to the number of the plurality of commands, an information requesting system that provides a currently processed command to the data spooler as an additional job which is added to the data queue, an output checking system that determines whether the data spooler has completed transmission of the additional job to the at least one device when a predetermined first period has elapsed since the information requesting system added the request command to the data queue, an information receiving system that receives the data information returned from the at least one device in response to the request command when the output checking system determined that the data spooler had completed transmission of the additional job to the at least one device, and a job deleting system that terminates the repetitive processes executed by the command processing system when the output checking system determined that the data spooler has not completed transmission of the additional job.

The device information management system may further include a deleting system that deletes the additional job including the command currently processed from the data queue when the output checking system determines that the data spooler has not completed transmission of the additional job, a retry control system that controls the information requesting system to add the additional job including the command subject to be processed after the deleting system deleted the additional job, an error notifying system that notifies occurrence of an error when the additional job including the command subject to be processed is added by the information requesting system and is deleted by the deleting system by a predetermined times, an instruction input system that allows a user to input an instruction which instructs whether the processing of the commands is to be terminated, and a control system that control the command processing system to terminate the repetitive processes when the user input, through the instruction input system, the instruction to stop the processing of the commands.

According to a furthermore aspect of the invention, there is provided a computer connected with at least one device, the device retrieving device information from the at least one device, the device information being managed on the device. Further, the computer may include a data spooler that adds jobs in a data queue, the jobs in the data queue being transmitted to the at least one device one by one through an input/output interface, a status determining system that determines whether when an additional job can be transmitted to the device immediately when the additional job is added to the data queue, an information requesting system that add the additional job including a request command that requests a device to return the device information when the status determining system determines that the additional job can be transmitted to the at least one device immediately, and an information receiving system that receives the data information returned from the at least one device in response to the request command, the device information returned from the at least one device being stored in the storage.

According to another aspect of the invention, there is provided a computer connected with at least one device, the device retrieving device information from the at least one device, the device information being managed on the device. The computer may be configured to include a data spooler that adds jobs in a data queue, the jobs in the data queue being transmitted to the at least one device one by one through an input/output interface, an information requesting system that adds a request command that requests a device to return the device information to the data queue as additional job, an output checking system that determines whether the data spooler has completed transmission of the additional job to the at least one device when a predetermined first period has elapsed since the information requesting system added the request command to the data queue, an information receiving system that receives the data information returned from the at least one device in response to the request command when the output checking system determined that the data spooler had completed transmission of the additional job to the at least one device, and a data job deleting system that deletes the additional job when the output checking system determined that the data spooler has not completed transmission of the additional job.

A computer connected with at least one device, the device retrieving device information from the at least one device, the device information being managed on the device. Further, the computer may be configured to include a data spooler that adds jobs in a data queue, the jobs in the data queue being transmitted to the at least one device one by one through an input/output interface, a command processing system that processes a plurality of commands respectively requesting the at least one device to provide a plurality of pieces of device information, the command processing system processing the plurality of commands one after another by executing repetitive processes, the number of the repetitive processes being equal to the number of the plurality of commands, an information requesting system that provides a currently processed command to the data spooler as an additional job which is added to the data queue, an output checking system that determines whether the data spooler has completed transmission of the additional job to the at least one device when a predetermined first period has elapsed since the information requesting system added the request command to the data queue, an information receiving system that receives the data information returned from the at least one device in response to the request command when the output checking system determined that the data spooler had completed transmission of the additional job to the at least one device, and a job deleting system that terminates the repetitive processes executed by the command processing system when the output checking system determined that the data spooler has not completed transmission of the additional job.

According to another aspect of the invention, there is provided a computer program product for a device information management system that employs a plurality of managed computers, each managed computer being connected with at least one device, device information of each of the at least one device being transmitted to a requestor upon request thereby. Further, the computer program product comprises computer readable instructions that causes each of the plurality of managed computers to realize a data spooler that adds jobs in a data queue, the jobs in the data queue being transmitted to the at least one device one by one through an input/output interface, a status determining system that determines whether when an additional job can be transmitted to the device immediately when the additional job is added to the data queue, an information requesting system that add the additional job including a request command that requests a device to return the device information when the status determining system determines that the additional job can be transmitted to the at least one device immediately, an information receiving system that receives the data information returned from the at least one device in response to the request command, the device information returned from the at least one device being stored in the storage, and an information providing system that provides the device information stored in the storage to the requestor.

According to a further aspect of the invention, there is provided a computer program product for a device information management system that employs a plurality of managed computers, each managed computer being connected with at least one device, device information of each of the at least one device being transmitted to a requestor upon request thereby. The computer program product may include computer readable instructions that causes each of the plurality of managed computers to realize a data spooler that adds jobs in a data queue, the jobs in the data queue being transmitted to the at least one device one by one through an input/output interface, an information requesting system that adds a request command that requests a device to return the device information to the data queue as additional job, an output checking system that determines whether the data spooler has completed transmission of the additional job to the at least one device when a predetermined first period has elapsed since the information requesting system added the request command to the data queue, an information receiving system that receives the data information returned from the at least one device in response to the request command when the output checking system determined that the data spooler had completed transmission of the additional job to the at least one device, and a job deleting system that deletes the additional job when the output checking system determined that the data spooler has not completed transmission of the additional job.

According to a furthermore aspect of the invention, there is provided a computer program product for a device information management system that employs a plurality of managed computers, each managed computer being connected with at least one device, device information of each of the at least one device being transmitted to a requestor upon request thereby. The computer program product may include computer readable instructions that causes each of the plurality of managed computers to realize a data spooler that adds jobs in a data queue, the jobs in the data queue being transmitted to the at least one device one by one through an input/output interface, a command processing system that processes a plurality of commands respectively requesting the at least one device to provide a plurality of pieces of device information, the command processing system processing the plurality of commands one after another by executing repetitive processes, the number of the repetitive processes being equal to the number of the plurality of commands, an information requesting system that provides a currently processed command to the data spooler as an additional job which is added to the data queue, an output checking system that determines whether the data spooler has completed transmission of the additional job to the at least one device when a predetermined first period has elapsed since the information requesting system added the request command to the data queue, an information receiving system that receives the data information returned from the at least one device in response to the request command when the output checking system determined that the data spooler had completed transmission of the additional job to the at least one device, and a job deleting system that terminates the repetitive processes executed by the command processing system when the output checking system determined that the data spooler has not completed transmission of the additional job.

According to another aspect of the invention, there is provided a device information management system having a plurality of managed computers each of which is connected with at least one device, device information of each of the at least one device being transmitted to a requestor upon request thereby. Each of the plurality of managed computers may have a data spooler that adds jobs in a data queue, the jobs in the data queue being transmitted to the at least one device one by one, an information requesting system that adds an additional job to the data queue, the additional job including a request command that requests a device to return the device information, an order changing system that changes the order of the data jobs in the queue such that the additional job is processed earlier than the jobs previously stored in the data queue, an information receiving system that receives the data information returned from the at least one device in response to the request command, and an information providing system that provides the device information received by the information receiving system.

Optionally, the data jobs stored in the queue includes a first job which includes the request command, and second jobs which do not include the request commands and have been stored in the queue earlier than the first job, and the order changing system changes the order of the jobs such that the first job is processed earlier than the second jobs.

Further optionally, the data spooler may be configured to be capable of set priorities of arbitrarily designated jobs from among the jobs stored in the queue, the jobs having higher priorities being processed earlier than the jobs having lower priorities, and the order changing instructing system instructs the data spooler to lower the priority of the jobs which were added to the queue prior to the first job when the information requesting system requests the output of the device information.

According to a further aspect of the invention, there is provided a device information management system having a plurality of managed computers each of which is connected with at least one device, device information of each of the at least one device being transmitted to a requestor upon request thereby. Each of the plurality of managed computers may have a data spooler that adds jobs in a data queue, the jobs in the data queue being transmitted to the at least one device one by one, a data transmitting system interposed between the data spooler and the device to transmit data included in the data job to the printer, an information requesting system that request the device to output the device information by transmitting a request to the device not via the data spooler, the information requesting system being configured not to request the device to output the device information when the data transmitting system is transmitting data corresponding to a currently processed job, an information receiving system that receives the data information returned from the at least one device in response to the request command, and an information providing system that provides the device information received by the information receiving system.

Optionally, the computer may be configured to include an exclusive data providing system that provides exclusive data, the information requesting system and the data transmitting system being not able to obtaining the exclusive data simultaneously. Further, the information requesting system does not request the device to output the device information when the exclusive information is not received from the exclusive data providing system, and the data transmitting system starts transmitting the data when the exclusive data is received from the exclusive data providing system, and release the obtained exclusive data when the transmission of the data is completed.

According to a further aspect of the invention, there is provided a device information management system having a plurality of managed computers each of which is connected with at least one device, device information of each of the at least one device being transmitted to a requestor upon request thereby. Each of the plurality of managed computers have a data spooler that adds jobs in a data queue, the data jobs in the data queue being transmitted to the at least one device one by one, a data transmitting system interposed between the data spooler and the device to transmit data included in the job to the device, an information requesting system that requests the device to output the device information by transmitting a request to the device not via the data spooler, an information receiving system that receives the data information returned from the at least one device in response to the request command, the data transmitting system being configured not to transmit data to the device when the information requesting system requests the device to output the device information and the information receiving system receives the device information from the device, and an information providing system that provides the device information received by the information receiving system.

According to a further aspect of the invention, there is provided a computer program product for a device information management system having a plurality of managed computers each of which is connected with at least one device, device information of each of the at least one device being transmitted to a requestor upon request thereby. The computer program product includes computer readable instructions that causes each of the plurality of managed computers to realize a data spooler that adds jobs in a data queue, the jobs in the data queue being transmitted to the at least one device one by one, an information requesting system that adds an additional job to the data queue, the additional job including a request command that requests a device to return the device information, an order changing system that changes the order of the jobs in the data queue such that the additional job is processed earlier than the jobs previously stored in the data queue, an information receiving system that receives the device information returned from the at least one device in response to the request command, and an information providing system that provides the device information received by the information receiving system.

According to a furthermore aspect of the invention, there is provided computer program product for a device information management system having a plurality of managed computers each of which is connected with at least one device, device information of each of the at least one device being transmitted to a requestor upon request thereby. The computer program product includes computer readable instructions that causes each of the plurality of managed computers to realize a data spooler that adds jobs in a data queue, the jobs in the data queue being transmitted to the at least one device one by one, an information requesting system that adds an additional job to the data queue, the additional job including a request command that requests a device to return the device information, an order changing system that changes the order of the jobs in the queue such that the additional job is processed earlier than the jobs previously stored in the data queue, an information receiving system that receives the data information returned from the at least one device in response to the request command, and an information providing system that provides the device information received by the information receiving system.

According to an aspect of the invention, there is provided a computer program product for a device information management system having a plurality of managed computers each of which is connected with at least one device, device information of each of the at least one device being transmitted to a requestor upon request thereby. The computer program product may include computer readable instructions that causes each of the plurality of managed computers to realize a data spooler that adds jobs in a data queue, the jobs in the data queue being transmitted to the at least one device one by one, a data transmitting system interposed between the data spooler and the device to transmit data included in the job to the device, an information requesting system that request the device to output the device information by transmitting a request to the device not via the data spooler, the information requesting system being configured not to request the device to output the device information when the data transmitting system is transmitting data corresponding to a currently processed job, an information receiving system that receives the data information returned from the at least one device in response to the request command, and an information providing system that provides the device information received by the information receiving system.

Further provided is a device information management system including a plurality of computers and a plurality of devices connected to the computers. Each device includes a storage that stores device information intrinsic to the device, and an updating system that updates the device information in association with operation of the device. Further, each computer includes a recognition system that obtains information representing a type of the device from the device, and recognizes the type of the device, a command selecting system that selects at least one command corresponding to the type of the device recognized by the recognition system from among a plurality of commands, an information requesting system that requests the device, by transmitting the selected command, to provide the device information, and an information receiving system that receives the device information which is a response to the command transmitted by the information requesting system.

Optionally, the computer may be configured to include a command storing system that stores the plurality of commands in relation with responsive type information indicative of device types that can respond to respective commands, and the command selecting system may select commands which are related to the device type recognized by the recognition system from among the plurality of commands stored in the command storing system referring to the responsive type information stores in the command storing system.

Further optionally, the computer may include a command storing system that stores the plurality of commands in relation with irresponsive type information indicative of device types that cannot respond to respective commands, and the command selecting system may select commands which are related to the device type recognized by the recognition system from among the plurality of commands stored in the command storing system referring to the irresponsive type information stores in the command storing system.

According to a further aspect of the invention, there is provided a device information management system including a plurality of computers and a plurality of devices connected to the computers. Each device includes a storage that stores device information intrinsic to the device and an updating system that updates the device information in association with operation of the device. Further, each computer includes a recognition system that obtains information representing a type of the device from the device, and recognizes the type of the device, an information requesting system that requests the device, by transmitting a request command, to provide the device information, an information receiving system that receives the device information which is a response to the command transmitted by the information requesting system, and a device information storing system that stores the information representing the device type obtained by the recognition system, information representing an input/output interface used for connecting the computer and the device, and the device information obtained by the information receiving system in relation with each other.

Optionally, the device information management system may further include an access error information storing system which stores, when the recognition system is unable to access the device, information indicating that the access was failed and information indicative of the input/output interface used for connection between the computer and the device, in relation with each other.

Still optionally, the device information management system may be configured to further include a transmission error information storing system which stores, when the information requesting system is unable to transmit the command to the device, information indicating that the transmission was failed and information indicative of the input/output interface used for connection between the computer and the device, in relation with each other.

Further optionally, the device information management system may include a receiving error information storing system which stores, when the information receiving system is unable to receive the reply from the device, information indicating that the reception of the reply was failed and information indicative of the input/output interface used for connection between the computer and the device, in relation with each other.

According to another aspect of the invention, there is provided a computer to which a device is connected, the device having a storage that stores device information intrinsic to the device and an updating system that updates the device information in association with operation of the device, the computer is for executing a procedure to obtain device information from the device. The computer may include a recognition system that obtains information representing a type of the device from the device, and recognizes the type of the device, a command selecting system that selects at least one command corresponding to the type of the device recognized by the recognition system from among a plurality of commands, an information requesting system that requests the device, by transmitting the selected command, to provide the device information, and an information receiving system that receives the device information which is a response to the command transmitted by the information requesting system.

According to a further aspect of the invention, the computer may include a recognition system that obtains information representing a type of the device from the device, and recognizes the type of the device, an information requesting system that requests the device, by transmitting a request command, to provide the device information, an information receiving system that receives the device information which is a response to the command transmitted by the information requesting system, and a device information storing system that stores the information representing the device type obtained by the recognition system, information representing an input/output interface used for connecting the computer and the device, and the device information obtained by the information receiving system in relation with each other.

According to a furthermore aspect of the invention, there is provided a computer program product for a device information management system including a plurality of computers and a plurality of devices connected to the computers, each device including a storage that stores device information intrinsic to the device, and an updating system that updates the device information in association with operation of the device. The computer program product includes computer readable instructions which cause each computer to realize a recognition system that obtains information representing a type of the device from the device, and recognizes the type of the device, a command selecting system that selects at least one command corresponding to the type of the device recognized by the recognition system from among a plurality of commands, an information requesting system that requests the device, by transmitting the selected command, to provide the device information, and an information receiving system that receives the device information which is a response to the command transmitted by the information requesting system.

According to another aspect of the invention, there is provided a computer program product for a device information management system including a plurality of computers and a plurality of devices connected to the computers, each device including a storage that stores device information intrinsic to the device, and an updating system that updates the device information in association with operation of the device. The computer program product includes computer readable instructions which cause each computer to realize a recognition system that obtains information representing a type of the device from the device, and recognizes the type of the device, an information requesting system that requests the device, by transmitting a request command, to provide the device information, an information receiving system that receives the device information which is a response to the command transmitted by the information requesting system, and a device information storing system that stores the information representing the device type obtained by the recognition system, information representing an input/output interface used for connecting the computer and the device, and the device information obtained by the information receiving system in relation with each other.

BRIEF DESCRIPTION OF THE ACCOMPANYING DRAWINGS

Figure 15A:
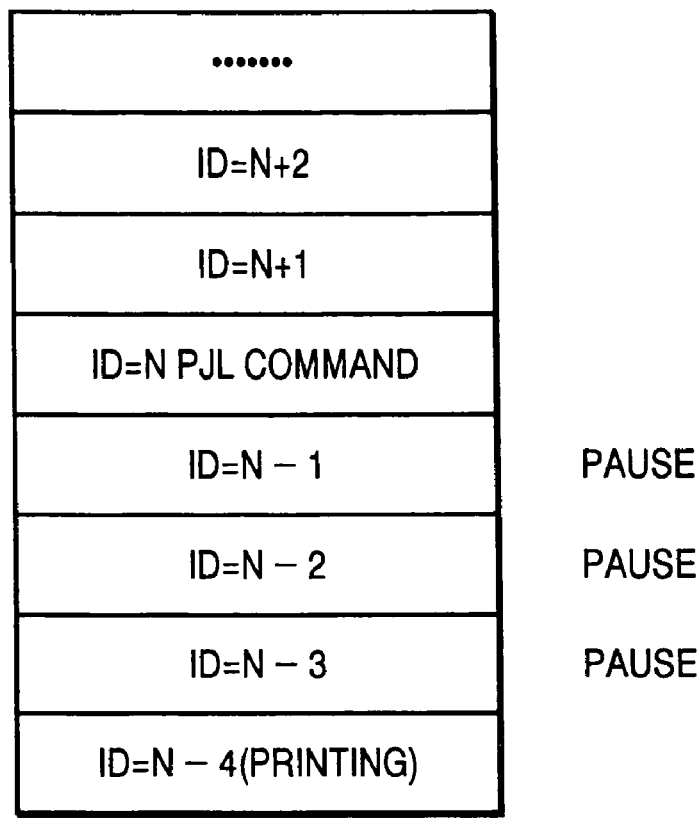
Figure 15B:
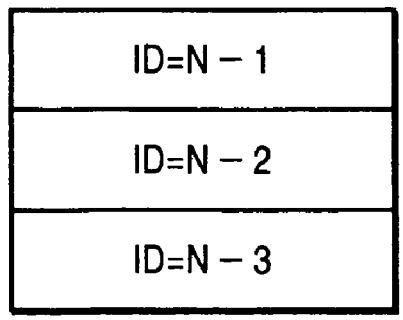
Figure 16:
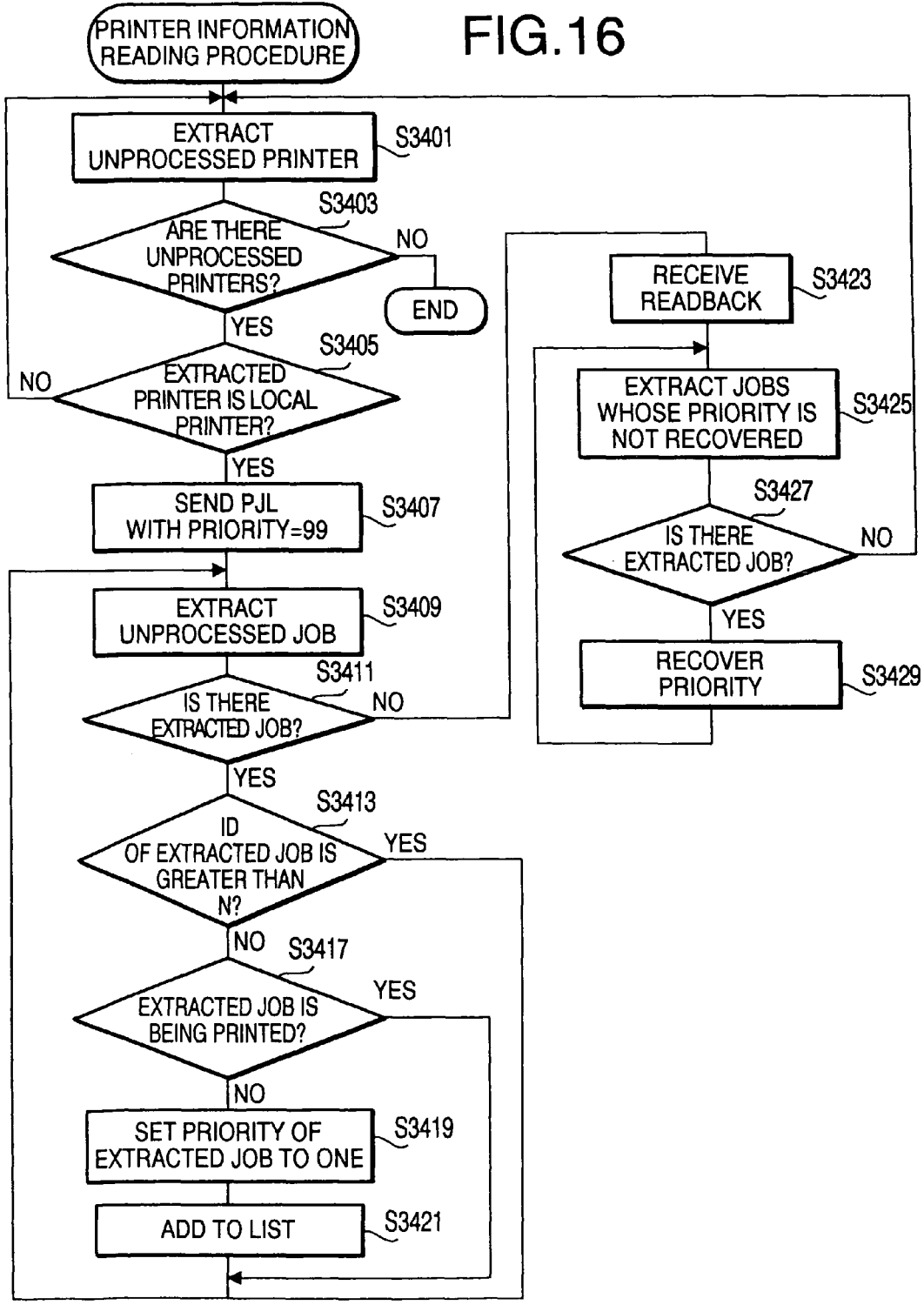
Figures 17A, 17B:
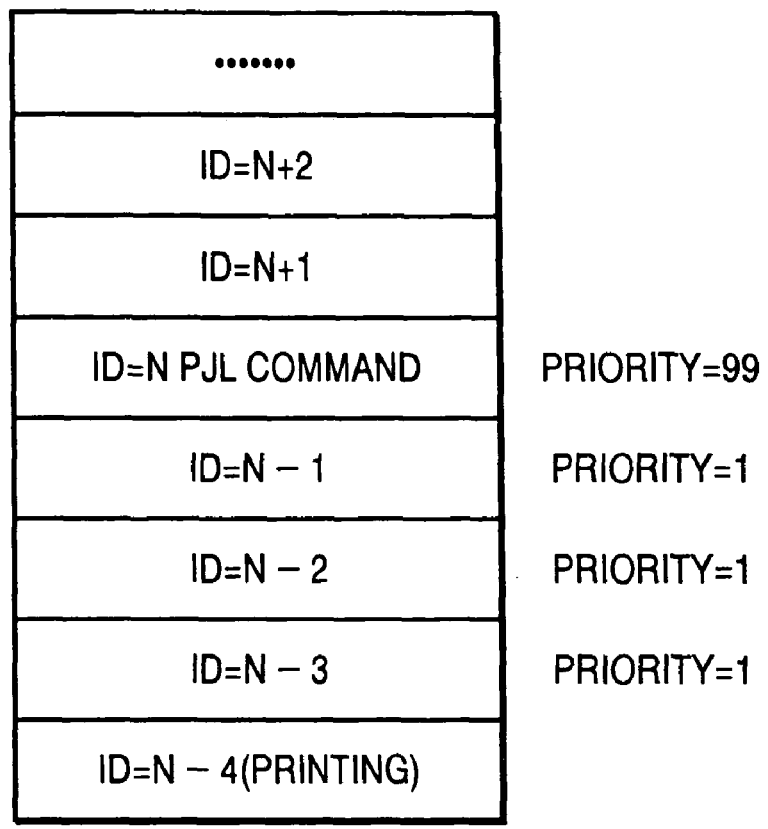
Figure 18:
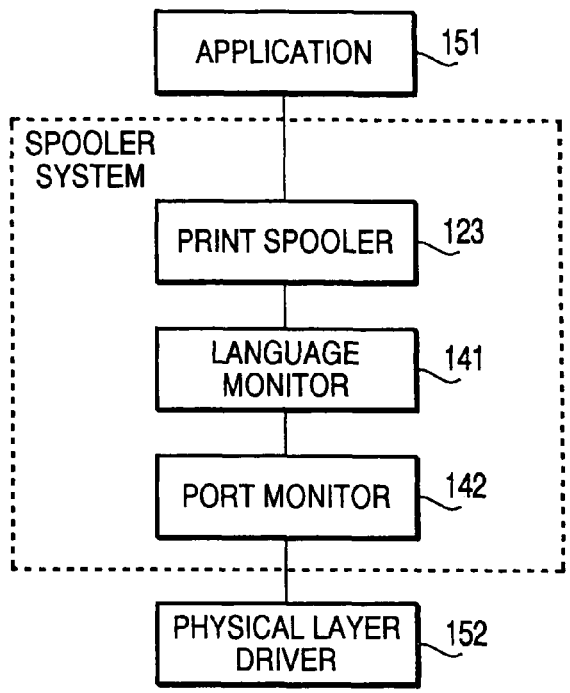
Figure 19:
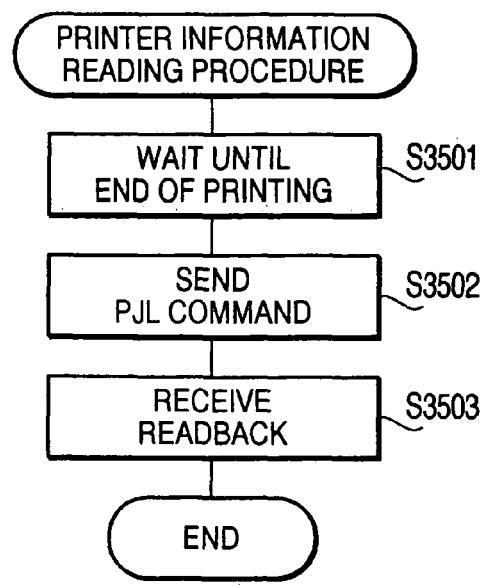
Figure 20:
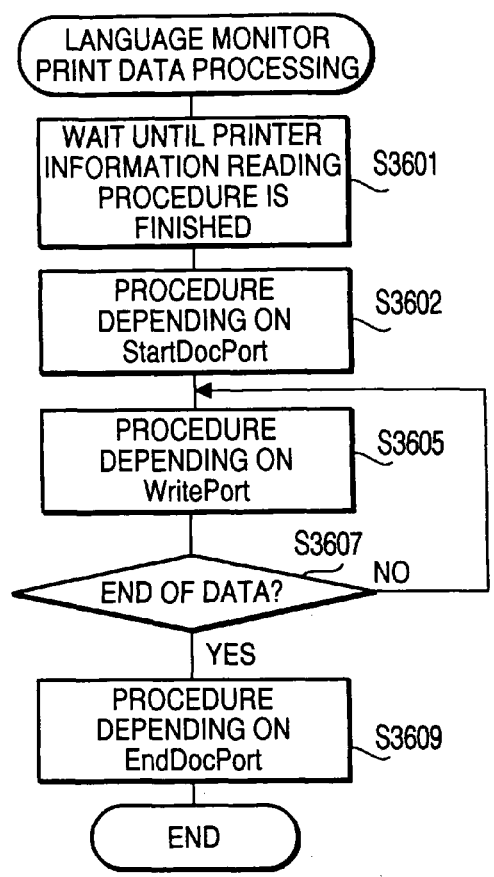
Figure 21A:
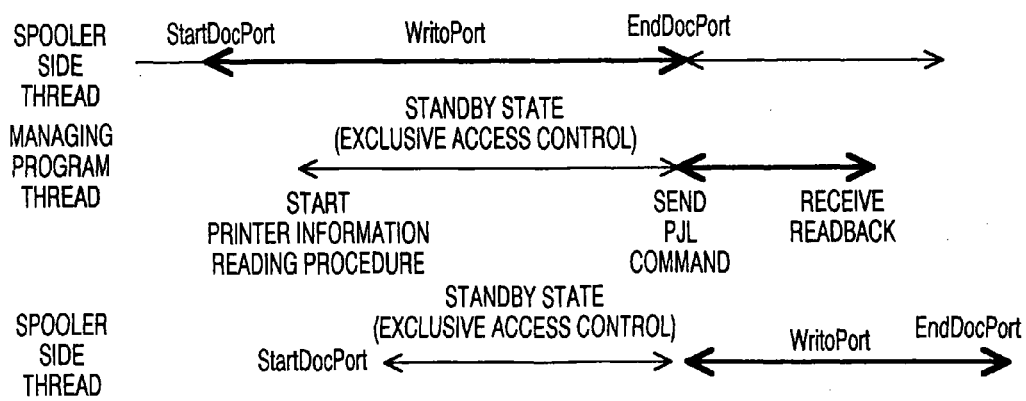
Figure 21B:
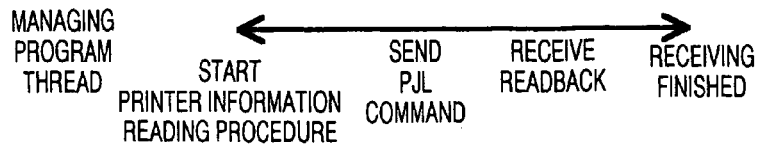
Figure 22:
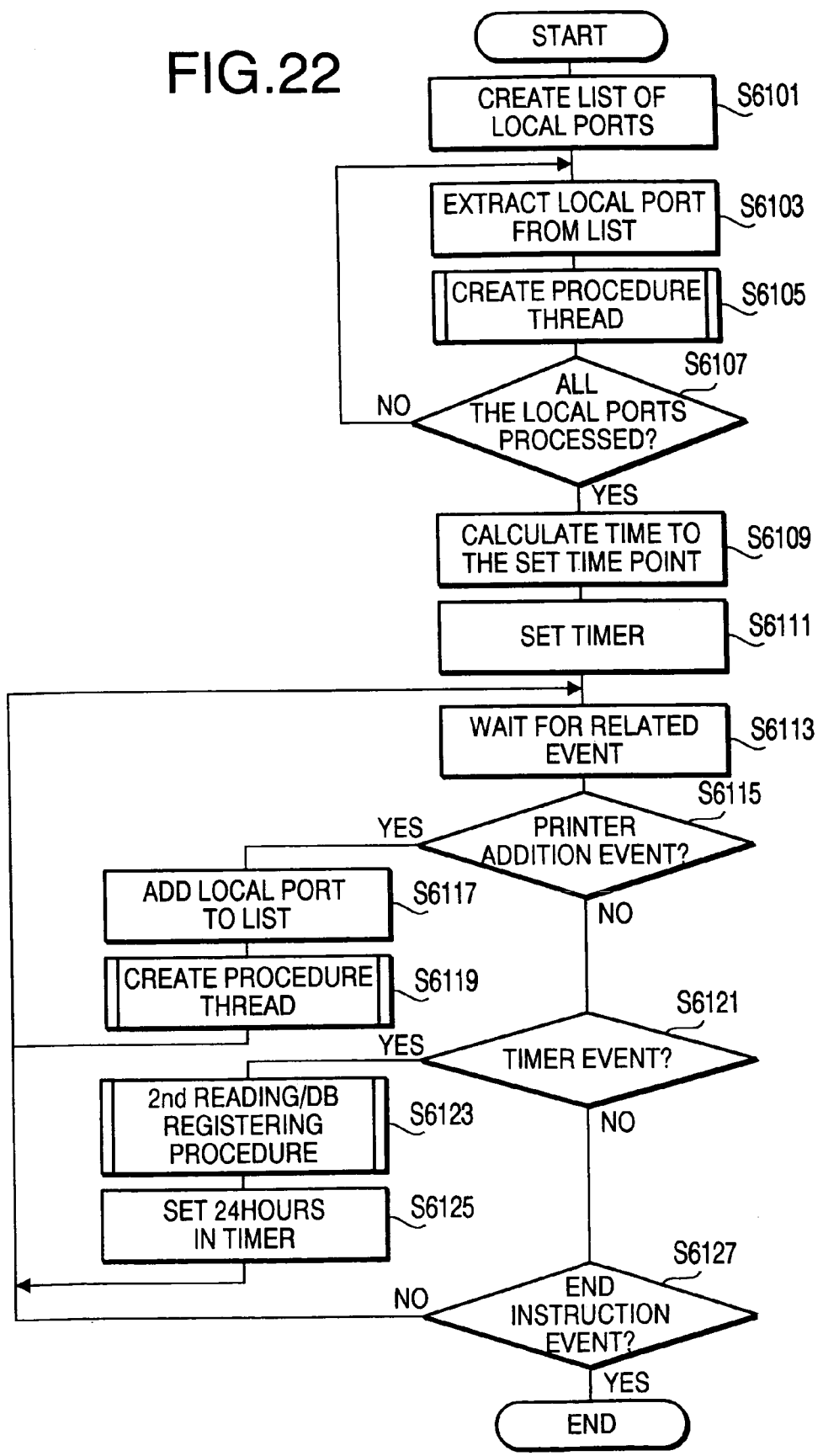
Figure 23:
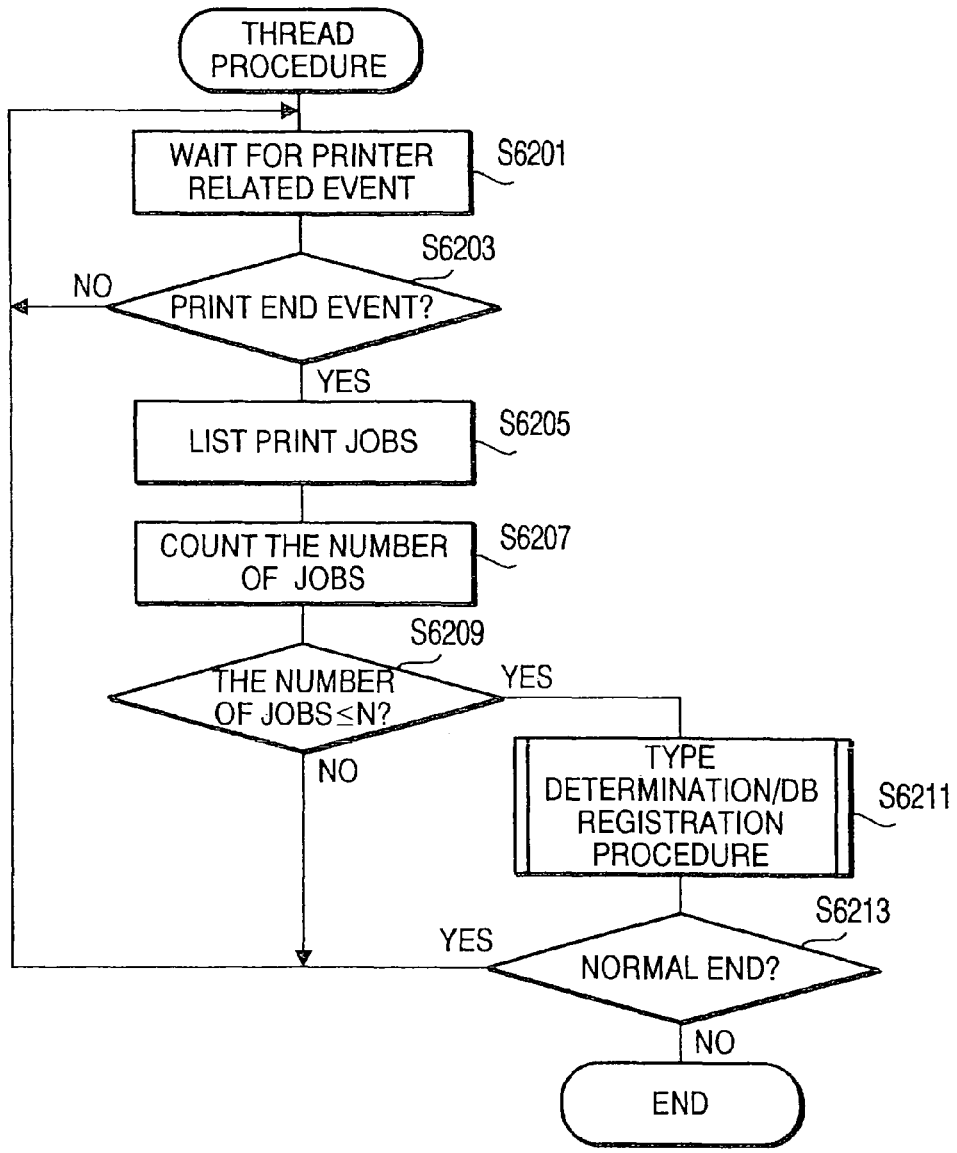
Figure 24:
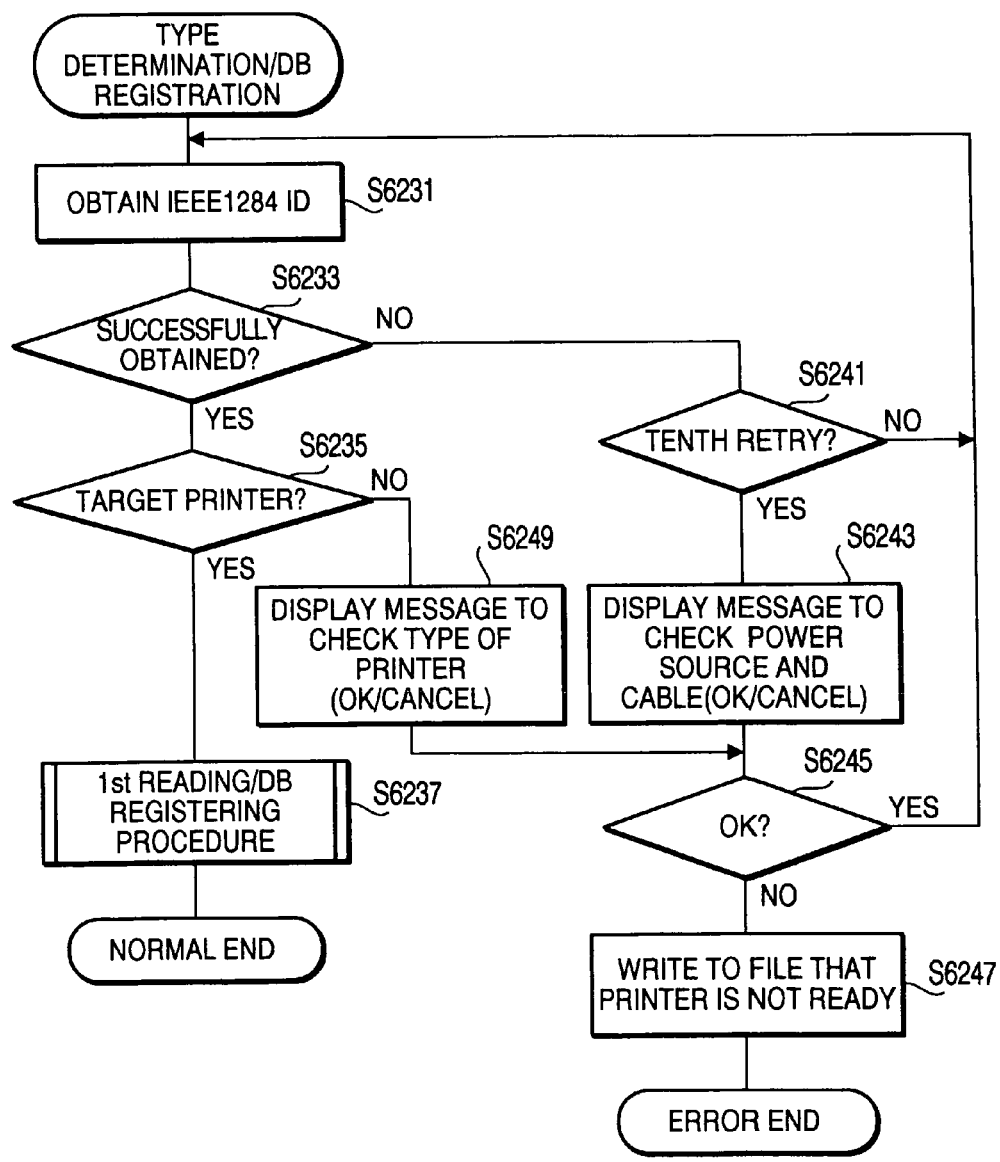
Figure 25:
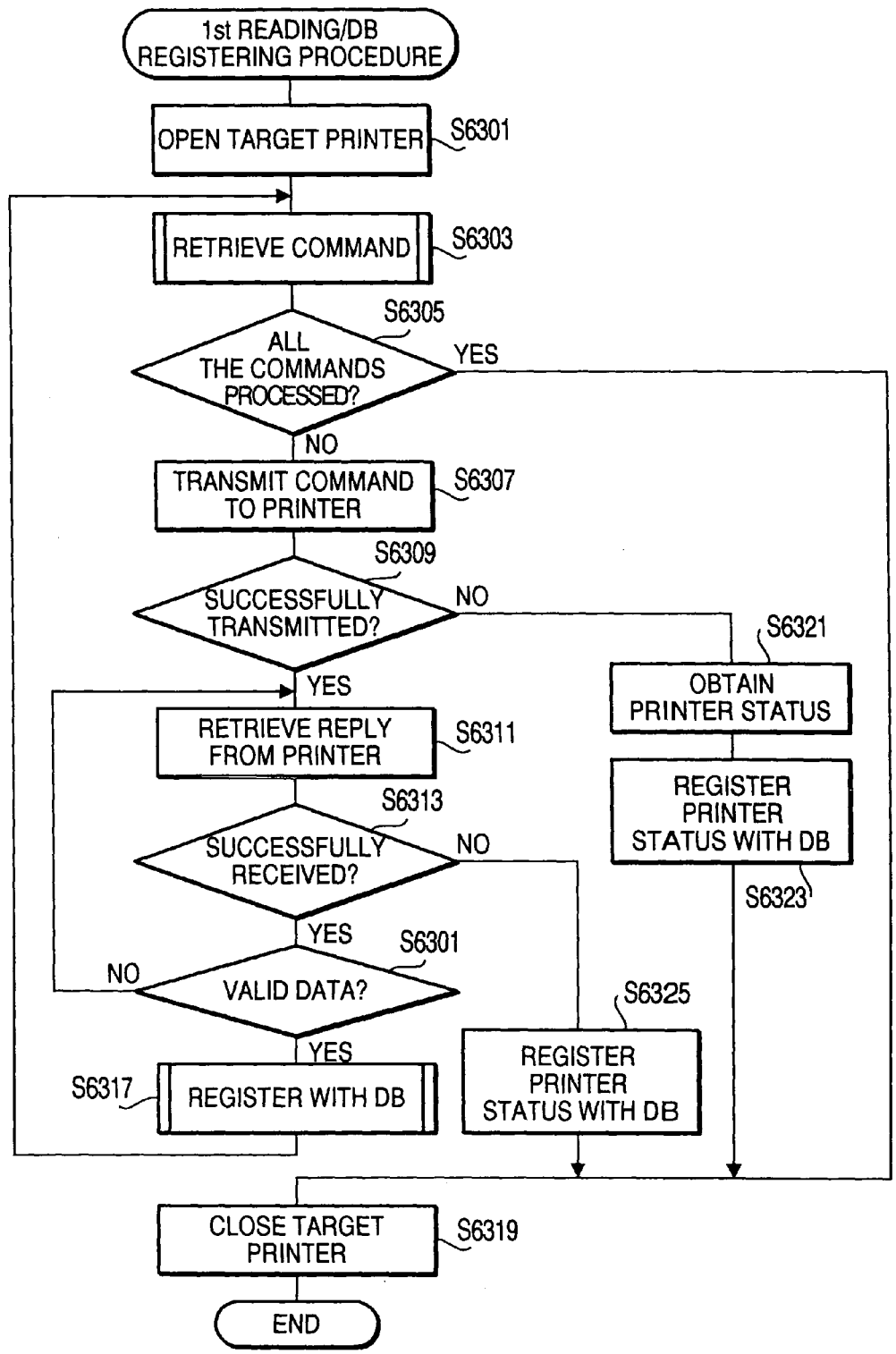
Figure 26:
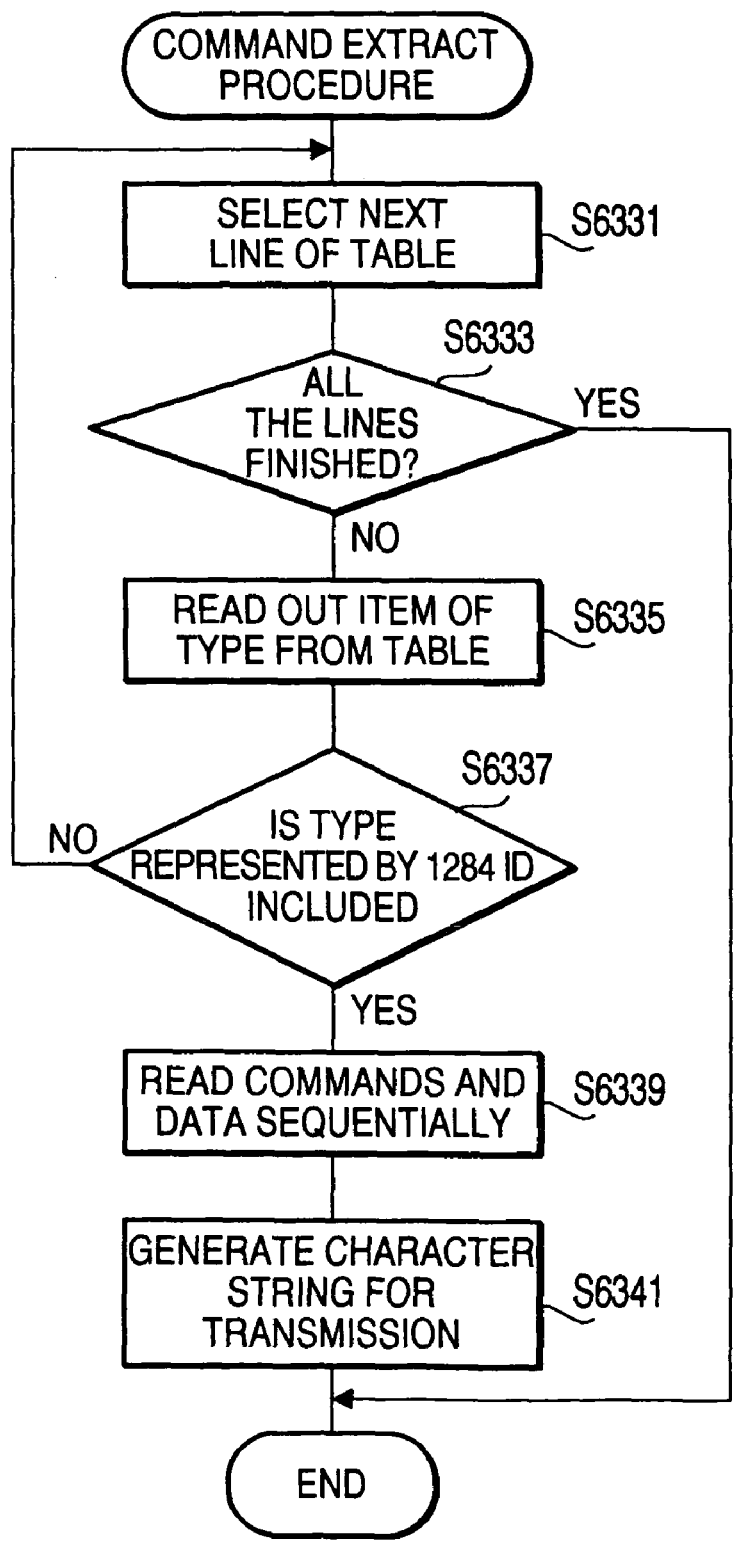
Figures 27, 28:
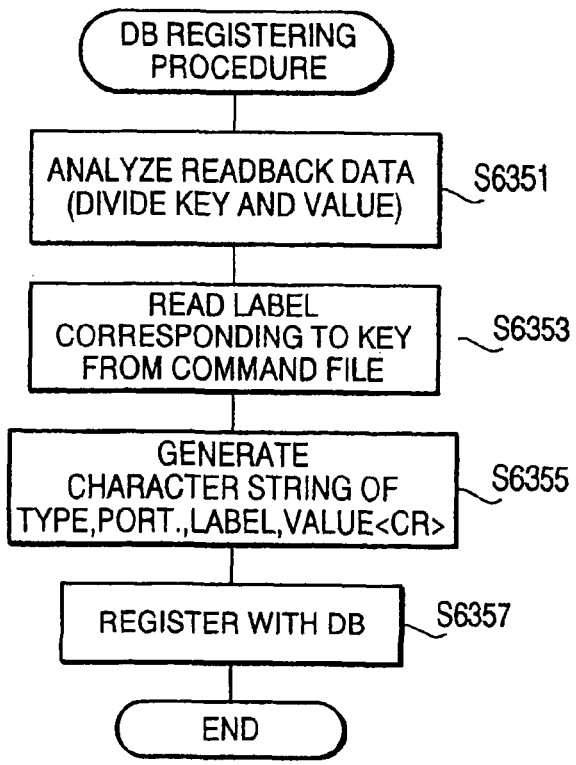
Figures 29, 30:
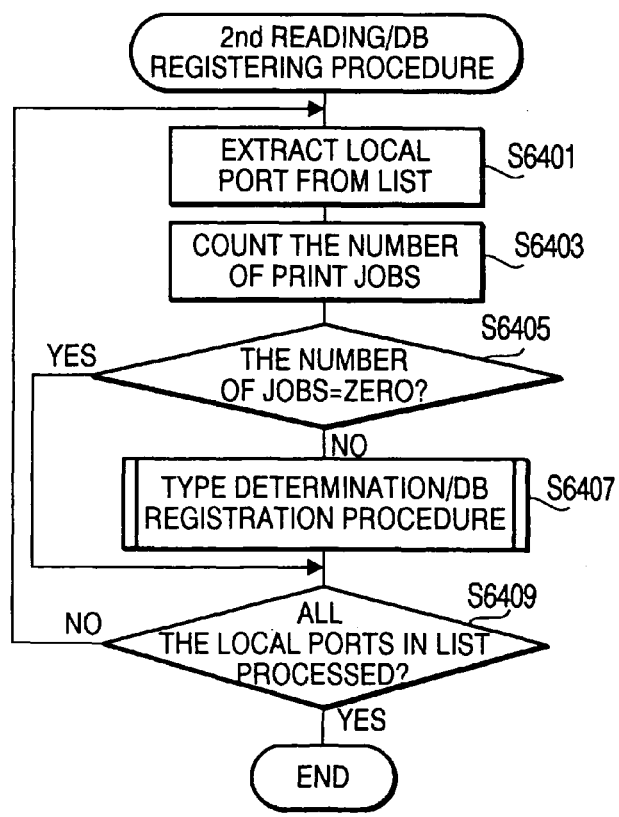
Figure 31:
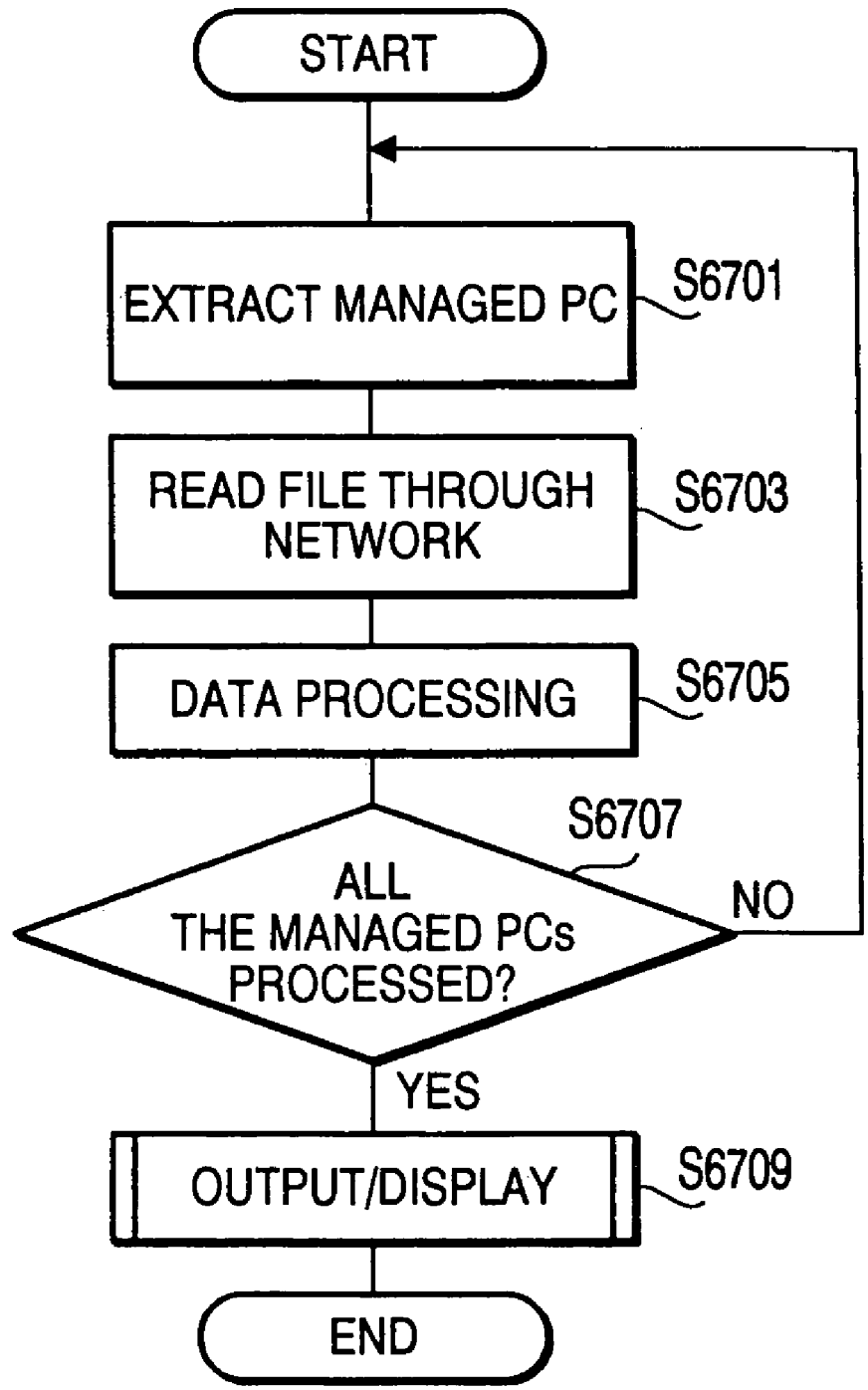
Figure 32:
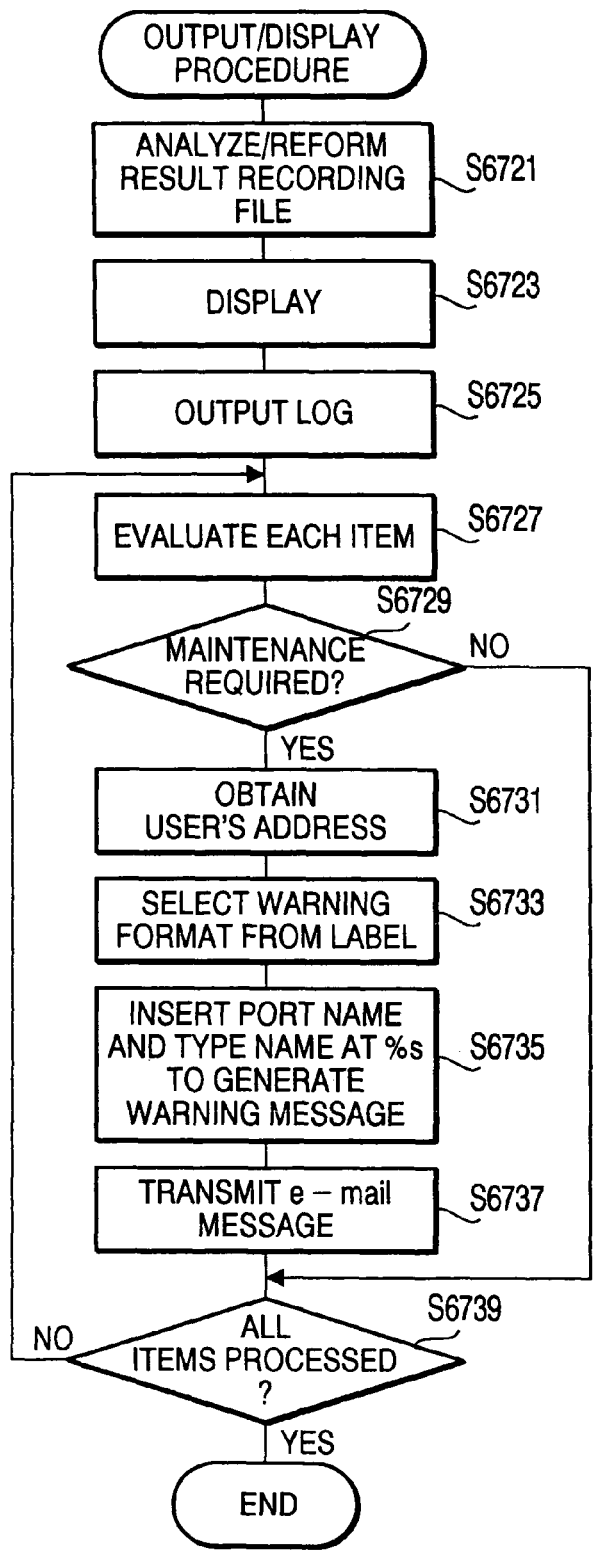

FIG. 15A schematically shows print jobs stored in the queue;

FIG. 15B schematically shows an example of the list to which the IDs of the extracted print jobs are recorded;

FIG. 16 is a flowchart illustrating a printer information retrieving procedure according to a fourth embodiment;

FIG. 17A schematically shows the print jobs stored in the queue;

FIG. 17B schematically shows an example of the list to recorded;

FIG. 18 schematically shows a configuration of a spooler system of the managed PC;

FIG. 19 is a flowchart illustrating a printer information retrieving procedure executed by the managed PC;

FIG. 20 is a flowchart illustrating a print data procedure of a language monitor;

FIGS. 21A and 21B show timing charts illustrating an exclusive access control;

FIG. 22 is a flowchart illustrating a main procedure of the managed PC according to a sixth embodiment;

FIG. 23 is a flowchart illustrating a thread procedure according to the six embodiment;

FIG. 24 is a flowchart illustrating a type determining/DB registering procedure;

FIG. 25 is a flowchart illustrating a first reading/DB registering procedure according to the sixth embodiment;

FIG. 26 is a flowchart illustrating the command readout procedure which is executed in the first reading/DB registering procedure shown in FIG. 25;

FIG. 27 shows an example of a table including a device type, command, key and label;

FIG. 28 is a flowchart illustrating the DB (result recording file) writing procedure according to the sixth embodiment;

FIG. 29 shows an example of command data;

FIG. 30 is a flowchart illustrating a second reading/DB registering procedure executed by the managed PC;

FIG. 31 is a flowchart illustrating a main procedure executed by a managing PC according to the sixth embodiment;

FIG. 32 is a flowchart illustrating an output/display procedure executed by the managing PC according to the sixth embodiment;

FIG. 33 shows an example of the contents of the LOG file; and

FIG. 33 shows an example of the warning message file.

DETAILED DESCRIPTION OF THE EMBODIMENTS

Referring to the accompanying drawings, embodiments of the invention will be described in detail.

First Embodiment

Figure 1:
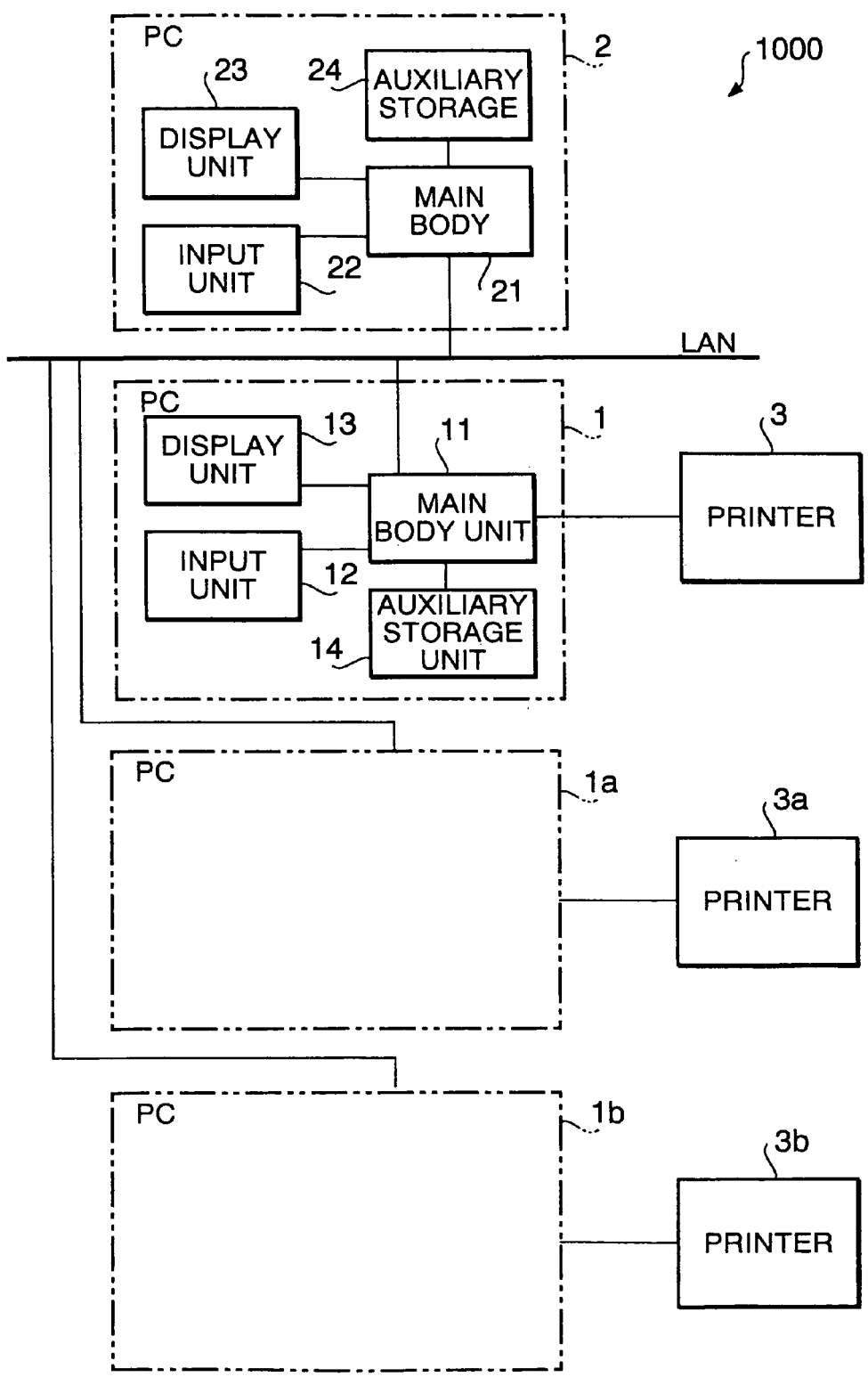
FIG. 1 is a block diagram showing a configuration of a network system according to a first embodiment of the invention.

FIG. 1 is a block diagram of a network system 1000 to which a device information management system according to the present invention is applicable. The network system 1000 is configured such that a plurality of PCs are interconnected through a LAN (Local Area Network).

The network system 1000 includes a plurality of PCs (personal computers) 1, 1*a*, 1*b*, . . . , which are connected with printers 3, 3*a*, 3*b*, . . . , respectively. The network system 1000 further includes a PC 2. The PCs 1, 1*a*, 1*b*, . . . obtain printer information (e.g., status/maintenance information) of the printers 3, 3*a*, 3*b*, . . . , respectively, in response to a request by the PC 2, and transmit the obtained printer information to the PC 2. The PC 2 collects the information transmitted from the PCs 1, 1*a*, 1*b*, . . . , and manages the printer information of the printers 3, 3*a*, 3*b*, . . . . In the following description, the PC 2 will be referred to as a managing PC 2, while the PCs 1, 1*a*, 1*b*, . . . will be referred to as managed PCs 1, 1*a*, 1*b*, . . . .

Figure 2:
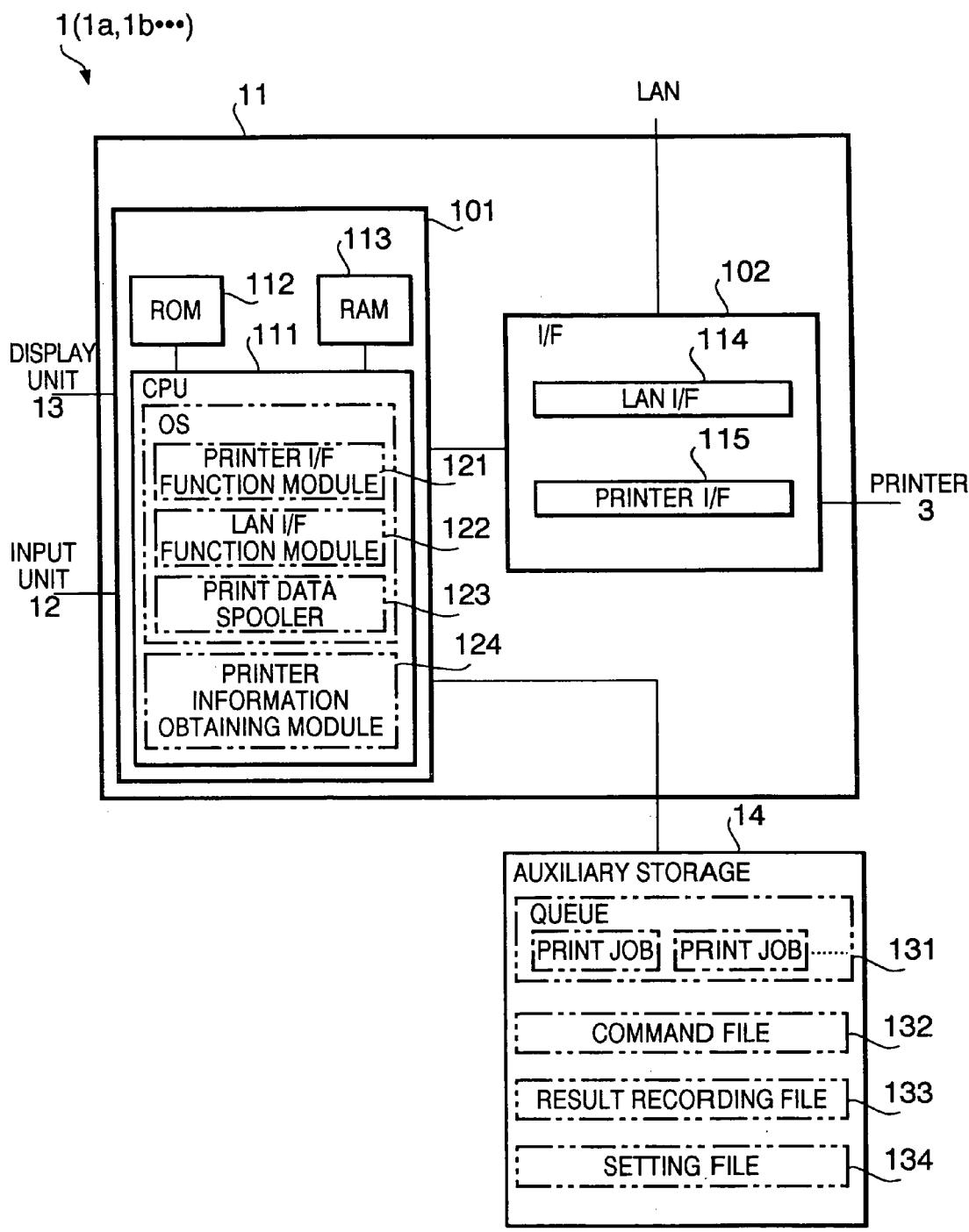
FIG. 2 is a block diagram showing a configuration of a managed PC (personal computer)

FIG. 2 is a block diagram showing a configuration of the managed PC 1. It should be noted that the managed PCs 1, 1*a*, 1*b*, . . . have substantially the same configuration, and the PC 1 will be described as a representative thereof.

As shown in FIG. 2, the managed PC 1 according to the first embodiment includes a main body unit 11 which includes a control unit 101 provided with a CPU (Central Processing Unit) 111, a ROM (Read Only Memory) 112 and a RAM (Random Access Memory) 113, and an I/F (interface) unit 102 that connects the control unit 101 with various devices such as an input unit 12 including a keyboard and a pointing device, a display unit 13 including a display device, and an auxiliary storage unit 14 having a hard disk (see also FIG. 1). The main body unit 11 is implemented with Windows® as an OS (operating system) which is run by the CPU 111. A printer I/F (interface) function module 121, a LAN I/F function module 122, a print spooler 123, which are shared by applications, are composed of software modules implemented as parts of the OS. Further, an I/O (input/output) function including input function of an input unit 12 and output to the display unit 13, and management function of resources (i.e., auxiliary storage unit 14 and memories) are also provided by the OS.

It should be noted that, if the similar functions can be realized, another OS (e.g., Linux®, MacOS®) may be implemented. In the following description, as an example of the OS, Windows® is employed in the managed PC 1.

The OS also provides communication commands with respect to the LAN I/F and printer I/F.

The I/F unit 102 of the main body unit 11 includes a LAN I/F (e.g., a LAN card) 114, and a printer I/F 115 (e.g., a USB (Universal Serial Bus) port or a parallel port), as well as the I/F for the input unit 12, display unit 13 and auxiliary storage unit 14. The PC 1 is connected to the LAN through a LAN cable that is connected to the LAN I/F 114. Further, the PC 1 is connected with the printer 3 through a printer cable that is connected to the printer I/F 115.

The managed PC 1 is implemented with software which obtains the printer information from the printer 3, and transmits the printer information to the managing PC 2. The software operates as a printer information obtaining module 124, which runs on the CPU 111.

The managing PC 2 has the similar structure to the PC 1. As shown in FIG. 1, corresponding to the main body unit 11, input unit 12, display unit 13 and auxiliary storage unit 14 of the PC 1, the PC 2 has a main body unit 21, an input unit 22, a display unit 23 and an auxiliary storage unit 24. The main body unit 21 is implemented with the Windows® system as the OS. It should be noted that, if the similar functions can be realized, another OS (e.g., Linux®, MacOS®) may be implemented in the managing PC 2. In the following description, as an example of the OS, Windows® is employed in the managing PC 2.

The managing PC 2 is implemented with managing software, and requests the managed PCs 1, 1a, 1b, . . . , which are on the network, for printer information (e.g., status/maintenance information) of the printers 3, 3a, 3b, . . . , which are connected to the managed PCs 1, 1a, 1b, . . . , respectively, and manages the printer information transmitted by the managed PCs 1, 1a, 1b, . . . centrally.

The printers 3, 3a, 3b, . . . are managed printers which are subject to be managed by the managing PC 2. Each of the printers 3, 3a, 3b, . . . is compliant with the PJL (Printer Job Language). The PJL is a command language enabling control of various functions of the printer 3 (3a, 3b, . . . ). The PJL was developed by Hewlett-Packard, Co. and is now widely used.

Figure 3:
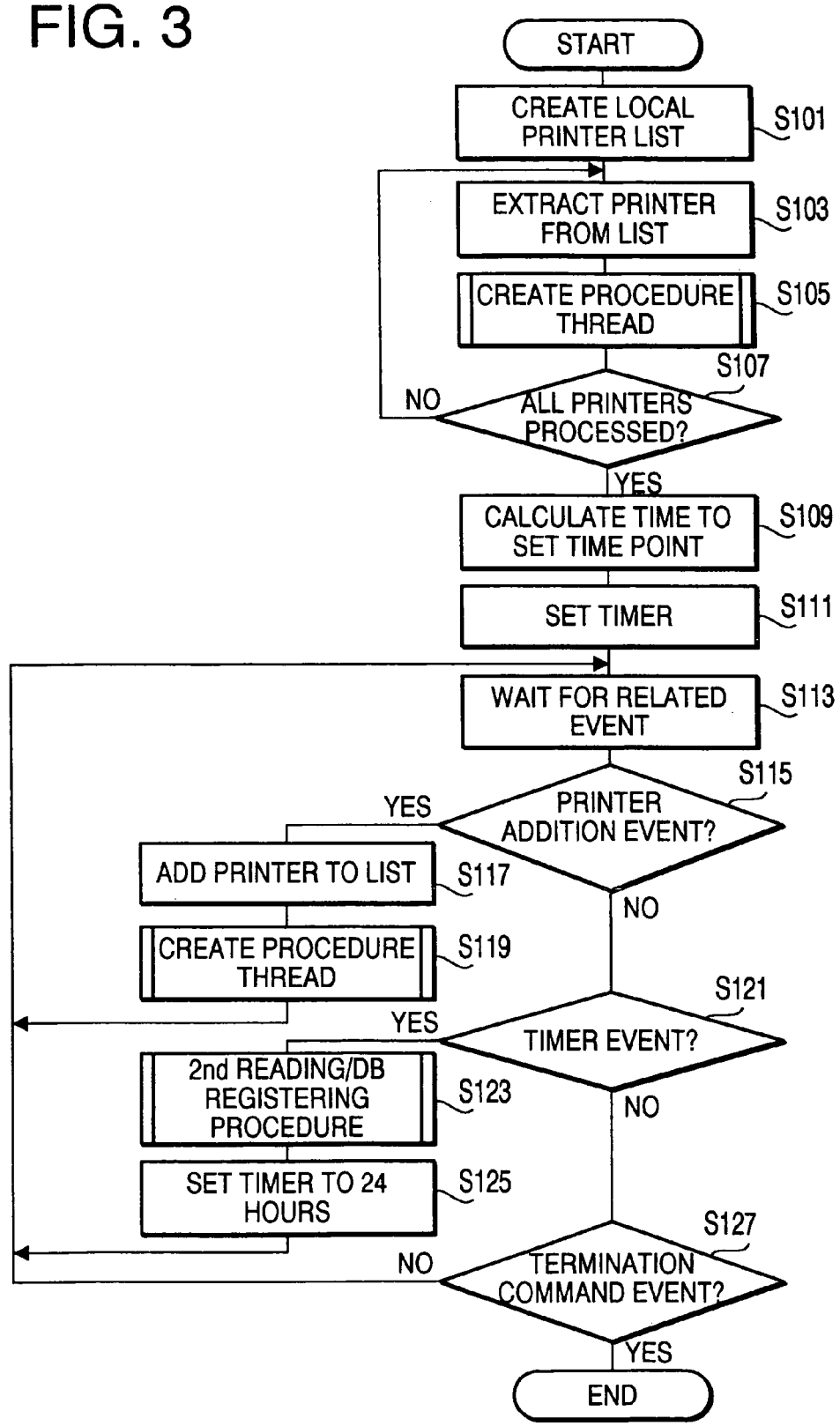
FIG. 3 is a flowchart illustrating a main procedure of the managed PC.

FIG. 3 is a flowchart illustrating a main procedure of the managed PC 1, which is executed by the printer information obtaining module 124. The procedure shown in FIG. 3 is started when the managed PC 1 is powered ON. It should be noted that the procedure is executed in each of the managed PCs 1, 1a, 1b, . . . , individually. In the description below, an example when the procedure is executed by the managed PC 1 will be described.

When the main procedure is started, the managed PC 1 creates a list of local printer(s) (S101). In this step, all the printers (the printer 3, in the example shown in FIG. 1) connected to the managed PC 1 are listed.

In S103, one of the listed printers is selected, and a procedure thread for the selected printer is created (S105). It should be noted that steps S103 and S105 are repeated until all the printers listed in S101. That is, when the procedure thread has not been created for at least one of the listed printers (S107: NO), control returns to S103, and another printer which has not been selected is selected, and the procedure thread for the printer is created (S105). During the loop of steps S103 through S107, the procedure threads, the number of which is the same as the number of the listed printers, to be executed in parallel are created. In the example shown in FIG. 1, since only one printer 3 is connected to the managed PC 1, only one procedure thread is created in S105.

In the procedure thread, the printer information (e.g., information regarding life of exchangeable parts such as the exchange term of a drum, information regarding consumable parts such as the remaining amount of toner or ink, the remaining amount of the recording sheet, information regarding errors such as the number of occurrences of paper jam, and information of various items to be managed/updated at the printer side) is obtained from the printer corresponding to the procedure thread, and the obtained information is stored in a result recording file 133 which is a DB (data base) record stored in the auxiliary storage unit 14. The procedure thread will be described in detail later.

When the procedure threads for all the listed printers have been created (S107: YES), respectively, control reads a set time point from a setting file 134 and calculates a remaining time period to the set time point (S109). In S111, control sets the calculated time period to the timer. It should be noted that the setting file 134 is a file stored in the auxiliary storage unit 14, and the set time point is a time pint arbitrarily set by a system administrator. The timer causes a timer event when the set time period elapses.

In S113, the managed PC 1 waits for occurrence of a printer-related event (S113). When the occurred event is a printer addition event (S115: YES), control adds the new printer to the list (S117), and creates the corresponding procedure thread (S119). The printer addition event occurs when powered-on of a printer and/or insertion of a printer cable is detected by use of, for example, a well-known plug-and-play function. When the printer addition event occurs, it is recognized that a new printer is added. Accordingly, in such a case, in S119, the procedure thread corresponding to the newly added printer is created, which is the similar procedure as is done in S105. When S119 is executed, control returns to S113.

When the occurred event is not the printer addition event (S115: NO), it is determined whether the event is the timer event (S121). When the occurred event is the timer event (S121: YES), a second reading/DB registering procedure is executed (S123). The timer event in S121 is occurred when the time period set in S111 has elapsed.

In the second reading/DB registering procedure in S123, the status information of all the printers connected to the managed PC 1 is obtained and registered with the DB (data base), which will be described in detail later. After the second reading/DB registering procedure is executed (S123), a 24-hour time period is set to the timer (S125), thereby the timer event will occur after 24 hours later. When the timer is re-set in S125, control returns to S113.

When the occurred event is not the timer event (S121: NO), control proceeds to S127. When the occurred event is a termination command event (S127: YES), the procedure shown in FIG. 3 is terminated. It should be noted that the termination command event occurs when a user performs a predetermined terminating operation using the input unit 12. When the occurred event is not the termination command event (S127: NO), control returns to S113, and waits for occurrence of a further event.

As understood from the above, when the managed PC 1 operates, unless the user performs the predetermined terminating operation, the procedure shown in FIG. 3 will not be terminated and is kept executed as a residual process on the managed PC 1.

Next, the procedure thread which is created in S105 or S119 will be described with reference to FIG. 4. In the following description, the procedure performed in the procedure thread will be referred to as a thread procedure. The number of the thread procedures is, as described above, equal to the number of the printers connected to the managed PC 1. It should be noted that one thread procedure is performed for individual printer.

When thread procedure (FIG. 4) is started, the managed PC 1 waits for the occurrence of the printer-related event (S201). When an event occurs, and it is a printer deleting event (S203: YES), control deletes the printer for which the thread procedure is being executed from the list (S205), and terminates the current thread procedure. The printer deleting event is an event when power-OFF of the printer or removal of a cable from the managed PC 1 is detected. When the printer deleting event occurred, it is known that the printer, which has been available, is now deleted, and thus, in S205, the procedure thread which is no more necessary is deleted.

When the occurred event is not the printer deleting event (S203: NO), and when the occurred event is the print termination event (S207: YES), the print jobs to be executed by the printer currently subject to the thread procedure are listed (S209). Specifically, the printer information obtaining module 124 obtains the information related to the print jobs included in the queue 131 from a print spooler (which is a queue controlling module) 123 (see FIG. 2) provided by the OS, when step S209 is being performed. The queue 131 is a group of jobs which are stored in the auxiliary storage unit 14 (or the RAM 113), ordered by the OS and managed by the OS. In S211, control counts the number of jobs, referring to the listed print jobs. In S213, it is determined whether the number of the jobs is equal to or less than a set value N.

In this embodiment, the set value N is equal to zero, and thus, in S213, it is determined whether the number of the jobs is zero or not. The method of checking whether the number of the jobs is zero is to determine whether the number of the print jobs listed up in S209 is zero. It should be noted that, in the present embodiment, the print job information listed up in step S209 includes an item of a job status. In one print job, when the output data has been transmitted, the job status is set to "transmission finished", and then, at a predetermined timing managed by the OS, the print job itself is deleted. Therefore, even when only one print job exists in step S209, if the job status of the print job information is set to "transmission finished", the job is regarded as it does not exist anymore.

Thus, in S213, when the number of the listed print job is zero, or when the number of the listed print job is one and the job status thereof is "transmission finished", the number of the print job is determined to be zero.

When the number N of the print jobs is equal to or less than N (S213: YES), the first reading/DB registering procedure is executed (S215). The first reading/DB registering procedure is illustrated in a flowchart shown in FIG. 5.

As described above, FIG. 5 is a flowchart illustrating the first reading/DB registering procedure executed by the managed PC 1.

Figure 5:
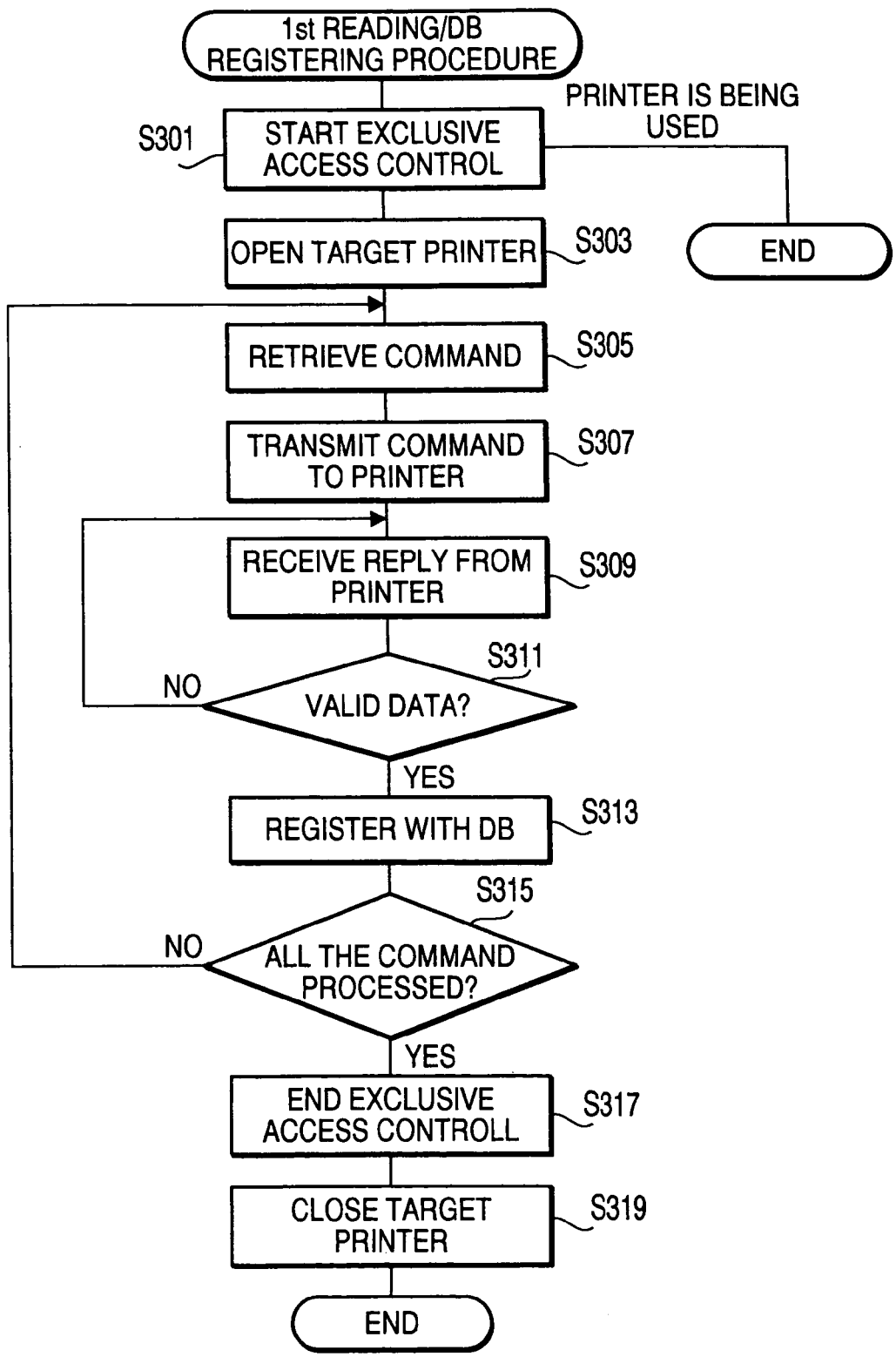
FIG. 5 is a flowchart illustrating a first reading/DB creating procedure executed by the managed PC.

When the first reading/DB registering procedure is started, the managed PC 1 starts an exclusive access control with respect to the printer for which the procedure is executed (S301). The exclusive access control is performed in order to prevent procedures subjected to the same printer from being executed simultaneously in another thread or another process. When the procedure with respect to the printer has been initiated, process fails to the exclusive access control and an error status is returned. In such a case, the procedure in FIG. 5 is terminated. In other words, the steps thereafter are executed only when the exclusive access control can be executed. When the exclusive access control is successful, the target printer is opened (S303).

Next, from the command file 132, a command is retrieved (S305), which will be transmitted to the target printer (S307). The command file 132 is a file stored in the auxiliary storage unit 14. In the command file 132, a plurality of commands (e.g., a command for investigating the remaining amount of the toner or ink, a command for investigating the remaining amount of the recording sheet, a command for investigating a remaining amount of the term when the drum is to be exchanged) described using the PJL are recorded.

In S305, one of the plurality of commands is retrieved, and in S307, the retrieved command is transmitted to the target printer. The data transmitted in this procedure is given from the information obtaining module 124 to the print spooler 123 provided by the OS, and is input in the queue 131. Thereafter, the PJL command is treated as the normal print job, and transferred to the printer I/F function module 121 (see FIG. 2) from the print spooler 123, and then transferred to the printer.

Next, the information (i.e., the printer information) transmitted from the target printer is received (S309). The procedure in S309 is to execute a readback of the printer information that is returned from the printer at the managed PC 1. Specific procedure may be different depending on the type of the target printer. For example, when the target printer is connected through the parallel I/F, the printer information obtaining module 124 checks presence/absence of the information to be returned to the managed PC 1 through the printer I/F function module 121 provided by the OS, and when the information is available, it is received. When the target printer is connected through the USB I/F, the printer information obtaining module 124 firstly receives the information through the printer I/F function module 121 of the OS, and when the information amount is zero, the reception of the information is repeated.

It should be noted that in either case, some data is received finally. When the data is received, process determines whether the received data is effective (S311). When the data is not effective (S311: NO), step S309 is re-executed. When the data is effective (S311: YES), the printer information received from the printer is stored in the DB (i.e., the result recording file 133).

Steps S305-S313 are repeated until all the commands are processed. During the repetition of S305-S313, in S305, a plurality of commands recorded in the command file is extracted one by one. When all the commands extracted in S305 are processed (i.e., transmitted to the printer), process determines that all the commands have been processed (S315: YES). As a result, in the DB defined in the auxiliary storage unit 14 (the result recording file 133), information of replies to all the commands requesting the target printer is stored. Thereafter, the exclusive access control with respect to the target printer is finished (S317), process closes the target printer (S319), and the procedure shown in FIG. 5 is finished.

Figure 4:
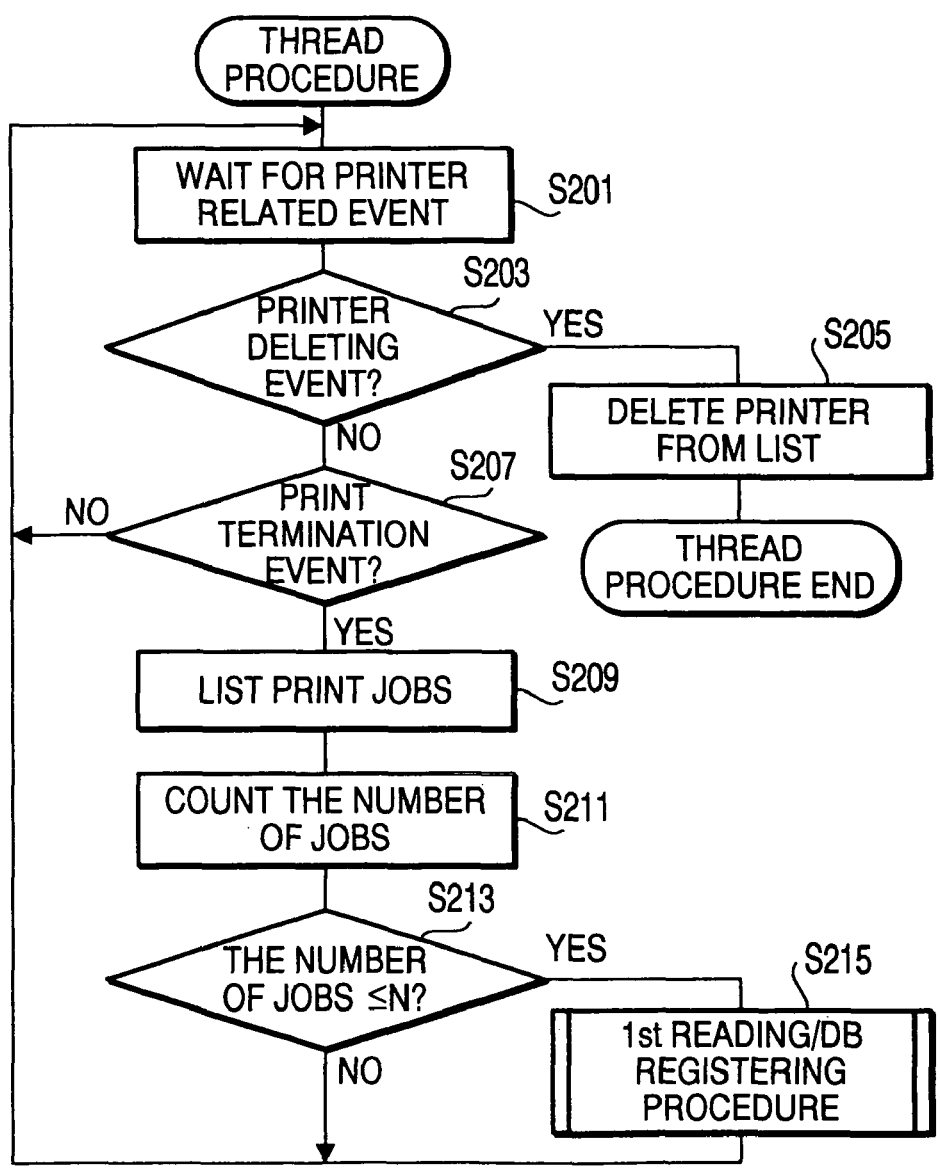
FIG. 4 is a flowchart illustrating a thread procedure executed by the managed PC.

When steps S301-S319 have been finished, which means S215 of FIG. 4 has been finished, and process proceeds to S201 (FIG. 4). When the number of the jobs counted in S211 exceeds the set value N (S213: NO), process does not execute S215 and returns to S201.

Therefore, in the thread procedure described above, when a printer is available, a procedure thread for the printer is created and then executed. Then, when the printer deleting event is generated, the thread procedure for the printer is finished. After the thread procedure is started and before it is finished, the number of print jobs is detected at every occurrence of a print completion event, and when the number of the print jobs is equal to or less than the set value N, the print information is obtained from the target printer, and stored the thus obtained printer information in the DB (result recording file 133) provided in the auxiliary storage unit 14.

As above, by detecting the number of print jobs every time when the print completion event occurs, a timing when the number of print jobs is equal to or less than the set value N can be hardly missed in comparison with a case where the number of print jobs is detected regardless of the occurrence of the print completion event. As a result, a chance to obtain the printer information from the target printer is increased. Further, according to the present embodiment, since the set value N is equal to zero, the printer information is obtained from the target printer in S215 only when the number of the print jobs is zero. Therefore, according to the embodiment, it will not be necessary to take time to obtain the printer information from the target printer because a print job, which would take time to be completed, has been included in the queue previously.

Incidentally, the information is stored, in the thread procedure, in the DB (result recording file 133) only when the number of print job is equal to zero. Therefore, under circumstances where the print job is generated perpetually, the number of print jobs would not become zero theoretically, and thus, the information would not be stored in the DB (result recording file 133) by the thread procedure. However, in the system according to the first embodiment, in addition to the thread procedure described above, step S109-S111 and S121-S125 are performed. That is, when it becomes the previously set time, the information is stored in the DB (result recording file 133) forcibly.

Specifically, in S109 and S111, when it becomes the set time, the timer event occurs. When the timer event occurs, S123 is executed (i.e., the second reading/DB registering procedure is executed). The second reading/DB registering procedure is illustrated in FIG. 6.

Figure 6:
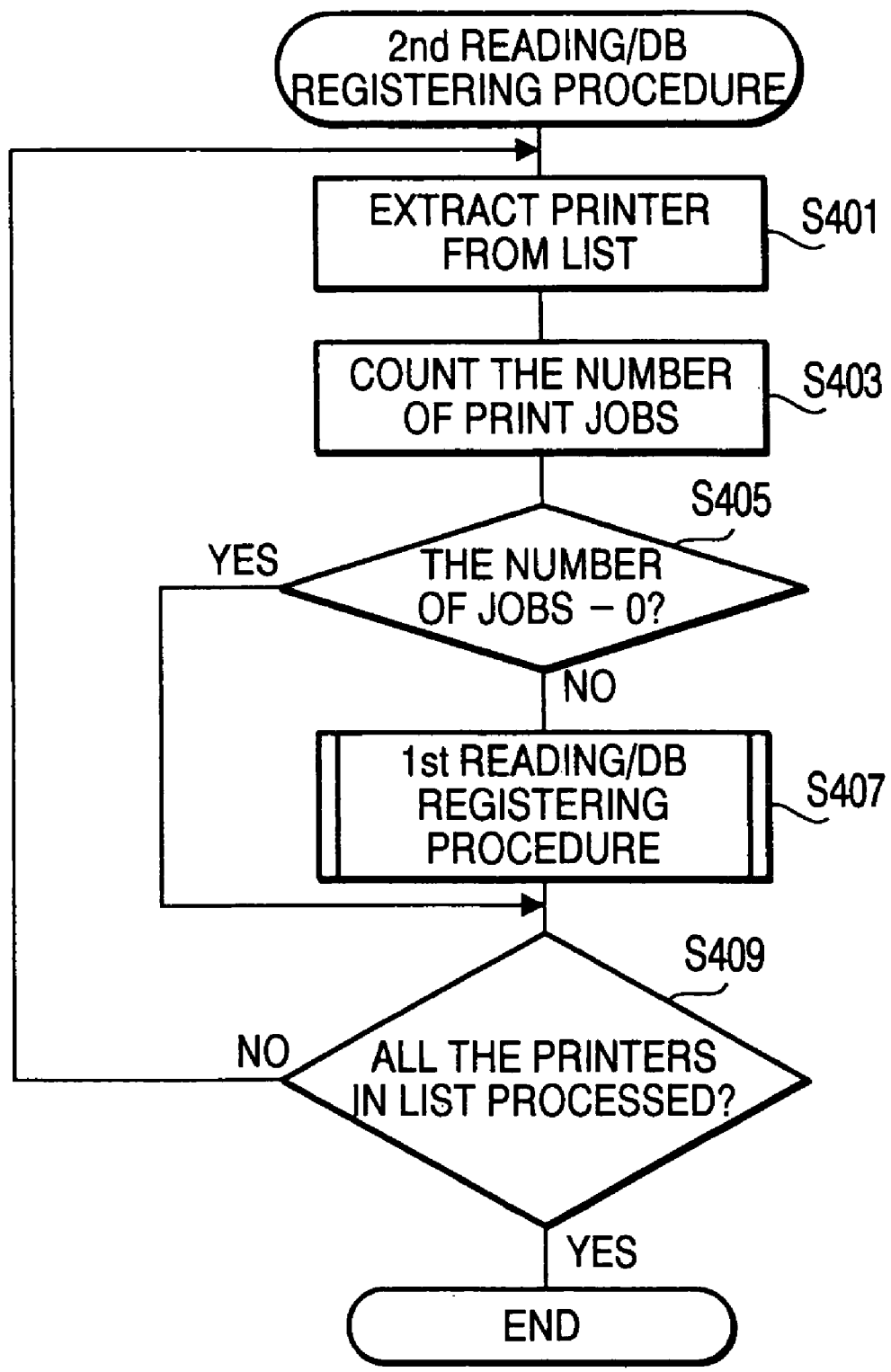
FIG. 6 is a flowchart illustrating a second reading/DB creating procedure executed by the managed PC.

FIG. 6 is a flowchart illustrating the second reading/DB registering procedure executed by the managed PC 1.

In S401, the managed PC 1 extracts a printer from the list. The, the managed PC 1 counts the number of print jobs for the extracted (target) printer (S403). Firstly, the managed PC 1 determines whether the number of print jobs is zero (S405). It should be noted that steps S403 and S405 may be executed in a way similar to steps S211 and S213.

When the number of print jobs is not zero (S405: NO), process executes the first reading/DB registering procedure (S407) and proceeds to S409. When the number of print jobs is zero (S405: YES), process proceeds to S407, and the first reading/DB registering procedure is not executed.

The first reading/DB registering procedure in S407 is similar to the procedure in S215, and detailed description there of is omitted. However, it is noted that, similar to S215, the print information is obtained from the target printer, and the printer information is stored in the DB (result recording file 133) in the auxiliary storage unit 14.

As described above, even if the number of print jobs is not zero, the first reading/DB registering procedure is executed. With this configuration, even in a condition where the number of print jobs does not become zero, it is ensured that the printer information is stored in the DB (result recording file 133). It should also be noted that the reason why the reading/DB registering procedure is not executed when the number of print job is zero is that the print information must have been recorded in the thread procedure when the number of print jobs is determined to be zero, and the condition of the target printer has not been changed.

The first reading/DB registering procedure is executed when there are print jobs in the queue 131. Therefore, when a PJL command is issued, a print job corresponding to the PJL command is added at the end of the queue 131. Accordingly, the readback data corresponding to the PJL command will not be returned until all the print jobs previously accumulated in the queue 131 are finished.

When process proceeds to S409, when the procedures for all the printers in the list have not been finished (S409: NO), process returns to S401. Thus, S401-S409 are repeated by the number of times which is equal to the number of the printers connected to the managed PC 1. Thereafter, when the procedures for all the printers are finished (S409: YES), and the procedure shown in FIG. 6 is finished.

As above, in the managed PC 1, when the print completion event occurs, if the number of print jobs is equal to or less than the set value N (which is zero in the embodiment), step S215 is executed and the print information is obtained from the target printer immediately, while step S407 is executed at the set time even though the number of print jobs is more than the set value N (which is zero in the embodiment), and it is ensured that the printer information is obtained from the target printer.

Next a procedure executed in the managing PC 2 will be described.

Figure 7:
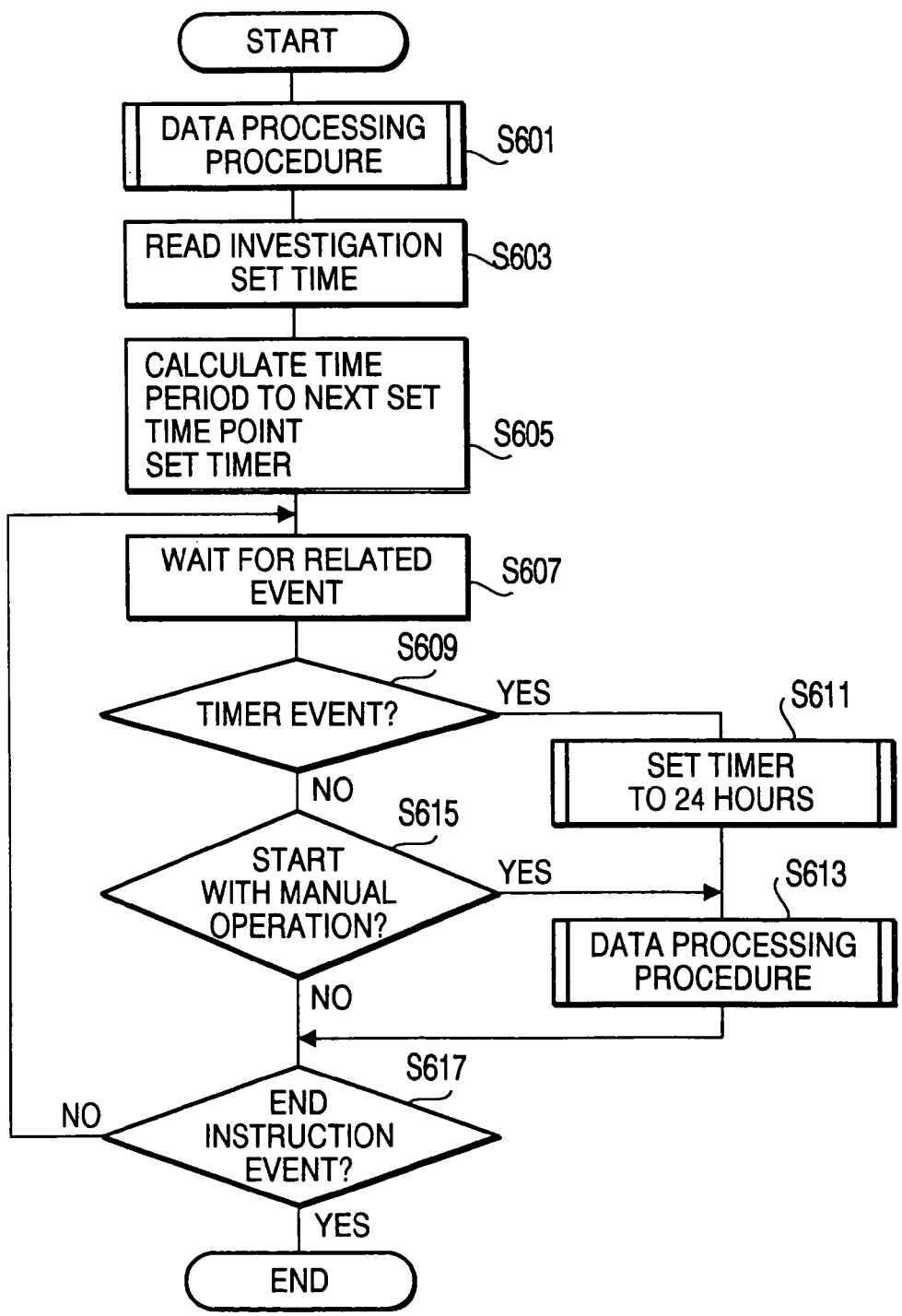
FIG. 7 is a flowchart illustrating a main procedure executed by a managing PC.

FIG. 7 is a flowchart illustrating a main procedure executed by the managing PC 2. This procedure is initiated when the managing PC 2 is powered ON.

In S601, the managing PC 2 executes a data processing. The data processing in S601 is for a procedure to use the printer information which the managed PC 1 obtains from the printer 3 and stored in the DB.

Figure 8:
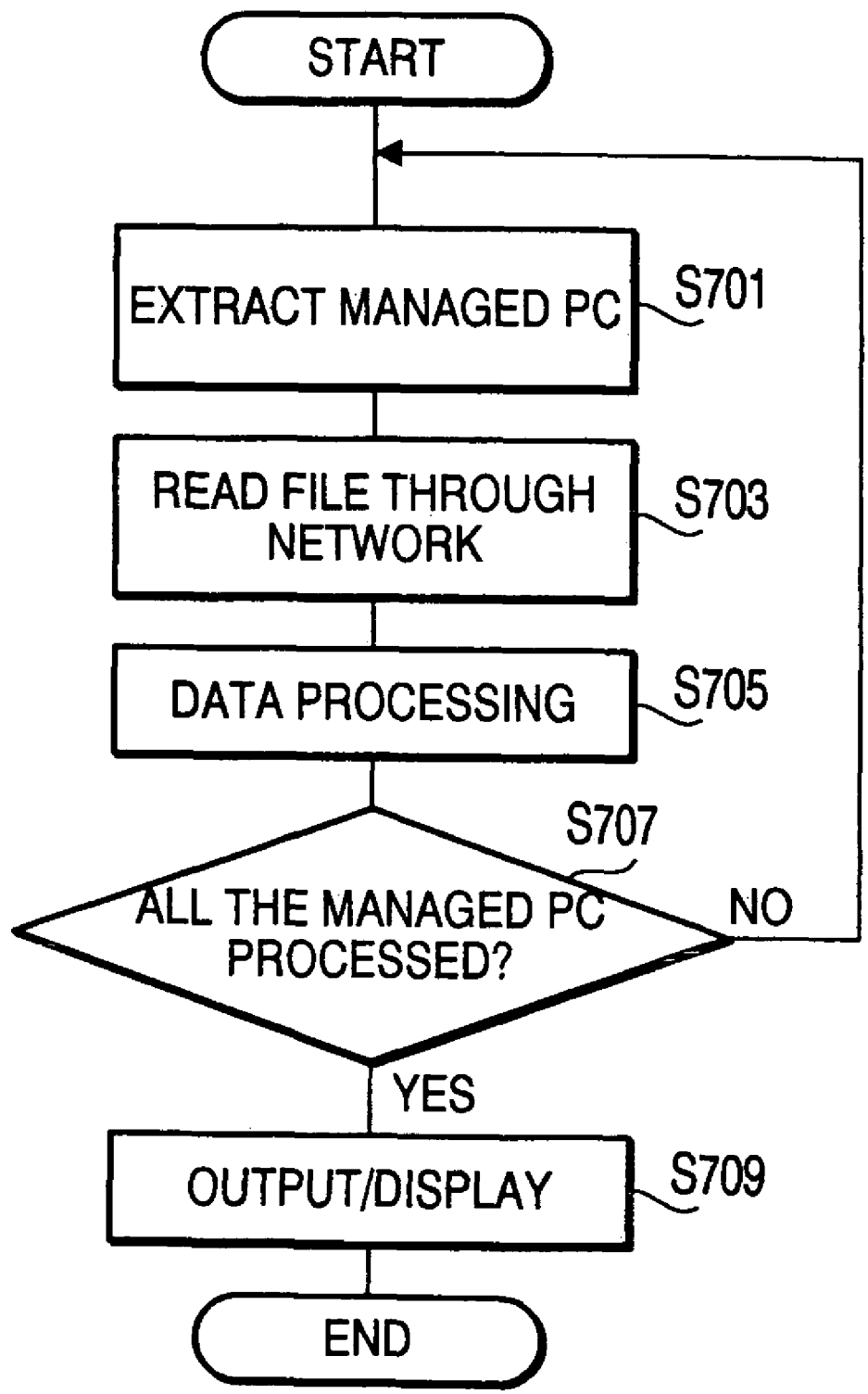
FIG. 8 is a flowchart illustrating a data processing procedure executed by the managing PC.

FIG. 8 is a flowchart illustrating the data processing procedure executed by the managing PC 2.

In S701, the managing PC 2 extracts a managed PC. That is, the managing PC 2 extracts one of a plurality of managed PCs 1, 1a, 1b, . . . as a target PC. In the following description, it is assumed that the managed PC 1 is selected as the target managed PC.

In S703, the managing PC 2 reads a file from the managed PC 1 through the network. The file the managing PC 2 reads is the DB (result recording file 133) in which the printer information has been stored in S313 by the managed PC 1. It should be noted that a readable property is given by the managed PC 1 to the file (result recording file 133) such that the result recording file 133 can be read by another PC through the network. That is, the result recording file 133 is configured such that the managed PC 1 can provide the printer information to the managing PC 2 upon request by the managing PC 2.

In S705, a predetermined data processing is applied to the printer information. In S705, the printer information included in the read file is converted to have a format appropriate for management by the managing PC 2, or a format appropriate for display or print at the managing PC 2.

Specifically, in S705, information to be managed at the managing PC 2 (e.g., log information including the start time of the procedure of FIG. 7, a file access time, and the like) is added to the printer information. Further, some binary data, bit ON/OFF information and information represented by numeral codes may be converted into visible representations such as symbols, images and messages.

In S707, process determines whether the above procedure has been done for all the managed PCs. When there are PCs (e.g., PC 1a, 1b, ...) of which the printer information has not been processed (S707: NO), process returns to S701, and the same procedure is executed for such PCs.

When the printer information of all the managed PCs has been processed (S707: YES), process proceeds to S709. In S709, necessary information is output. Specifically, the information processed in S705 is stored as a file in the auxiliary storage unit 24 and/or displays necessary information on the display unit 23.

As above, at the managing PC 2, the printer information of the printer 3 can be displayed. Further, by referring to the files stored in the auxiliary storage unit 24, an operation history of the printer 3 can be managed. According to the embodiment, the display on the display unit 23 can be finishes as the user performs a predetermined operation using the input unit 22. When the predetermined operation is performed by the user, the procedure shown in FIG. 8 is terminated.

When the data processing procedure (S601 of FIG. 7) is finished, the managing PC 2 retrieves an investigation setting timer from the setting file (S603). Then, process calculates a time period to the next investigation setting time, and set the calculated time period to the timer (S605). The setting file is stored in the auxiliary storage unit 24, and the investigation setting time, which is arbitrarily set by the user, is stored in the setting file. When the set time elapses in the timer, the timer event occurs, which is detected in S609.

In S607, the managing PC 2 waits for occurrence of a related event. When the timer event occurs (S609: YES), the managing PC 2 sets the timer to measure 24 hours (S611), and executes the data processing procedure (S613). The data processing procedure is the same as the procedure executed in S601.

When the occurred event is not the timer event (S609: NO), process determines whether the user performs a predetermined operation through the input unit 22 to start the data processing procedure (S615). When the data processing is manually initiated (S615: YES), process proceeds to S613 and the data processing procedure is executed.

When the event is not the manual initiation of the data processing procedure (S615: NO), or after the data processing procedure is executed in S613, process determines whether end instruction event is occurred in S617. The end instruction event is issued when the user performs a predetermined operation through the input unit 22 to finish the procedure. When the end instruction event is issued (S617: YES), the procedure shown in FIG. 7 is finished. When the end instruction event has not been issued (S617: NO), process returns to S607 to wait for occurrence of another event. As above, unless the user operates to finish the procedure shown in FIG. 7, procedure does not finish and kept running as a residual process on the managing PC 2.

In this embodiment, the investigation set time which is set in S605 is a little later (e.g., approximately ten minutes) than the time set in S111 by the managed PCs 1, 1a, 1b . . . . By setting the time in this way, the timer event occurs in the PC 2, for example, ten minutes later that the timer event at the managed PCs 1, 1a, 1b . . . . Between this delayed period, it is expected that the printer information is updated to the latest status at the managed PCs 1, 1a, 1b . . . .

If the times are set so that the timer events occur simultaneously at both the managing PC 2 and the managed PCs 1, 1a, 1b, . . . , or if the timer event at the managing PC 2 occurs earlier than the timer events at the managed PCs 1, 1a, 1b . . . , the printer information may be updated after the managing PC 2 retrieves the files from the managed PCs 1, 1a, 1b . . . . In such a case, the printer information obtained by the managing PC 2 may not be the latest one.

By setting the investigating time as above, it is ensured that the managing PC 2 obtains the latest printer information.

As described above, according to the first embodiment, even if the managed PC 1 is unable to obtain the printer information immediately from the printer 3, the printer information can be retrieved from the DB (result recording file 133) stored in the auxiliary storage unit 14. Therefore, the managed PC 1 can provide the printer information immediately in response to the request by the managing PC 2.

According to the first embodiment, the managed PC 1 asynchronously executes the procedure for obtaining the printer information from the printer 3 and the procedure for providing the printer information to the managing PC 2 upon request thereof. Therefore, in comparison with a system which first obtains the printer information from the printer and then transmits the obtained printer information to the managing PC, the printer information can be transmitted quickly.

Further, in the managed PC 1, the printer information to be stored in the DB of the auxiliary storage unit 14 is obtained when the number of print jobs in the queue 131 is zero. Thus, if at least one print job is in the queue 131, the managed PC 1 does not attempt to retrieve the printer information from the printer 3. Accordingly, a long period will not be spent for obtaining the printer information from the printer 3. Further, when the printer is processing one or more print jobs, the managed PC 1 does not apply load to the printer 3 by attempting to obtain the printer information.

Further, the managed PC 1 monitors the number of print jobs which output data to the printer 3, and when the print completion event is occurred and the number of print jobs is zero, the managed PC requests the printer 3 to output the printer information. Therefore, even if there is a short interval between the completion of a certain print job and the number of the print job becomes zero and a new print job is generated, the printer information can be requested to the printer 3 without fail.

Furthermore, in addition to a case where the number of print jobs in the queue 131 is zero, the managed PC 1 requests for the printer information at a preliminary set time, even under a situation where the number of print jobs does not become zero, the printer information can be stored in the DB of the auxiliary storage unit 14 regardless of the number of print jobs.

It should be noted that the above-described embodiment is an exemplary one, and can be modified in various ways.

For example, in the first embodiment, the printer information is requested by client software which runs on the managed PC 1 (1a, 1b . . . ) and the managing PC 2. Instead of such a configuration, client software may run on each PC individually. In such a configuration, similarly to the embodiment, the printer information can be provided immediately upon request thereof.

Second Embodiment

Next, an imaging device information management system according to a second embodiment will be describe. The hardware configuration of the second embodiment is similar to that of the first embodiment shown in FIGS. 1 and 2, and description thereof is omitted.

Figure 9:
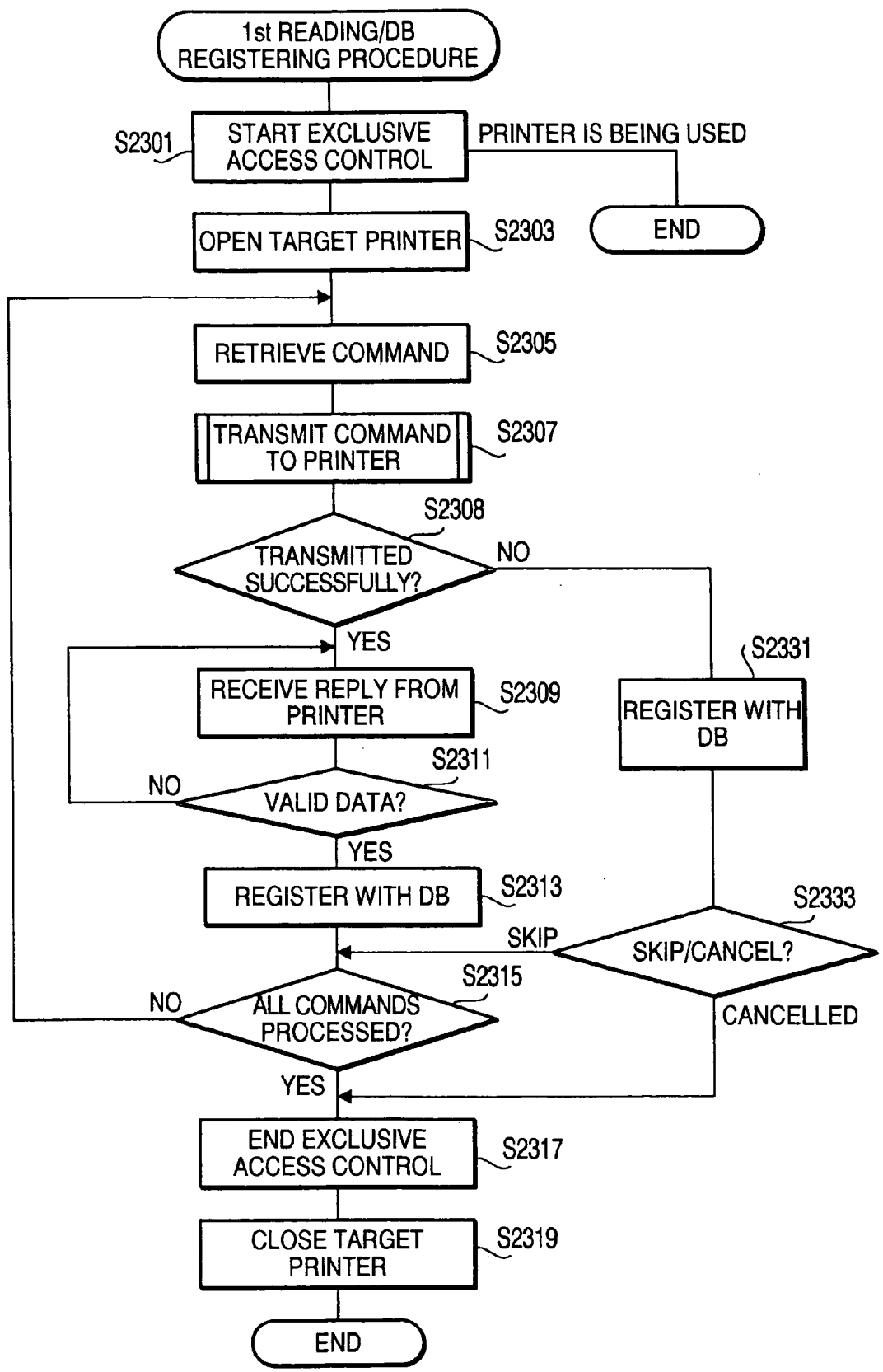
FIG. 9 is a flowchart illustrating a first reading/DB registering procedure according to a second embodiment of the invention.

FIG. 9 is a first reading/DB registering procedure according to the second embodiment of the invention. The procedure shown in FIG. 9 is executed at S215 of the thread procedure shown in FIG. 4.

When the first reading/DB registering procedure is started, the managed PC 1 starts an exclusive access control with respect to the target printer for which the procedure is executed (S2301). The exclusive access control is performed in order to prevent procedures subjected to the same printer from being executed simultaneously in another thread or another process. When the procedure with respect to the printer has been initiated, process fails to the exclusive access control and an error status is returned. In such a case, the procedure in FIG. 9 is terminated. In other words, the steps thereafter are executed only when the exclusive access control can be executed. When the exclusive access control is successful, the target printer is opened (S2303).

In S2305, one of the plurality of commands is retrieved, and in S2307, a command transmitting procedure is executed to transmit the retrieved command to the target printer.

Figure 10:
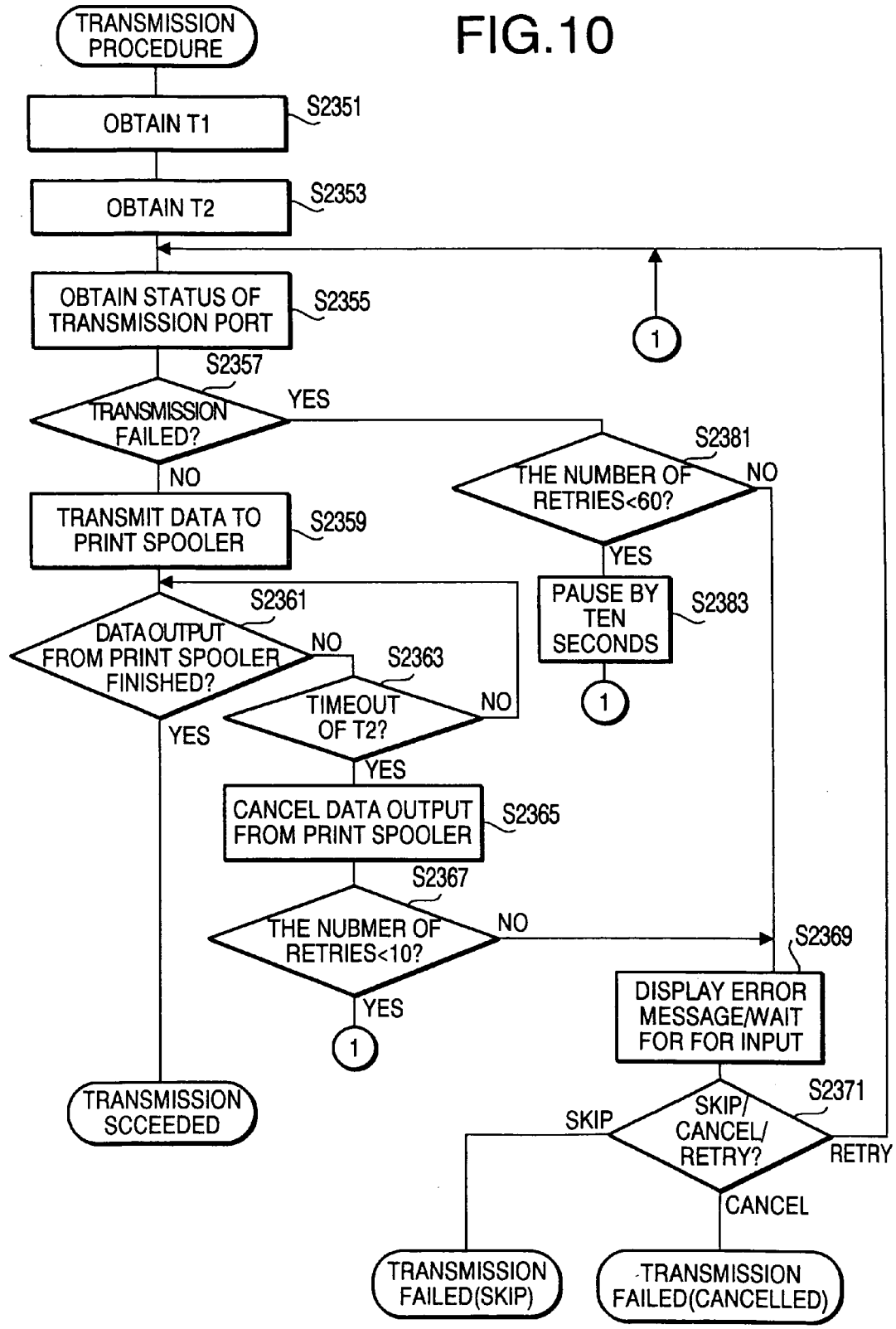
FIG. 10 is a flowchart illustrating a command transmitting procedure.

FIG. 10 is a flowchart illustrating the command transmitting procedure executed in S2307 of FIG. 9.

In S2351, the managed PC 1 obtains a first transmission timeout period (hereinafter, simply referred to as first timeout period) T1. The first timeout period T1 is a period used in the printer I/F function module 121 to determine a criterion of judgment of the transmission error. In this embodiment, the period is, for example, 60 seconds. It should be noted that the first timeout period T1 is a period the administrator of the managed PC 1 can change. However, the period is referred to by applications not included in the information management system when the printer I/F function module 121 is used. Therefore, in many cases, the period T1 cannot be set arbitrarily.

Next, the managed PC 1 calculates a second transmission timeout period (hereinafter, simply referred to as second timeout period) T2 based on the first timeout period T1 (S2353). The second timeout period T2 is referred to only by the present system, and is set to a period, which is generally considered to be sufficient, during which the print spooler 123 receives the PJL command and finishes transmitting the PJL command to the printer 3.

Specifically, according to the embodiment, when the first timeout period T1 is 10 seconds or more, the second timeout period T2 is calculated as 10 seconds less than the first timeout period T1 (i.e., T2=T1-10). When the first timeout period T1 is less than 10 seconds, the second timeout period T2 is one second less than the first timeout period (i.e., T2=T1-1).

In S2355, the managed PC 1 obtains the status of the transmission port. The actual operation in S2355 depends on the type of the transmission port. For example, when the transmission port is a parallel port, the busy/ready status is obtained based on the busy signal, and when the transmission port is a USB port, the busy/ready status thereof is obtained based on the FLT and SLCT of IEEE1284 status.

After the status of the transmission port is obtained, the managed PC 1 determines whether the data can be transmitted (S2357). When the data can be transmitted (S2357: YES), the managed PC 1 transmits data to the print spooler 123. That is, process transmits the PJL command obtained in S2305 to the print spooler 123. Then, the print spooler 123 receives the PJL command, and store the received PJL command as a print job in the queue 131. When the print spooler stores the PJL command as a print job, a job ID, which is managed by the print spooler 123, is assigned.

The print spooler 123 determines the order of processing the print jobs in the queue 131 based on the stored order of the print jobs and priority set to each print job. Then, in accordance with the thus determined order, the print data included in the print jobs are transmitted to the printer 3 via the designated transmission port (i.e., printer I/F 115). When a plurality of print jobs are stored in the queue 131, before a currently processed print job is finished, the later order print jobs will not be processed.

According to the second embodiment, when the number of print jobs in the queue 131 is equal to or less than N (and N is zero in this example), the first reading/DB registering procedure shown in FIG. 9 is executed, and in S2307 of the first reading/DB registering procedure, the transmission procedure shown in FIG. 10 is executed. Therefore, it is highly likely that the print job the print spooler 123 stores the queue 131 in S2359 is executed immediately (i.e., at the highest priority). Further, in S2355-S2357, the status of the transmission port is obtained, and only when the port is ready (i.e., not busy), process proceeds to S2359. Therefore, a condition where the print spooler 123 cannot start data transmission due to the (busy) status of the transmission port will hardly occur. In summary, in most cases, the PJL command transmitted to the print spooler 123 in S2359 is immediately transmitted to the printer 3 via the transmission port.

After S2359 is finished, the managed PC 1 determines whether data output from the print spooler 123 is finished (S2361). Specifically, process obtains, from the print spooler 123, the job IDs of all the print jobs stored in the queue 131, and checks whether job ID of the print job which has been stored in the queue 131 in S2359 remains. When no job ID remains (S2361: YES), the managed PC 1 determines that the data output operation has been finished. When one of more job ID remain (S2361: NO), process determines the data output has not been finished.

When the data output has been finished (S2361: YES), the transmission is succeeded, and the procedure shown in FIG. 10 is terminated. When data output has not been finished (S2361: NO), process determines whether the second timeout period T2 has elapsed since process executed S259. When the second timeout period T2 has not elapsed (S2363: NO), process returns to S2361. Thus, steps S2361 and S2363 are repeated until the data output is finished or the second timeout period T2 has elapsed.

During the repetition of steps S2361 and S2363, when the data output is finished (S2361: YES), the transmission is successful and the transmission procedure is terminated.

When the second timeout period T2 has elapsed (S2363: YES) during the repetition of steps S2361 and S2363, the managed PC 1 cancels the data output by the print spooler 123 (S2365). Specifically, process instructs the print spooler 123 to cancel the print job, which the print spooler 123 stored in the queue 131 in S2359. If necessary, at this stage, process also instructs the transmission port and the printer 3 to cancel the print job.

As above, by canceling the print job when the second timeout period T2 has elapsed, the print job is cancelled before the first timeout period has elapsed even though the print job cannot be processed some reason. If the second timeout period T2 is not introduced, and when the first timeout period T1 elapses, an error message is output from the transmission port (i.e., printer I/F function module 121), which is provided by the OS. However, by introducing the second timeout period T2 as above, the print job is cancelled before the first timeout period elapses, and therefore, the error message will not be output. That is, by S2363-S2365, the error message (or error dialogue) the OS is to display, as standard setting, on the display unit 13 can be avoided beforehand. With such a configuration, it becomes possible not to cause uneasy feeling to the user who does not know the print job created by a background procedure.

According to the embodiment, when the print job is cancelled (S2365), retry of the print job is executed ten times. Specifically, when then number of retries is less than ten (S2367: YES), process returns to S2355. In this case, a print job same as one cancelled in S2365 is re-entered in the queue 131 in S2359. If the print spooler 123 can finish the data output with respect to the re-entered print job (S2361: YES), the transmission successfully finishes, and the transmission procedure shown in FIG. 10 is terminated. When the number of retries reaches 10 (S2367: NO), then the error message (or error dialogue) is displayed on the display unit 13, and the user is required to input an instruction (S2369).

In S2369, the user can select one of "Skip", "Cancel" and "Retry" by operating the input unit 12. When the user selects "Skip" or "Cancel", the transmission is finished unsuccessfully, and the procedure shown in FIG. 10 is terminated. When the user selects "Retry", process returns to S2355. In this case, similar to the above, a print job same as one cancelled in S2365 is re-entered in the queue 131 in S2359. If the print spooler 123 can finish the data output with respect to the re-entered print job (S2361: YES), the transmission successfully finishes, and the transmission procedure shown in FIG. 10 is terminated.

In the description above, it is assumed process determines in S2355 that the transmission port is ready (S2357: YES). There could be a case where the transmission port is busy (S2357: NO). In this case, a retry is executed 60 times. Specifically, when the number of retries is less than 60 (S2381: NO), process returns to S2355 after 10-second pause (S2383). Thus, the status of the transmission port is checked 60 times at every 10 seconds. During this repetitive check, if the transmission port turns to "Ready", process proceeds from S2357 to S2359. If the number of the retries reaches 60 (S2381: NO), process proceeds to S2369, then aforementioned operation is executed.

When the steps S2351-S2383 are finished, step S2307 in FIG. 9 is finished. The result of the transmission procedure (S2307) is one of "successful", "failure (skip)" and "failure (cancel)".

In S2308, the managed PC 1 determines whether the transmission was successful. When the transmission was successful (S2308: YES), process proceeds to S2309, where the information (i.e., the printer information) transmitted from the target printer is received (S2309). The procedure in S2309 is to execute a readback of the printer information that is returned from the printer at the managed PC 1. Specific procedure may be different depending on the type of the target printer. For example, when the target printer is connected through the parallel I/F, the printer information obtaining module 124 checks presence/absence of the information to be returned to the managed PC 1 through the printer I/F function module 121 provided by the OS, and when the information is available, it is received. When the target printer is connected through the USB I/F, the printer information obtaining module 124 firstly receives the information through the printer I/F function module 121 of the OS, and when the information amount is zero, the reception of the information is repeated.

It should be noted that in either case, some data is received finally. When the data is received, process determines whether the received data is effective (S2311). When the data is not effective (S2311: NO), step S309 is re-executed. When the data is effective (S2311: YES), the printer information received from the printer is stored in the DB (i.e., the result recording file 133).

Steps S2305-S313 are repeated until all the commands are processed. During the repetition of S2305-S2313, in S2305, a plurality of commands recorded in the command file is extracted one by one. When all the commands extracted in S2305 are processed (i.e., transmitted to the printer), process determines that all the commands have been processed (S2315: YES). As a result, in the DB defined in the auxiliary storage unit 14 (the result recording file 133), information of replies to all the commands requesting the target printer is stored. Thereafter, the exclusive access control with respect to the target printer is finished (S2317), process closes the target printer (S319), and the procedure shown in FIG. 9 is finished.

When the transmission procedure was finished unsuccessfully (S2308: NO), error information indicating the failure of transmission in the result recording file of the DB (S2331). The command referred to when the error information is written is the PJL command extracted in S2305.

When "Skip" was selected in S2371 of FIG. 10 (S2333: Skip), process proceeds to S2315. As a result, until all the commands are processed (S2315: NO), steps S2305-S2313 are repeated. Accordingly, only the command(s) failed to be processed is skipped, and the all the commands are processed one by one.

When "Cancel" was selected in S2371 of FIG. 10 (S2333: Cancel), process proceeds to S2317. Then, the exclusive access control is finished (S2317), the target printer is closed (S2319) and the procedure shown in FIG. 9 is terminated. Therefore, in this case, all the commands after the command failed to be processed will not be processed.

When steps S2301-S2319 have been finished, which means S215 of FIG. 4 has been finished, and process proceeds to S201 (FIG. 4). When the number of the jobs counted in S211 exceeds the set value N (S213: NO), process does not execute S215 and returns to S201.

As described above, according to the second embodiment, the managed PC 1 firstly determines whether the print spooler 123 is capable of transmitting data to the printer immediately if the data to be output is sent to the print spooler 123 (S2355-S2357). Only when it is determined that the data can be transmitted to the printer 3 immediately, the managed PC 1 executes S2359 to provide the PJL command requesting for the printer information to the print spooler 123.

With the above configuration, the managed PC 1 does not transmit the PJL command to the print spooler 123 when the print spooler 123 is in a condition where it cannot transmit the data to the printer 3. Accordingly, the PJL command transmitted to the print spooler 123 is transferred to the printer 3 immediately, and the print job (i.e., the PJL command) immediately disappears from the queue 131. Thereafter, the managed PC 1 executes steps S309-S311 to receive a reply to the PJL command and obtains the printer information.

Further, the managed PC 1 executes steps S209-S213 to obtain the number of print jobs stored in the queue 131, and when the obtained number is zero, the managed PC 1 executes S215. That is, when the number of print jobs in the queue 131 is zero, the PJL command is provided to the print spooler 123. When another print job is stored in the queue 131, the PJL command will not be transmitted to the print spooler 123. Therefore, PJL command transmitted to the print spooler 123 is transferred to the printer 3 immediately and the print job (i.e., the PJL command) immediately disappears from the queue 131.

According to the information management system, a print job that is unfamiliar to the user will not remain in the queue 131, and thus will not cause uneasy felling to the user.

According to the second embodiment, the managed PC 1 determines whether the print spooler 123 has finished transmitting the PJL command to the printer 3 when the second timeout period T2 has elapsed since the PJL command was transmitted to the print spooler 123 (S2361-S2363). When the PJL command has been transmitted to the printer 3, the managed PC 1 can receive a reply to the PJL command and obtain the printer information (S2303-S2311).

When the print spooler 123 has not finished transmitting the PJL command to the printer 3, the managed PC 1 instructs the print spooler 123 to delete the print job including the PJL command from the queue 131. With this configuration, even if the PJL command has not been transmitted to the printer 3, it is deleted from the queue 131 when the second timeout period T2 has elapsed since the print job including the PJL command was added to the queue 131.

As above, according to the information management system according to the second embodiment, when the second timeout period T2 has elapsed, the unknown print job, which may bother the user or cause uneasy feeling to the user, will not remain in the queue 131.

According to the embodiment, the second timeout period T2 is shorter than the first timeout period T1 which is referred to for detecting a transmission error of the transmission port. Therefore, even if the managed PC 1 is configured to notify an error upon elapse of the first timeout period T1, the error will not be notified since the print job (i.e., PJL command) which has not been transmitted to the printer 3 is deleted upon elapse of the second timeout period T2. Accordingly, the system will not bother the user or cause the uneasy feeling to the user.

Further, even when S2365 is executed, process returns to S355 for retry by 10 times. Therefore, when the PJL command is deleted from the queue 131, the managed PC 1 is capable of provide the same PJL command to the print spooler 123 again. Accordingly, when the print spooler 123 is unable to output data to the printer 3 temporarily for some reason and, under such a situation, the PJL command is deleted from the queue 131, if the condition is changed later and it becomes possible for the print spooler to transmit data to the printer 3, the PJL command can be transmitted to the printer 3 and the printer information can be obtained.

The managed PC 1 repeats the deletion of the PJL command from the queue 131 and re-enter of the PJL command in the queue 131 by ten times. After the ten retries, there still remains a problem and the PJL command cannot be transmitted to the printer 3, the manage PC 1 notifies the occurrence of an error to the user (S2369). If the error is notified without retry, it may be bothersome for the user. If the retry is repeated but the PJL command is not transmitted to the printer 3, it may be necessary to check the status of various devices. If the error is not notified and the only the retry is repeated, the user may not recognize the necessity to check the devices. According to the second embodiment, the error is notified to the user, which is not bothersome but at an appropriate timing.

In the information management system according to the second embodiment, the managed PC 1 processes a plurality of commands one by one (S2305-S2315) so that a plurality of operations the number of which is same as the number of the commands. During the operations, the managed PC 1 provides one PJL command subject to process to the print spooler 123 in S2359. Then, the managed PC 1 executes steps S2361-S2363 to determine whether the print spooler 123 has finished transmitting the PJL command to the printer 3. When it is determined that the transmission has been finished, the managed PC 1 executes step S2309-S2311 to receive the reply to the PJL command and obtains the printer information. When it is determined that the transmission has not been finished, the managed PC 1 executes S2308, S2331, S2333 and the S2317, thereby canceling the operations for the remaining commands. That is, under a condition where the first timeout period T1 elapses for one command, in response to the user's instruction, processing of the commands including the PJL command can be cancelled.

Therefore, after the first timeout period T1 has elapsed, when the user performs a canceling operation in S2369, the repeated procedure of the commands will not be continued. Thus, when the output from the print spooler 123 to the printer 3 cannot be performed, processing of a plurality of PJL commands will not be performed, and thus a plurality of print jobs including the PJL commands will not be stored in the queue 131. That is, when the print spooler 123 cannot transmit data to the printer 3, it becomes possible to prevent unknown print jobs (including the PJL commands) from being accumulated in the queue 131. Accordingly, the user will not be bothered or caused to have uneasy feelings by the unknown print jobs.

Alternatively, in S2369, the user can select to skip an operation for currently processed command. In this case, process proceeds from S2333 to S2315, and then S2305, thereby processing the remaining PJL commands.

As above, when an error occurs, the user need not to cancel all the remaining (unprocessed) PJL commands, but skip the operation of the PJL command when the error occurs, and continue the processing of the remaining PJL commands.

The above-described second embodiment is only an exemplary embodiment, and can be modified in various ways.

For example, in the second embodiment, as an example of an imaging device, a single function printer 3 supporting the PJL command is shown. However, the imaging device need not be limited to the single function printer. Another configuration, for example, a MPF (multifunction peripheral) having a facsimile function, copier function and image scanner function as well as the printer function can be used as the imaging device, given that the device is compliant with the PJL command.

In the second embodiment described above, the managed PC 1 obtains the printer information from the printer 3 and transmits the obtained information to the managing PC 2, which manages the printer information obtained from all the managed PCs 1, 1a, 1b, . . . . The configuration may be employed in a system where the managed PC 1 itself manages the printer information obtained from the local printer 3.

In the second embodiment, the number of print jobs stored in the queue 131 is obtained, and when the number of the print jobs is zero, step S215 is executed. This may be modified such that, when the number of the print jobs in the queue 131 is not zero, set the existing jobs into PAUSE condition, and then step S215 is executed. Alternatively, the procedure may be modified such that lower priorities are assigned to other print jobs and the highest priority is assigned to the PJL command, and then step S215 is executed. By modifying the configuration, even if the number of the print jobs in the queue is not zero, the PJL command can be output from the print spooler earlier than other print jobs.

Third Embodiment

Next, an information management system according to a third embodiment will be described.

The system configuration of the information management system according to the third embodiment is similar to that of the first embodiment shown in FIG. 1, and therefore, description of the same is omitted.

The managed PC 1 according to the third embodiment includes, as shown in FIG. 1, a main body unit 11 which includes a control unit 101 provided with the CPU 111, the ROM 112 and the RAM 113, and an I/F (interface) unit 102 that connects the control unit 101 with various devices, an input unit 12 including a keyboard and a pointing device, a display unit 13 including a display device, and an auxiliary storage unit 14 having a hard disk.

The main body unit 11 is implemented with Windows® as an OS (operating system) which is run by the CPU 111. Functions shared by a plurality of applications, such as a printer I/F function module 121, a LAN I/F function module 122 and a print spooler 123 are composed of software modules, which are implemented as parts of the OS. The OS also provides an input/output function, which includes input through input unit 12, output to the display unit 13 and a management function, which includes management of resources (e.g., a hard disk and a memory).

It should be noted that, if the similar functions can be realized, another OS (e.g., Linux®, MacOS®) may be implemented. In the following description, as an example of the OS, Windows® is employed in the managed PC 1.

The I/F unit 102 of the main body unit 11 includes, besides the I/F for the input unit 12, display unit 13 and auxiliary storage unit 14, a LAN I/F (e.g., a LAN card) 114, and a printer I/F 115 (e.g., a USB port or a parallel port). The managed PC 1 is connected to the LAN through a LAN cable that is connected to the LAN I/F 114. Further, the managed PC 1 is connected with the printer 3 through a printer cable that is connected to the printer I/F 115.

The managed PC 1 is implemented with software which obtains the printer information from the printer 3, and transmits the printer information to the managing PC 2. The software operates as a printer information obtaining module 124, which runs on the CPU 111.

The other managed PCs 1*a*, 1*b*, ... have the similar configurations as the managed PC 1, and description thereof is omitted.

The managing PC 2 has the similar structure to the managed PC 1. Similarly to the first embodiment, the managing PC 2 has a main body unit 21, an input unit 22, a display unit 23 and an auxiliary storage unit 24, which correspond to the main body unit 11, input unit 12, display unit 13 and auxiliary storage unit 14 of the managed PC 1, respectively. The main body unit 21 is implemented with Windows® system as the OS. It should be noted that, if the similar functions can be realized, another OS (e.g., Linux®, MacOS®) may be implemented. In the following description, as an example of the OS, Windows® is employed in the managing PC 2.

The managing PC 2 is implemented with managing software, which requests the managed PCs 1, 1*a*, 1*b*, . . . , which are on the network, for printer information (e.g., status/maintenance information) of the printers 3, 3*a*, 3*b*, . . . which are connected to the managed PCs 1, 1*a*, 1*b*, . . . , respectively, and manages the printer information transmitted by the managed PCs 1, 1*a*, 1*b*, . . . centrally.

The printers 3, 3*a*, 3*b*, . . . are managed printers which are subject to be managed by the managing PC 2. Each of the printers 3, 3*a*, 3*b*, . . . is compliant with the PJL (Printer Job Language).

Figure 11:
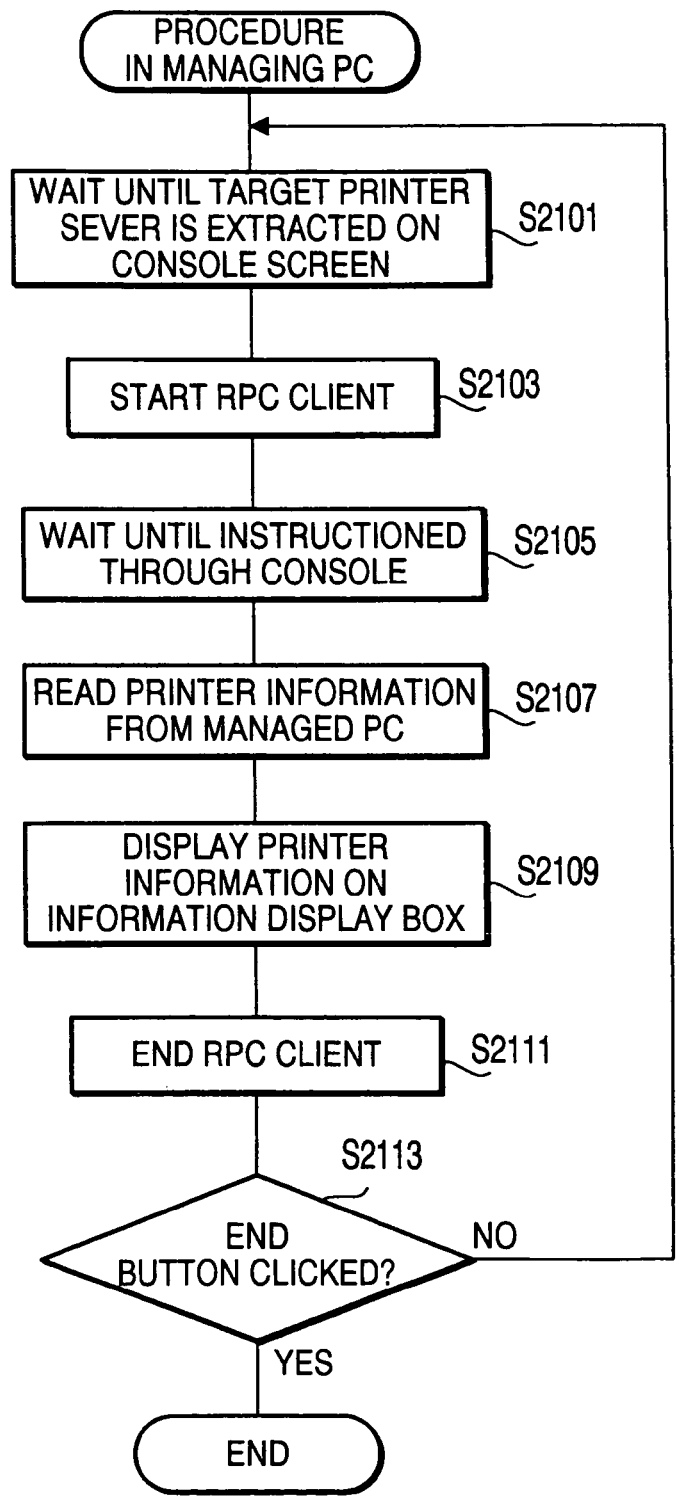
FIG. 11 is a flowchart illustrating a main procedure of the managing PC.

FIG. 11 is a flowchart illustrating a managing PC side procedure executed by the managing PC 2. This procedure is initiated, for example, when an operator performs a predetermined operation.

In S2101, the managing PC 2 waits until a target printer sever is selected, by the operator, on a consol screen. Specifically, process displays a consol image 41 as shown in FIG. 12 on the display unit 23 and allows the operator to select a printer server displayed thereon.

Figure 12:
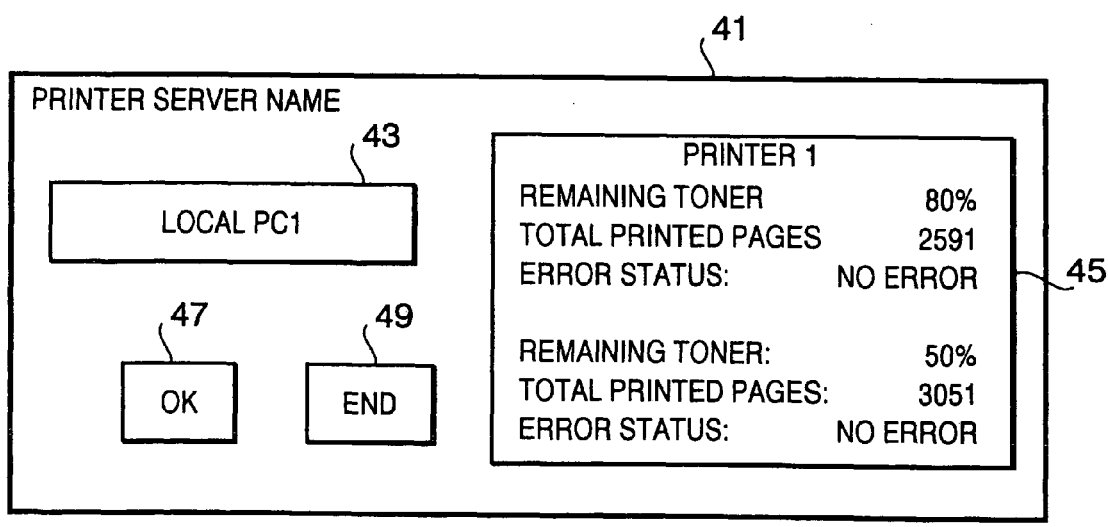
FIG. 12 is a consol image displayed on the managing PC.

As shown in FIG. 12, the consol image 41 shows a printer server name input field 43, a printer information display field 45, an OK button 47 and an end button 49. The printer server name input field 43 shows a list of selectable print servers with a dropdown menu, allowing the operator to select one of the listed printer servers. Specifically, on the list, server names respectively assigned to the managed PCs 1, 1*a*, 1*b* . . . . When the operator operates to select one of the listed server names, which is displayed in the printer server name input field 43, process proceeds to the next step.

The managing PC 2 starts an RPC (Remote Procedure Call) client (S2103). The RPC is a technology which enables certain software (i.e., RPC client) running on a certain computer to call and execute a function provided by particular software (i.e., RPC server) running on another computer on the network.

According to the third embodiment, the RPC client runs on the managing PC 2, while the RPC server runs on each of the managed PCs 1, 1*a*, 1*b*, . . . . With this configuration, the managing PC 2 is capable of remotely managing the managed PCs 1, 1*a*, 1*b* . . . .

In S2105, process waits until an instruction is made on the consol. That is, when the operator instructs, for example, by clicking the OK button 47 on the consol image 41 using the pointing device such as a mouse (or depresses short-cut keys realizing the similar operation), process proceeds to S2107.

In S2107, the managing PC 2 retrieves the printer information form the managed PC as selected. Specifically, the managing PC 2 makes use of the RPC client function described above and executes an RPC with respect to the managed PC, thereby requesting the managed PC for the printer information.

On the managed PC, the RPC server is running, and when a call (RPC) is made by the managing PC 2, the managed PC obtains the printer information from the printer, and provides the obtained printer information to the managing PC 2 as a return value. The thus transmitted printer information is retrieved by the managing PC 2. The operation of the managed PC will be described in detail later.

In S2107, one of the managed PCs 1, 1*a*, 1*b* . . . selected in S2101 is regarded as the target managed PC. The printer information is obtained from all the printers locally connected to the target PC. In the example shown in FIG. 1, each of the managed PCs 1, 1*a*, 1*b* . . . is connected with one printer (3, 3*a*, 3*b* . . . ). Therefore, the following description is made based on this configuration. However, as mentioned above, to each managed PC, a plurality of printers may be connected. In such a case, the printer information is obtained from all the printers connected to the target PC.

After the printer information is obtained, the printer information is displayed in the printer information display field 45 in the consol image 41 (S2109).

When the operator clicks the end button 49 on the consol image 41 (S2113: YES), the RPC client is terminated. If the end button 49 is not clicked, process returns to S2101, and waits for selection of another target PC (printer server).

While the procedure shown in FIG. 11 is executed in the managing PC 2, a managed PC side procedure is executed in each of the managed PCs 1, 1*a*, 1*b* . . . .

Figure 13:
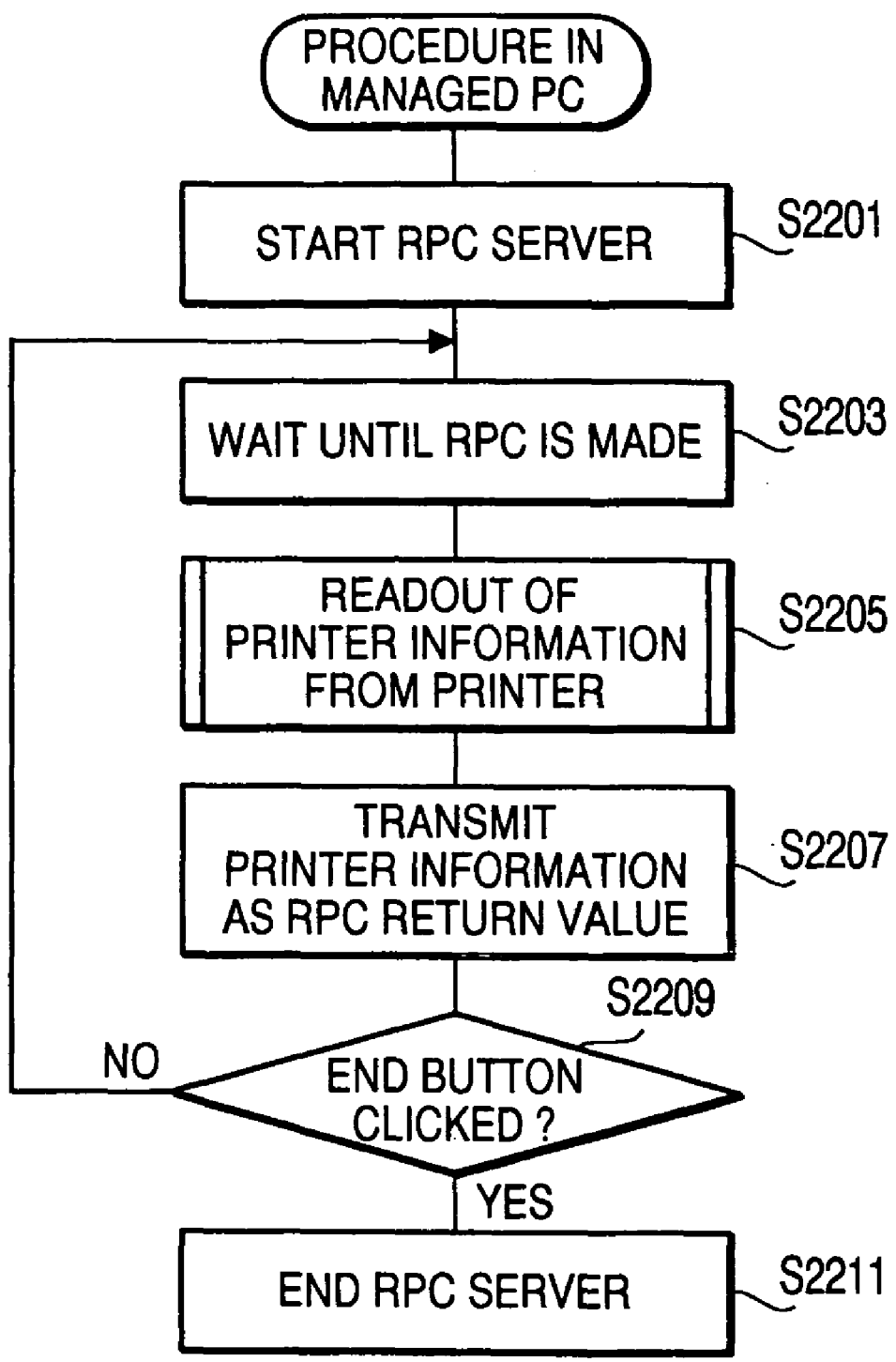
FIG. 13 is a flowchart illustrating the managed PC side procedure executed in each managed PC.

FIG. 13 is a flowchart illustrating the managed PC side procedure executed in each managed PC (1, 1*a*, 1*b* . . . ). It should be noted that, since the same procedure is executed in each managed PC, a case where the managed PC side procedure is executed in the managed PC 1 will be described below.

The managed PC side procedure shown in FIG. 13 is regularly executed by the printer information obtaining module 124 of the managed PC 1. The printer information obtaining module 124 may be configured to operated when the managed PC is powered ON, and keeps running as a residual process. Alternatively, the printer information obtaining module 124 may automatically start to operate when at least one of the printers locally connected to the managed PC 1 becomes available.

When the managed PC side procedure is started, the printer information obtaining module 124 starts the RPC server (S2201), and waits until the RPC is received from the managing PC 2 (S2203). As aforementioned, the RPC is used, in the third embodiment, to realize a remote management of the managed PC 1 from the managing PC 2. When step S2107 of FIG. 11 is executed, the managed PC 1 receives the RPC call from the RPC client of the managing PC 2. As described above, when the RPC is received from the managed PC, the printer information is to be transmitted to the managing PC 2.

Figure 14:
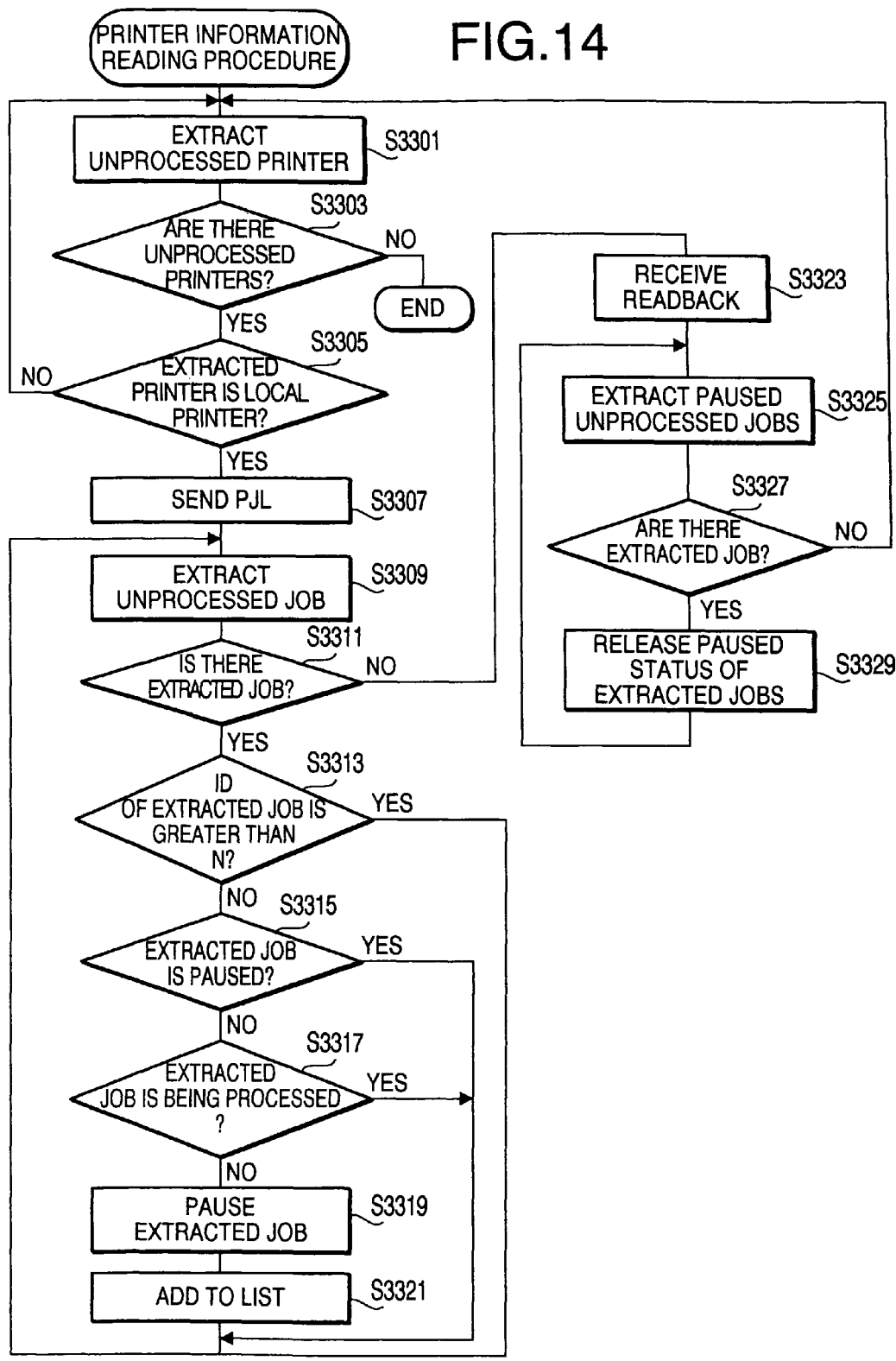
FIG. 14 is a flowchart illustrating a printer information retrieving procedure, which is a subroutine called in the flowchart shown in FIG. 12.

When the managed PC 1 receives the RPC from the managing PC 2, the printer information obtaining module 124 executes a procedure for retrieving printer information from the local printer (S2205), which is shown in FIG. 14.

FIG. 14 is a flowchart illustrating a printer information retrieving procedure, which is a subroutine called in S2205 of FIG. 13.

When the printer information retrieving procedure is started, the printer information obtaining module 124 extracts non-processed printers (S3301). The non-processed printers are printers, among all the local printers connected to the managed PC 1, which have not yet been treated as target printers in the printer information retrieving procedure. If there is at least one non-processed printer, the non-processed printer is extracted as the target printer, from which the printer information is obtained.

When a non-processed printer is extracted (S3303: YES), process determines whether the extracted printer is a local printer (S3305). When the extracted printer is not a local printer (S3305: NO), process returns to S3301. When the extracted printer is a local printer (S3305: YES), process proceeds to S3307. By executing steps S3303 and S3305, it is ensured that process proceeds to S3307 only when a local non-processed printer is extracted. That is, non-local printers such as a network printer is not processed. When all the non-processed local printers have been processed (S3303: NO), the printer information retrieving procedure is terminated.

In S3307, the printer information obtaining module 124 executes a PJL transmission process. The PJL transmitted in S3307 may include a command for investigating the remaining amount of the toner or ink, a command for investigating the remaining amount of a recording sheet, a command for investigating the exchange term of the drum and the like. The PJL commands as above are stored in a command file in the auxiliary storage unit 14.

Specifically, the PJL transmitting process in S3307 is executed as follows. The printer information obtaining module 124 reads out a PJL command from the command file 132, and transmits the command to the printer 3. Therefore, the PJL command is transmitted to the print spooler 123. Accordingly, when the S3307 is executed, the PJL command is added in the queue 131 as one of print jobs. It should be noted that even though the PJL command is added to the queue 131 as the print job, it will no be output to the printer 3 immediately. In particular, there are some print jobs, which are previously transmitted to the print spooler 123, such print jobs are included in the queue 131. Since the print spooler 123 processes the print jobs in the queue 131 in the stored order, it may take relatively long time until the PJL command is transmitted to the printer 3.

In order to deal with the above problem, according to the third embodiment, the order of the PJL command in the queue 131 is changed by executing steps following S3307.

In S3309, the printer information obtaining module 124 extracts a non-processed job in the queue 131. As schematically illustrated in FIG. 15A, there are plurality of print jobs in the queue 131. Each print job in the queue is assigned with an ID (job ID). The ID is a number which is greater for the job added to the queue later, but returns to zero when the number becomes relatively large (cyclic ID number). In S3309, from among the print jobs stored in the queue 131, one print job is extracted from the greater ID side.

When no print job is extracted in S3309 (S3311: NO), which means the PJL command has been transmitted to the printer 3, process proceeds to S3323.

When a print job is extracted in S3309 (S3311: YES), process determines whether the ID of the extracted print job is one assigned later than the ID of the PJL command (S3313). When a print job is put into the queue, the queue assigns the ID, and returns the assigned ID to a process which put the print job in the queue. Therefore, based on the IDs, the order of the print jobs in the queue can be determined. Specifically, given that the ID of the PJL command is "N", process determines whether the ID of the extracted print job is greater than N, taking the cyclic change of the ID into account in S3313.

When the ID of the extracted print job is greater than "N" (S3313: YES), the extracted job was added to the queue 131 after the PJL command was added. Such a print job is not subject to the order change operation, and process simply returns to S3309. In such a case, the previous job in the queue 131 is extracted in S3309, and process proceeds to S2311.

When the ID of the extracted job is not greater than "N" (S3313: NO), process determines whether the extracted job is in PAUSE status (S3315). When the print job is in the PAUSE status, it is set so by some reason (e.g., by the setting of the operator), and the job will not be transmitted to the printer 3. Such a job is excluded from the subject for the order changing operation, and process returns to S3309.

When the extracted job is not in the PAUSE status (S3315: NO), process determines whether the extracted job is currently printed (S3317). When the job is currently printed (S3317: YES), the job is not subjected to the order changing operation, and process returns to S3309.

When the extracted job is not currently printed (S3317: NO), process instructs the print spooler 123 to set the extract print job in the PAUSE status (S3310). Then, the extract print job becomes in the PAUSE status. The ID of the extracted print job is added to a list (S3321), and process returns to S3309. FIG. 15B schematically shows an example of the list to which the IDs of the extracted print jobs are recorded.

The above-described procedure in steps S3309-S3321 are repeated as far as the non-print job is extracted in S3309. For example, the queue 131 includes the print jobs as exemplified in FIG. 15A, the print job is extracted one by one from one having the larger ID (i.e., N+2). For the first two print jobs whose IDs are N+2 and N+1, since they have been added to the queue 131 after the PJL command (ID=N), they are not subjected to the order exchange operation. For the print jobs whose IDs are N−1, N−2 and N−3, these are extracted in this order, set to PAUSED status, and the IDs are registered with the list as shown in FIG. 15B. The print job currently being printed (ID=N−4) is not subjected to the order exchange operation since it is printed. After the print job (ID=N−4) is extracted, non-processed job will not be extracted in S3309, and process proceeds from S3311 to S3323.

As a result of execution of S3309-S3321, the jobs, whose IDs are N−1, N−2 and N−3, which were added in the queue 131 before the PJL command was added to the queue 131 are brought into the PAUSE status. Therefore, when the job (ID=N−4) is finished, the PJL command is processed.

When process proceeds to S3311 to S3323, the printer information obtaining module 124 receives the readback data from the printer 3, thereby obtaining the printer information of the printer 3 (S3323). It should be noted that the readback is not transmitted from the printer 3 until the print spooler 123 transmits the PJL command to the printer 3. Therefore, in S3323, process repeatedly attempts to receive the readback data from the printer 3 until the readback is received.

After the printer information is obtained in S3323, process extracts PAUSE-status jobs whose IDs are registered in the list (cf. FIG. 15B) in S3321 one by one (S3325), and instructs the print spooler 123 to release the PAUSE status thereof (S3329) so that the print job is executed. When the PAUSE-status of a print job is released, process returns to S3325, and the steps S3325-S3329 are repeated until all the PAUSE-status jobs are processed. It should be noted that, in this procedure of releasing the PAUSE status, the job having a smaller ID is processed earlier so that the print jobs are executed in the ascending order the IDs. When all the PAUSE-status job have been processed (S3327: NO), process returns to S3301. By the above procedure, the target local printer extracted at S3305 has been processed.

By repeating S3301-S3329, all the printers which can be used by the managed PC 1 are processed. Among them, for the local printers, steps S3307-S3329 are executed, and the printer information of all the local printers is obtained. When all the printers are processed (S3303: NO), the printer information retrieving procedure shown in FIG. 14 is terminated.

Completion of steps S3301-S3329 in FIG. 14 is completion of S2205 of FIG. 13. Next, the managed PC 1 transmits the printer information to the managing PC 2 as RPC return value (S2207). The printer information transmitted in S2207 includes all the printer information obtained in S2205. The print information is received by the managing PC 2 in S2107 (see FIG. 11), as mentioned above.

The procedure shown in FIG. 13 is preferably executed regularly. Normally, the operator would not click the end button 49, and process returns from S2209 to S2203, where process waits until another RPC is received. According to the embodiment, however, an interface for allowing the operator to click the end button 49. In such a case (S2209: YES), the RPC server is terminated (S2211), and the procedure shown in FIG. 13 is terminated.

As described above, in the imaging device information management system according to the third embodiment, information including a PJL command is added to the queue 131, making use of the print spooler 123, and transmits the PJL command to the printer, thereby requesting the printer to send the printer information. When the queue includes a plurality of print jobs which are added prior to the PJL command, process instructs the print spooler 123 to execute the order changing operation so that the PJL command is transmitted prior to other print jobs.

In response to the instruction, the print spooler 123 changes the order of the print jobs so that the PJL command is processed prior to the print jobs previously added to the queue 131. As a result, the printer information can be obtained quickly, and can be provided to the managing PC 2.

Therefore, in comparison with a system which merely processes the print jobs in the queue one after another, the printer information can be obtained from the printer quickly, and thus transmit the same quickly to the managing PC.

Fourth Embodiment

Next, an information management system according to a fourth embodiment will be described.

The fourth embodiment is similar to the third embodiment except for the printer information retrieving procedure of the third embodiment (FIG. 14) is replaced with a procedure shown in FIG. 16. Therefore, for the fourth embodiment, the printer information retrieving procedure will be described referring to FIG. 16, and the other description will be omitted.

In the fourth embodiment, when the printer information retrieving procedure (FIG. 13; S2205) is started, the printer information obtaining module 124 extracts non-processed printers (S3401). If there is at least one non-processed printer, the non-processed printer is extracted as the target printer, from which the printer information is obtained.

When a non-processed printer is extracted (S3403: YES), process determines whether the extracted printer is a local printer (S3405). When the extracted printer is not a local printer (S3405: NO), process returns to S3401. When the extracted printer is a local printer (S3405: YES), process proceeds to S3407. By executing steps S3403 and S3405, it is ensured that process proceeds to S3407 only when a local non-processed printer is extracted. That is, non-local printers such as a network printer is not processed. When all the non-processed local printers have been processed (S3403: NO), the printer information retrieving procedure is terminated.

In S3407, the printer information obtaining module 124 executes a PJL transmission process. The PJL transmitted in S3407 may include a command for investigating the remaining amount of the toner or ink, a command for investigating the remaining amount of a recording sheet, a command for investigating the exchange term of the drum and the like. The PJL commands as above are stored in a command file in the auxiliary storage unit 14. According to the fourth embodiment, each print job is given a priority, and the PJL command is given a priority of 99.

The priority is set for each print job by calling an API (Application Program Interface) to instruct the print spooler 123, within a range of 1-99. The priority is referred to in the internal process of the print spooler 123, and based on the priority and a timing when the print job is added to the queue 131, the print spooler 123 determines the order of the print jobs to be processed.

In S3409, the printer information obtaining module 124 extracts a non-processed job in the queue 131.

When no print job is extracted in S3409 (S3411: NO), which means the PJL command has been transmitted to the printer 3, process proceeds to S3423.

When a print job is extracted in S3409 (S3411: YES), process determines whether the ID of the extracted print job is one assigned later than the ID of the PJL command (S3413). Specifically, given that the ID of the PJL command is "N", process determines whether the ID of the extracted print job is greater than N, taking the cyclic change of the ID into account in S3413.

When the ID of the extracted print job is greater than "N" (S3413: YES), the extracted job was added to the queue 131 after the PJL command was added. Such a print job is not subject to the order change operation, and process simply returns to S3409. In such a case, the previous job in the queue 131 is extracted in S3409, and process proceeds to S3411.

When the ID of the extracted job is not greater than "N" (S3413: NO), process determines whether the extracted job currently printed (S3417). When the extracted job is currently printed (S3417: YES), process proceeds to S3409. When the extracted job is not currently printed (S3417: NO), process instructs the print spooler 123 to set the priority of the extract print job to one (S3419). Then, the priority of the extract print job becomes one. The ID of the extracted print job and the priority thereof are added to a list (S3421), and process returns to S3409. FIG. 17B schematically shows an example of the list to which the IDs and priorities of the extracted print jobs are recorded.

The above-described procedure in steps S3409-S3421 are repeated as far as the non-print job is extracted in S3409. For example, the queue 131 includes the print jobs as exemplified in FIG. 17A, the print job is extracted one by one from one having the larger ID (i.e., N+2). For the first two print jobs whose IDs are N+2 and N+1, since they have been added to the queue 131 after the PJL command (ID=N), they are not subjected to the order exchange operation (priority setting operation). For the print jobs whose IDs are N−1, N−2 and N−3, these are extracted in this order, given the priority of one, and the IDs and the priorities are registered with the list as shown in FIG. 17B. The print job currently being printed (ID=N−4) is not subjected to the order exchange operation since it is printed. After the print job (ID=N−4) is extracted, non-processed job will not be extracted in S3409, and process proceeds from S3411 to S3423.

As a result of execution of S3409-S3421, the jobs, whose IDs are N−1, N−2 and N−3, which were added in the queue 131 before the PJL command was added to the queue 131 are given the priority of one. Therefore, when the job (ID=N−4) is finished, the PJL command, whose priority is 99, is processed prior to the other print jobs.

When process proceeds to S3411 to S3423, the printer information obtaining module 124 receives the readback data from the printer 3, thereby obtaining the printer information of the printer 3 (S3423). It should be noted that the readback is not transmitted from the printer 3 until the print spooler 123 transmits the PJL command to the printer 3. Therefore, in S2323, process repeatedly attempts to receive the readback data from the printer 3 until the readback is received.

After the printer information is obtained in S3423, process extracts priority-unrestored jobs whose IDs are registered in the list (cf. FIG. 17B) in S3421 one by one (S3425), and instructs the print spooler 123 to restore the priorities thereof (S3429) so that the print job is executed in accordance with its original priority (before it was changed in S3419). When the priority of the print job is restored, process returns to S3425, and the steps S3425-S3429 are repeated until all the priorities of the print jobs are restored. In this procedure of restoring the priorities, it may be preferable that the job having a smaller ID is processed earlier so that the print jobs having the same priority are executed in the ascending order of the IDs. When all the priority-unrestored job have been processed (S3427: NO), process returns to S3401. By the above procedure, the target local printer extracted at S3405 has been processed.

By repeating S3401-S3429, all the printers which can be used by the managed PC 1 are processed. Among them, for the local printers, steps S3407-S3429 are executed, and the printer information of all the local printers is obtained. When all the printers are processed (S3403: NO), the printer information retrieving procedure shown in FIG. 16 is terminated.

As described above, in the imaging device information management system according to the fourth embodiment, information including a PJL command is added to the queue 131, making use of the print spooler 123, and transmits the PJL command to the printer, thereby requesting the printer to send the printer information. When the queue includes a plurality of print jobs which are added prior to the PJL command, process instructs the print spooler 123 to execute the order changing operation so that the PJL command is transmitted prior to other print jobs.

In response to the instruction, the print spooler 123 changes the order of the print jobs so that the PJL command is processed prior to the print jobs previously added to the queue 131. As a result, the printer information can be obtained quickly, and can be provided to the managing PC 2.

Therefore, in comparison with a system which merely processes the print jobs in the queue one after another, the printer information can be obtained from the printer quickly, and thus transmit the same quickly to the managing PC.

Fifth Embodiment

An imaging device information management system according to a fifth embodiment will be described. For the sake of brevity, different portions with respect to the third embodiment will be described.

In the second and third embodiments, the PJL command is transmitted to the printer 3 via the print spooler 123. In the fifth embodiment, the PJL command is transmitted to the printer 3 not via the print spooler 123.

FIG. 18 schematically shows a configuration of a spooler system of the managed PC 1. The spooler system includes the print spooler 123, a language monitor 141 and a port monitor 142. When an application 151 operates to print using the print spooler 123, the application 151 outputs print data to the print spooler 123. The print data received by the print spooler 123 is transmitted to a physical layer 152 via the language monitor 141 and the port monitor 142. Then, from the physical layer 152, the print data is transmitted to the printer 3.

In the second and third embodiments, the PJL command is firstly transmitted to the print spooler 123. Therefore, the PJL command is, like other print data, transmitted to the printer 3 along the route described above. According to the fifth embodiment, the PJL command is not transmitted to the print spooler 123, but directly to the physical layer 152.

In the second and third embodiments, the print data and the PJL command are once stored in the queue and processed sequentially. Therefore, a case where the print data and the PJL command are transmitted to the printer simultaneously would not occur. According to the fifth embodiment, since the PJL command is directly transmitted to the physical layer, such a problem may occur (i.e., the print data and the PJL command may be transmitted to the printer simultaneously), which may cause the printer to malfunction.

To avoid the above problem, according to the fifth embodiment, an exclusive access control is executed in regard to the output of the PJL command and the print data. Specifically, when Windows® is employed as the OS, for example, with use of mutex, a mutual exclusive access control among different processes can be realized.

FIG. 19 is a flowchart illustrating a printer information retrieving procedure executed by the managed PC (1, 1a, 1b, . . . ).

In S3501, process waits until the currently executed print job is finished. Specifically, a mutex assigned with a predetermined name is defined preliminary, and process attempts to obtain the mutex when a certain process is executed. When a print job is being performed, the mutex has been locked. Thus, when the print job is being performed, process fails to obtain the mutex.

When process obtains the mutex, it is determined that the printing using the print spooler 123 is not being performed. Therefore, process executes a PJL transmission procedure (S3502). In S2502, the PJL command is transmitted to the printer 3. However, as described above, the PJL command is not directed to the print spooler 123, but transmitted directly to a printer port provided by a port monitor 142. Then, in S3503, the managed PC receives a readback from the printer 3, and the procedure shown in FIG. 19 is terminated.

In order to realize the exclusive access control, in the language monitor 141, the printing procedure as shown in FIG. 20 is performed. The procedure shown in FIG. 20 is initiated when "StartDocPort", which is one of the API, is called in order for the print spooler 123 to output the print data via the language monitor 141.

When the procedure shown in FIG. 20 starts, the language monitor 141 waits until the printer information retrieving procedure is terminated (S3601). Specifically, process attempts to obtain the mutex which has been preliminarily given a predetermined name. If process fails to obtain the mutex, it is determined that the printer information retrieving procedure shown in FIG. 19 is being executed. Accordingly, in such a case, process waits until the procedure shown in FIG. 19 is finished. At this stage, the print spooler 123 calls "StartDocPort" but does not receive a response and cannot proceed to a succeeding step of outputting the print data, and stays in a standby status.

When process successfully obtains the mutex in S601, it is determined that the printer information retrieving procedure is not being performed. In this case, process executes a procedure similarly to a generally know language monitor. That is, process executes a procedure in accordance with the "StartDocPort" called by the print spooler 123 (S3603), executes a procedure in accordance with "WritePort" (S3605).

When the data transmitted from the print spooler 123 is not finished (S3607: NO), process returns to S3605 and repeats the procedure according to the "WritePort". When the data transmitted from the print spooler 123 is finished (S3607: YES), process executed a procedure in accordance with "EndDocPort" (S3609), and terminates the procedure shown in FIG. 20. Before the termination of the procedure, the obtained mutex is released. It should be noted that procedures according to "StartDocPort", "WritePort" and "EndDocPort" referred to above are well-known procedures, and detailed description will be omitted.

The above-described two procedures (i.e., printer information retrieving procedure and language monitor print data procedure) are executed without being turned into a standby status unless they are executed in parallel. If the two procedures are executed in parallel, one executed earlier is kept proceeding without being turned to the standby state, while the later one is turned into the standby state and waits for completion of the earlier procedure.

FIGS. 21A and 21B show timing charts illustrating the above. In a case shown in FIG. 21A, the language monitor 141 calls the "StartDocPort", in the thread of the print spooler 123, obtains the mutex, executes procedures according to the "StartDocPort", "WritePort" and "EndDocPort" to process the print job. Even if the management program thread (which outputs the PJL command) attempts to execute the printer information retrieving procedure, process should wait until the language monitor 141 releases the mutex.

In a case shown in FIG. 21B, the management program thread (a thread outputting the PJL command) starts the printer information retrieving procedure earlier than the language monitor starts a print job, the thread obtains the mutex, and executed the PJL transmission operation, and the readback reception operation. If the thread of the print spooler 123 calls the "StartDocPort" when the management program thread is executing the printer information retrieving procedure, the thread of the print spooler 123 fails to obtain the mutex, and cannot start the operations corresponding to the "StartDocPort". Accordingly, in this case, unit the mutex is released, the language monitor 141 and the print spooler 123 are brought into the standby status. After the mutex is released, the operations corresponding to the "StartDocPort" are executed, and thereafter, by calling "WritePort" and "EndDocPort", the print job is processed.

As described above, according to the fifth embodiment, the PJL command is transmitted to the printer 3 without routing through the print spooler 123. Therefore, even if there are print jobs in the queue 131, the PJL command can be transmitted to the printer independent of the condition of the queue 131. Accordingly, in comparison with the system which sends the PJL command by way of the print queue, the PJL command can be transmitted to the printer quickly, and thus, the printer information can be obtained and provided to the managing PC quickly.

Further, according to the fifth embodiment, after the language monitor 141 starts outputting data corresponding to one print job, transmission of the request for the printer information to the printer 3 is inhibited until the print job is finished. Therefore, the request for the print information does not interfere the printing operation of the print spooler.

On the other hand, after the request for the printer information is transmitted to the printer, outputting of the print data by the language monitor is inhibited until the printer information is returned from the printer. Therefore, the language monitor does not interfere the request for the printer information, which is transmitted to the printer.

In the fifth embodiment, the information management system is configured such that output of the data from the print spooler to the printer is inhibited when the request for the printer information is transmitted to the printer. The invention needs not be limited to such a configuration, and can be modified in various way. That is, any other concrete measures may be employed for suspending the arrival of the output data of the print spooler to the printer 3. For example, the port monitor 142 may be configured to hold the response to the language monitor 141 so that the output data of the print spooler 123 does not reach the printer 3.

In the third embodiment, the printer information is displayed at the managing PC 2. This may be enhanced such that, by introducing a Web server function in the managing PC 2, the printer information is delivered to client PCs in the form of Web page. Then, in any PC on the network having a browser, the printer information can be viewed.

Sixth Embodiment

In the above-described embodiments and modifications thereof, the printer information to be obtained is not limited and general procedures for obtaining the printer information are described.

The PJL commands are well-known, and various specifications of enhanced/modified commands are used in practice. Such an enhancement is made depending on makers of the imaging device and/or types of the imaging devices. In some cases, there arises a problem in that PJL commands according to one standards may not be supported in imaging devices which are compliant with different standards. That is, depending on the imaging devices from which the information is to be obtained, appropriate PJL commands should be selected and used.

Further, when the desired information is obtained from the imaging devices, the information may be displayed or printer so that the user can view the information, which may include a type of the imaging device and device information updated at the imaging device. However, if the information management system includes a plurality imaging devices of the same type, only by indicating the device types, the user cannot identify individual devices.

The information management system according to the sixth embodiment is advantageous in that the above-described problems are also dealt with. That is, from among various commands, appropriate ones for a target imaging device can be selected and provided. Further, even if a plurality of device of the same type exist, the information management system provides appropriate information so that the user can identify individual imaging devices.

The system configuration of the information management system according to the sixth embodiment is similar to that of the first embodiment shown in FIG. 1. Further, the hardware configuration of the managed PC 1 is substantially similar to that of the first embodiment shown in FIG. 2.

It should be particularly noted that, in the sixth embodiment, the printers 3, 3a, 3b, . . . are configured to return IEEE1284 device IDs to the managed PCs 1, 1a, 1b, . . . , respectively. The IEEE1284 device IDs are defined by IEEE1284 standard for the parallel interface, and defined by USB printer class specification when the interface is the USB.

FIG. 22 is a flowchart illustrating a main procedure of the managed PC 1 according to the sixth embodiment, which is executed by the printer information obtaining module 124. The procedure shown in FIG. 22 is started when the managed PC 1 is powered ON. It should be noted that the procedure is executed in each of the managed PCs 1, 1a, 1b, . . . , individually. In the description below, an example when the procedure is executed by the managed PC 1 will be described.

When the main procedure is started, the managed PC 1 creates a list of local ports to which printers are connected (S6101). In this step, all the local ports corresponding to all the printers (the printer 3, in the example shown in FIG. 1) connected to the managed PC 1 are listed.

In S6103, one of the listed local ports is selected, and a procedure thread for the selected local port is created (S6105). It should be noted that steps S6103 and S6105 are repeated for all the local ports listed in S6101. That is, when the procedure thread has not been created for at least one of the listed local ports (S6107: NO), control returns to S6103, and another local port which has not been selected is selected, and the procedure thread for the local port is created (S6105). During the loop of steps S6103 through S6107, the procedure threads, the number of which is the same as the number of the listed local ports, to be executed in parallel are created. In the example shown in FIG. 1, only one printer 3 is connected to the managed PC 1, and only one procedure thread is created in S6105.

In the procedure thread, the printer information (e.g., information regarding life of exchangeable parts such as the exchange term of a drum, information regarding consumable parts such as the remaining amount of toner or ink, the remaining amount of the recording sheet, information regarding errors such as the number of occurrences of paper jam, and information of various items to be managed/updated at the printer side) is obtained from the printer corresponding to the procedure thread, and the obtained information is stored in a result recording file 133 which is a DB (data base) record stored in the auxiliary storage unit 14.

When the procedure threads for all the listed local ports have been created (S6107: YES), respectively, process reads a set time point from the setting file 134 and calculates a remaining time period to the set time (S6109). In S6111, process sets the calculated time period to the timer. It should be noted that the setting file 134 is a file stored in the auxiliary storage unit 14, and the set time is a time arbitrarily set by a system administrator. The timer causes a timer event when the set time period elapses.

In S6113, the managed PC 1 waits for occurrence of a related event (S6113). When the occurred event is a printer addition event (S6115: YES), process adds a new local port to the list (S6117), and creates a procedure thread corresponding to the added local port (S6119). The printer addition event occurs when powered-on of a printer and/or insertion of a printer cable is detected using, for example, a well-known plug-and-play function. When the printer addition event occurs, it is recognized that a new printer is added and the local port to which the added printer is connected is recognized. Accordingly, in such a case, in S6119, the procedure thread corresponding to the newly added local port is created, which is the similar procedure as is done in S6105. When S6119 is executed, process returns to S6113.

When the occurred event is not the printer addition event (S6115: NO), it is determined whether the event is the timer event (S6121). When the occurred event is the timer event (S6121: YES), a second reading/DB registering procedure is executed (S6123). The timer event in S6121 is occurred when the time period set in S6111 has elapsed.

In the second reading/DB registering procedure in S6123, the status information of all the printers connected to the managed PC 1 is obtained and registered with the DB (data base). After the second reading/DB registering procedure is executed (S6123), a 24-hour time period is set to the timer (S6125), thereby the timer event will occur after 24 hours later. When the timer is re-set in S6125, control returns to S6113.

When the occurred event is not the timer event (S6121: NO), process proceeds to S6127. When the occurred event is a termination command event (S6127: YES), the procedure shown in FIG. 22 is terminated. It should be noted that the termination command event occurs when a user performs a predetermined terminating operation using the input unit 12. When the occurred event is not the termination command event (S6127: NO), control returns to S6113, and waits for occurrence of a further event.

As understood from the above, when the managed PC 1 operates, unless the user performs the predetermined terminating operation, the procedure shown in FIG. 22 will not be terminated and is kept executed as a residual process on the managed PC 1.

Next, the procedure thread which is created in S6105 or S6119 will be described with reference to FIG. 23. The number of the thread procedures is, as described above, equal to the number of the local ports through which the printers are connected to the managed PC 1. It should be noted that one thread procedure is performed for each local port.

When thread procedure is started, as shown in FIG. 23, the managed PC 1 waits for the occurrence of the printer-related event (S6201). When an event occurs, and it is a print end event (S6203: YES), process lists up the print jobs which are printed by the printer corresponding to the current thread procedure (S6205). Specifically, the printer information obtaining module 124 obtains the information related the print jobs included in the queue 131 from the print spooler 123 (see FIG. 2) provided by the OS, when step S6205 is being performed. In S6207, process counts the number of jobs by referring to the listed print jobs. In S6209, process determines whether the number of the jobs is equal to or less than a set value N.

In this embodiment, the set value N is equal to zero, and thus, in S6209, it is determined whether the number of the jobs is zero or not. Whether the number of the jobs is zero may be determined by checking whether the number of the print jobs listed up in S6205 is zero. It should be noted that, in the present embodiment, the print job information listed up in step S6205 includes an item of a job status. In one print job, when the output data has been transmitted, the job status is set to "transmission finished", and then, at a predetermined timing managed by the OS, the print job itself is deleted. Therefore, even when only one print job exists in step S6205, if the job status of the print job information is set to "transmission finished", it is regarded that no jobs exist.

Thus, in S6209, when the number of the listed print job is zero, or when the number of the listed print job is one and the job status thereof is "transmission finished", the number of the print job is determined to be zero.

When the number N of the print jobs is equal to or less than N(S6209: YES), a type determining/DB registering procedure is executed (S6211). The type determining/DB registering procedure is illustrated in a flowchart shown in FIG. 24.

When the type determining/DB registering procedure is started, the managed PC 1 obtains the IEEE1284 ID from the target printer (S6231). In S6231, when the target printer supports the device ID, the managed PC 1 can obtain the IEEE1284 ID. If the target printer is not compliant with the IEEE1284 standard, or is compliant with the IEEE1284 standard but does not support the device ID, the managed PC 1 cannot obtain the IEEE1284 ID.

Thus, in S6233, the managed PC 1 determines whether the IEEE1284 ID is successfully obtained. When the IEEE1284 ID is successfully obtained (S6233: YES), process determines whether the printer from which the IEEE1284 ID is obtained is the target printer (S6235). The managed PC 1 is provided with a list in which the IEEE1284 IDs of all the printers which could be the target printer. In S6235, the managed PC 1 determines whether the obtained IEEE1284 ID is included in the list, and when included, the managed PC 1 determines that the printer is the target printer, while if the obtained ID is not included in the list, the managed PC 1 determines the printer is a non-target printer.

When the managed PC 1 determines that the printer is the target printer (S6235: YES), process proceeds to S6237 to execute a first reading/DB registering procedure according to the sixth embodiment.

FIG. 25 shows the first reading/DB registering procedure according to the sixth embodiment. It should be noted that the first reading/DB registering procedure shown in FIG. 25 is different from the procedure shown in FIG. 5.

When the first reading/DB registering procedure is started, the managed PC 1 opens the target printer (S6301). When the target printer is opened, a UEL (Universal Exit Language) command is transmitted to the target printer 3 via the print spooler 123. With this operation, the target printer 3 is set to process the PJL command. Then, the managed PC 1 executes a command readout procedure for reading commands out of the command file 132 (S6305).

FIG. 26 is a flowchart illustrating the command readout procedure which is executed at S6305 of the first reading/DB registering procedure shown in FIG. 25.

When the command readout procedure is started, the managed PC 1 select a next line of a table (S6331). The table subject to readout in S6331 is a table included in the command file 132. An example of the table is indicated in FIG. 27. As shown in FIG. 27, each line of the table includes a device type, command, key and label.

The device type indicates types of the device which is capable of replying to a PJL command that is generated using character strings stored in the command cell and the key cell on the same line. Specifically, the device type is represented by a combination of symbols "*", "¥", "-" and character string representing the device type. The asterisk "*" represents all the device types, "¥" is used as a delimiter which is placed to delimit different character strings representing different devices. The symbol "-" represents that the types represented by the character strings following the symbol "-" are excluded from the types represented by the character strings before the symbol "-".

For example, on the first line (excluding the title line), character strings "Device1¥Device2" represents that a type "Device1" and another type "Device2" are the types of devices to which the first line corresponds. "*-Device1¥Device2" on the second line represents that the second line corresponds to all the types except "Device1" and "Device2". On the third and fourth lines, "*" is indicated, which represents that the third and fourth lines correspond to all the types.

The command cell and key cell store character strings for generating a PJL command. The PJL command has a form of "@PJL <character string of command cell> <character string of key cell>". In the example shown in FIG. 27, from the first line, a PJL command "@PJL INFO PAGES" is generated.

The label cell stores a character string which represents the printer information by transmitting the PJL command generated by the character strings in the command cell and key cell on the same line. The character string stored in the label cell is used in S6353-S6355, which will be described later.

It should be noted that the table as shown in FIG. 27 is typically stores as a file having a generally usable structure, such as a CSV (Comma Separated Values) file. However, any type of file can be used (i.e., the physical and/or logical structure of the file is not limited) if the substantially the same data can be read/written.

In step S6331, when none of the line has been read, the first line is selected as the next line. When the n-th line has been selected, the (n+1)-th line is selected. Further, if the last line has been selected, there is no "next line", and in such a case, process determines that all the line have been selected (S6333: YES).

When all the lines have not yet been selected (S6333: NO), process reads out the type (s) from the type cell of the selected line (S6335). Then, process analyzes the obtained character strings, and determines whether the type of the device represented by the IEEE1284 ID is included in the type (s) obtained from the table (S6337).

For example, when the first line of the table shown in FIG. 27 is selected, in S6335, the character string "Device1¥Device2" is read out. Therefore, when the previously obtained device type represented by the IEEE1284 ID is "Device1" or "Device2", process determines that the device type represented by the IEEE1284 ID is included in the table (S6337: YES).

When the IEEE1284 ID is included in the table (S6337: YES), process reads a command (i.e., the character string in the command cell) and data (i.e., the character string in the data cell) of the selected line (S6339), and generates a character string to be transmitted (S6341). For example, when the first line of the table shown in FIG. 27 is selected, process read "INFO" and "PAGES" in S6339, and generates a character string (i.e., a PJL command) "@PJL INFO PSGES" in S6341.

When the IEEE1284 ID is not included in the table (S6337: NO), process returns to S6331, and the steps S6331-S6337 are repeated. While the repetition of steps S6331-S6337, when IEEE1284 ID is included in the table (S6337: YES), then steps S6339 and S6341 described above are executed.

After steps S6339 and S6341 are executed, or when process determines, after repeating steps S6331-S6337, all the lines have been processed (S6333: YES), the procedure shown in FIG. 26 is terminated.

When steps S6331-S6341 have been finished, S6303 shown in FIG. 25 has been finished. Next, the managed PC 1 determines whether all the commands have been finished (S6305). The managed PC 1 determines that all the command have been finished only when process has determined that all the lines have been processed (S6333: YES) in FIG. 26. Otherwise, the character string to be transmitted (i.e., the PJL command) has been generated in S6339 and S6341.

When all the commands have not been finished (S6305: NO), the generated transmission character string (i.e., the PJL command) is transmitted to the printer (S6307). The printer information obtaining module 124 transmits the data, which is transmitted to the printer in S6307, to the print spooler 123 so that the data is included in the queue 131 as one print job. Then, the data is processed similarly to the other print jobs. That is, the data (including the PJL command) is transferred from the print spooler 123 to the print I/F function module 121 (FIG. 2), and then transmitted to the printer.

In S6309, process checks whether the transmission is executed successfully. When the transmission was succeeded (S6309: YES), the managed PC 1 receives information (i.e., the printer information) transmitted from the target printer (S6311).

Specifically, the operation of receiving the print information (S6311) an operation to read back the printer information returned from the target printer, a concrete method of the readback depends on the target printer.

For example, when the target printer is connected to the managed PC 1 with a parallel I/F, the printer information obtaining module 124 examines presence/absence of the information returned to the managed PC 1 through the printer I/F function module 121 provided by the OS. When the information is available, the managed PC 1 (the printer information obtaining module 124) receives the information.

When the target printer is connected through the USB I/F, the printer information obtaining module 124 first receives information through the printer I/F function module 121, and when the amount of information is zero, the printer information obtaining module 124 repeats reception of the information.

In either case, after the printer information has been received, process determines whether the reception of the information was successful (S6313). When the information was received successfully (S6313: YES), some data has been received, and thus, process determines whether the received data is valid data (S6315). When the data is invalid (S6315: NO), S6311 and the following steps are repeated. When the data is valid (S6315: YES), the DB (result recording file) writing procedure is executed (S6317), which will be described below.

FIG. 28 is a flowchart illustrating the DB (result recording file) writing procedure according to the sixth embodiment.

In this procedure, the managed PC 1 analyzed the received readback data, and divides the data to key and value (S6351). For example, when the managed PC 1 generates, as a PJL command, a character string "@PJL INFO PAGECOUNT" based on the second line of the table shown in FIG. 27, and transmits the same to the printer, the managed PC 1 receives a character string, for example, "@PJL INFO PAGECOUTN<CR>PAGECOUTN=2098<CR><FF>" as the readback data.

The first half portion ("@PJL INFO PAGECOUNT") is the same as the PJL command as transmitted, and "<CR>" is a carriage return code. A character string "PAGECOUTN=" is a string generated in correspondence with the PJL command, "2098" is a value managed in the printer (the number of printed pages, in this example), "<CR>" is a carriage return code and "<FF>" is a form feed code. In S6351, process analyzes the received character string, and extracts the key "PAGECOUNT" and a value "2098" therefrom.

Next, the managed PC 1 retrieves a label corresponding to the key obtained in S6351 from the command file 132 (S6353). As aforementioned, the command file 132 stores the table having a structure similar to the table shown in FIG. 27, and process retrieves a character string from a label cell of such a table.

The managed PC 1 next generates comma separated character strings in the form of "type, port, label, value<CR>" (S6355). The character string for the 'type' is a character string corresponding to the IEEE1284 ID obtained in S6231 (e.g., "Device1"). The character string for the 'port' is a character string representing the local port subject to be processed by the present procedure (note: the present procedure is called in a procedure thread which is generated for each local port, and thus the procedure is directed to one local port) (e.g., "LPT1"). The character string for the 'label' is a character string retrieved in S6353 (e.g., "PAGES"), and the character string representing 'value' is the character string retrieved in S6351 (e.g., "2098"). The above character strings are separated by commas, and the carriage return code <CR> is added at the end of the comma separated character strings in S6355.

In S6357, the comma separated character strings generated in S6355 are written in the DB (result recording file 133), and the procedure shown in FIG. 28 is terminated.

Completion of the procedure shown in FIG. 28 is completion of step S6317 of FIG. 25. As described above, when S6317 is finished, the reply information which corresponds to the request transmitted to the target printer in S6307 has been recorded in the DB (result recording file 133) stored in the auxiliary storage unit 14.

Steps S6303-S6317 are repeated until all the commands are processed unless an error occurs during the execution thereof. During the execution of the steps, a plurality of commands recorded in the command file 132 are retrieved in S6303 one by one. When all of the plurality of commands are processed (i.e., transmitted to the printer), process determines that all the commands have been processed (S6305: YES). As a result, reply information corresponding to all the commands transmitted to the target printer have been stores in the DB (result recording file 133) stored in the auxiliary storage unit 14.

An error may occur during the operation of S6303-S6317. That is, in S6309, process may determine that the transmission is failed (S6309: NO). In this case, the managed PC 1 obtains the status of the printer (S6321), writes the status of the printer in the DB (result recording file 133) (S6323), and closes the target printer (S6319). In S6323, process generates a comma separated character string in the form of "type, port, cause of error, <CR>", and stores the character string in the DB (result recording file 133). In this character string, character strings for 'type' and 'port' are the same as one referred to in S6355. A character string for 'cause of error' corresponds to the status of the target printer obtained in S6321. For example, when the PJL command was not accepted due to the paper empty, the status indicating the paper empty is obtained in S6321. Then, process generates a character string "PE Error", which is written in the DB (result recording file 133). It should be noted that the 'cause of error' depends on the status obtained in S6321, and therefore, the character string for the 'cause of error' depends on the obtained status.

In another case, in S6313, process may determine that reception is failed (S6313: NO). In this case, the managed PC 1 writes error information indicating occurrence of an error in the DB (result recording file 133) (S6325). In S6325, process generates a comma separated character string in the form of "type, port, cause of error, <CR>", and stores the character string in the DB (result recording file 133). In this character string, character strings for 'type' and 'port' are the same as one referred to in S6355 or S6323. A character string for 'cause of error' should represent that there was no response from the printer, and a string "NoResponse" is used, for example. , corresponds to the status of the target printer obtained in S6321. Thereafter, the target printer is closed (S6319). It should be noted that, when the target printer is closed (before it is closed), a UEL is transmitted to the printer to release the PJL command mode.

As above, when steps S6301-S6319 are completed, S6237 of FIG. 24 is finished.

It should be noted that an error may occur in S6233 or S6235, which will be described below.

In S6233, process may fail to obtain the IEEE1284 ID (S6233: NO). In such a case, process returns to S6231 ten times at most (S6241: NO), and retries to obtain the IEEE1284 ID. After ten times of retries, if process fails to obtain the IEEE1284 ID (S6241: YES), the managed PC 1 displays a message requesting the user to check a power source and cables on the display unit 13 (S6243).

At this stage (S6243), the use is allowed to input one of instructions of "OK" and "Cancel" through the input unit 12. When the user checks the power source of the printer and/or the connection of the cable, and the error would not occur, the user may input the instruction of "OK". If the user intends to cancel the procedure, then the user may input the instruction of "Cancel" through the input unit 12.

When the user input the instruction of "OK" (S6245: YES), process returns to S6231, and the procedure is executed from the beginning. When the user input the instruction of "Cancel" (S6245: NO), the managed PC 1 writes information indicating that the printer is not ready in the DB (result recording file 133) in S6247, and terminates the procedure (Error Termination).

Specifically, in step S6247, process generates comma separated character strings in the form of ", port, cause of error, <CR>", which is written in the result recording file 133. In this character strings, a string corresponding to the 'port' is similar to that referred to in S6355, S6323 or S6325. A string corresponding to 'cause of error' should indicate that the IEEE1284 ID has not been obtained". For this purpose, for example, a character string "IEEE1284 ID error" is used. Contrary to the operations in S6355, S6323 and S6325, since the appropriate IEEE1284 ID has not been obtained, the type of device is unknown and cannot be included in the comma separated character strings. Therefore, in S6247, a blank is inserted as the character string for ' type'.

When the printer is not the target printer (S6235: NO), the managed PC 1 displays a message requiring the user to check the type of the printer (S6249).

At this stage, the user can select the instructions of "OK" and "Cancel" using the input unit 12. When the user checks the type of the printer, and intends to continue the procedure, the user can input the instruction of "OK", while the user intends to cancel the procedure, the user can input the instruction of "Cancel".

Process then proceeds to S6245, and as described above, when the user input the instruction of "OK" (S6245: YES), process returns to S6231, and the procedure is executed from the beginning. When the user input the instruction of "Cancel" (S6245: NO), the managed PC 1 writes information indicating that the printer is not ready in the DB (result recording file 133) in S6247, and terminates the procedure (Error Termination).

It should be noted that, in the sixth embodiment, process proceeds to the same step (i.e., S6245) after steps S6249 and S6243. The invention need not be limited to this configuration, and it may be possible that different procedures may be executed depending on whether S6245 has been executed or S6243 has been executed. In such a case, different error information may be recorded in the DB (result recording file 133). Alternatively, even if process proceeds to S6245 from S6249 and S6243, the cause of the error may be detected in S6247, before recoding the information in the DB (result recording file 133), and the result may be recorded in the DB (result recording file 133).

After S6231-S6247 have been finished (i.e., S6211 of FIG. 24), process proceeds to S6213. When S6211 has been normally finished (S6213: YES), process returns to S6210, while when S6211 has been finished erroneously (i.e., error termination) (S6213: NO), the present procedure is terminated.

When the number of print jobs counted in S6207 exceeds the set value N (S6209: NO), process returns to S6201. Further, when process determines that the printer related event is not the print end event (S6203: NO), process returns to S6201.

Therefore, in the thread procedure described above, when there exists a local port to which a printer is connected, a procedure thread corresponding to the local port is created and then executed. Then, every time when the print end event is generated, the thread procedure detects the number of print jobs, and when the number of the print jobs is equal to or less than the set value N, the print information is obtained from the target printer, and stored the thus obtained printer information in the DB (result recording file 133) provided in the auxiliary storage unit 14.

Further, error information is also stored in accordance with a record format compatible to the printer information (in the sixth embodiment, the CSV format having four items). The error information is also stored in the DB (result recording file 133). As a result of the above operation, a group of data as shown in FIG. 29 is stored in the DB (result recording file 133).

As above, by detecting the number of print jobs every time when the print completion event occurs, a timing when the number of print jobs is equal to or less than the set value N can be hardly missed in comparison with a case where the number of print jobs is detected regardless of the occurrence of the print completion event. As a result, a chance to obtain the printer information from the target printer is increased. Further, according to the present embodiment, since the set value N is equal to zero, the printer information is obtained from the target printer in S6211 only when the number of the print jobs is zero. Therefore, according to the embodiment, it will not be necessary to take time to obtain the printer information from the target printer because a print job, which would take time to be completed, has been included in the queue previously.

Incidentally, the information is stored, in the thread procedure, in the DB (result recording file 133) only when the number of print job is equal to zero. Therefore, under circumstances where the print job is generated perpetually, the number of print jobs would not become zero theoretically, and thus, the information would not be stored in the DB (result recording file 133) by the thread procedure. However, in the system according to the first embodiment, in addition to the thread procedure described above, step S6109-S6111 and S6121-S6125 are performed. That is, when it becomes the previously set time, the information is stored in the DB (result recording file 133) forcibly.

Specifically, in S6109 and S6111, when it becomes the set time, the timer event occurs. When the timer event occurs, S6123 is executed (i.e., the second reading/DB registering procedure is executed). The second reading/DB registering procedure is illustrated in FIG. 30.

FIG. 30 is a flowchart illustrating the second reading/DB registering procedure executed by the managed PC 1.

In S6401, the managed PC 1 extracts a local port from the list. Then, the managed PC 1 counts the number of print jobs which are to be output through the extracted (target) local port (S6403). Firstly, the managed PC 1 determines whether the number of print jobs is zero (S6405). It should be noted that steps S6403 and S6405 may be executed in away similar to steps S6207 and S6209.

When the number of print jobs is not zero (S6405: NO), process executes the type determining/DB registering procedure (S6407) and proceeds to S6409. When the number of print jobs is zero (S6405: YES), process proceeds to S6407, and the type determining/DB registering procedure is not executed.

The type determining/DB registering procedure in S6407 is similar to the procedure in S6211, and detailed description there of is omitted. However, it is noted that, similar to S6211, the print information is obtained from the target printer, and the printer information is stored in the DB (result recording file 133) in the auxiliary storage unit 14.

As described above, even if the number of print jobs is not zero, the type determining/DB registering procedure is executed. With this configuration, even in a condition where the number of print jobs does not become zero, it is ensured that the printer information is stored in the DB (result recording file 133). It should also be noted that the reason why the type determining/DB registering procedure is not executed when the number of print job is zero is that the print information must have been recorded in the thread procedure when the number of print jobs is determined to be zero, and the condition of the target printer has not been changed thereafter.

The type determining/DB registering procedure is executed when there are print jobs in the queue 131. Therefore, when a PJL command is issued, a print job corresponding to the PJL command is added at the end of the queue 131. Accordingly, the readback data corresponding to the PJL command will not be returned until all the print jobs previously accumulated in the queue 131 are finished.

When process proceeds to S6409, when the procedures for all the printers in the list have not been finished (S409: NO), process returns to S6401. Thus, S6401-S6409 are repeated by the number of times which is equal to the number of the local ports through which printers are connected to the managed PC 1. Thereafter, when the procedures for all the local ports are finished (S6409: YES), and the procedure shown in FIG. 30 is finished.

As above, in the managed PC 1, when the print completion event occurs, if the number of print jobs is equal to or less than the set value N (which is zero in the embodiment), step S6211 is executed and the print information is obtained from the target printer immediately, while step S6407 is executed at the set time even though the number of print jobs is more than the set value N (which is zero in the embodiment), and it is ensured that the printer information is obtained from the target printer.

Next a procedure executed in the managing PC 2 will be described.

The main procedure executed by the managing PC 2 is similar to that of the first embodiment shown in FIG. 7, and description thereof is omitted.

In S601 (see FIG. 7), the managing PC 2 executes a data processing. The data processing in S601 is for a procedure to use the printer information which the managed PC 1 obtains from the printer 3 and stored in the DB.

FIG. 31 is a flowchart illustrating the data processing procedure executed by the managing PC 2 according to the sixth embodiment.

In S6701, the managing PC 2 extracts a managed PC. That is, the managing PC 2 extracts one of a plurality of managed PCs 1, 1*a*, 1*b*, . . . as a target PC. In the following description, it is assumed that the managed PC 1 is selected as the target managed PC.

In S6703, the managing PC 2 reads a file from the managed PC 1 through the network. The file the managing PC 2 reads is the DB (result recording file 133) in which the printer information has been stored in S6313 by the managed PC 1. It should be noted that a readable property is given by the managed PC 1 to the file (result recording file 133) such that the result recording file 133 can be read by another PC through the network. That is, the result recording file 133 is configured such that the managed PC 1 can provide the printer information to the managing PC 2 upon request by the managing PC 2.

In S6705, a predetermined data processing is applied to the printer information. In S6705, the printer information included in the read file is converted to have a format appropriate for management by the managing PC 2, or a format appropriate for display or print at the managing PC 2.

Specifically, in S6705, information to be managed at the managing PC 2 (e.g., log information including the start time of the procedure of FIG. 7, a file access time, and the like) is added to the printer information. Further, some binary data, bit ON/OFF information and information represented by numeral codes may be converted into visible representations such as symbols, images and messages, which will be used in a output/display procedure (S6709).

In S6707, process determines whether the above procedure has been done for all the managed PCs. When there are PCs (e.g., PC 1*a*, 1*b*, . . . ) of which the printer information has not been processed (S6707: NO), process returns to S6701, and the same procedure is executed for such PCs.

When the printer information of all the managed PCs has been processed (S6707: YES), process proceeds to S6709. In S6709, necessary information is output/displayed. Specifically, the information processed in S6705 is stored as a result recording file in the managing PC 2. Then, referring to the result recoding file, the managing PC 2 executes the output/display procedure (S6709).

FIG. 32 is a flowchart illustrating the output/display procedure executed by the managing PC 2 according to the sixth embodiment.

In S6721, the managing PC 2 executes analysis/format of the result recording file. Specifically, for example, the managing PC 2 adds character strings which are used as indexes to a LOG file. The managing PC 2 further adds carriage return codes to the LOG file at appropriate positions so that lines of printed/displayed information are folded at appropriate positions.

Further, as a format for display of various pieces of information, formatting similar to that applied to the LOG data may be performed. Further, analysis of text data to convert the data into an HTML (Hyper Text Markup Language) data (analysis to determine portions to which tags are inserted), and converting the data to the HTML data may also be executed.

In S6723, the managing PC 2 displays the data which has been processed/formatted in S6721, and outputs the LOG data, which is stored as the LOG file (S6725). FIG. 33 shows an example of the contents of the LOG file, in which text data as shown is contained.

In the example of the LOG text shown in FIG. 33, indicated are the name of the managed PC 1 (in FIG. 33, "PC 1" and "PC 2"), the types of the printers (in FIG. 30, "Device1" and "Device2"), the names of the local ports (in FIG. 33, "LPT1" and "USB001"), and the printer information of respective printers (in FIG. 33, "Pages=2098", "Drum Life=4039", . . . etc.).

It should be noted that, in the exemplary log data shown in FIG. 33, firstly a name of the managed PC is indicated, and then, for all the printers connected to the indicated managed PC, a description in the form of "type of the printer on the local port" is added. Then, the printer information obtained from the printer is indicated. According to this format, even if a plurality of the printers of the same type are included in the information management system, the user can recognize which printers are connected to a certain managed PC, and which local ports are connected to which printers for the LOG text.

That is, the LOG data includes information of the names of the managed PCs, types of the printers connected to the respective managed PCs, the local ports used for connecting the printers to the managed PCs, and relationship therebetween. Therefore, even if the information management system include a plurality of printers of the same type and the same local port names, the user can recognize the correspondences between the printer information and the printers easily.

In the displayed information and log output described above, basically all the printer information obtained from the printer is displayed/output. It should be noted that, the printer information may include information related to maintenance of the printer (e.g., a term for exchanging the drum, toner cartridge and cleaning, etc.). In the following description, notification of such information (hereinafter, occasionally referred to as maintenance information) using an e-mail message will be described.

Specifically, after execution of S6725, the managing PC 2 selects one piece of printer information which has not been examined from among all the printer information obtained from all the managed PCs, and examines the same to determined whether a maintenance operation should be done in accordance with predetermined criteria (S6727). For example, the selected printer information indicates that "Pages=2098", then, the managing PC 2 examines whether the number of pages "2098" is greater than a predetermined threshold value, and determines that the maintenance is required if the number is greater than the predetermined threshold value, while determines that the maintenance is unnecessary when the number of the pages is equal to or less than the predetermined value.

When process determines that the maintenance is necessary (S6729: YES), process searches an address data file which has been prepared beforehand using the name of the managed PC from which the evaluated printer information was obtained as a key, and obtains an e-mail address (which is an e-mail address of the administrator of the managed PC) in S6731.

Next, process searches a warning message file which has been prepared in advance using the label (e.g., "Pages") of the printer information of the examined printer as a key, and obtains a warning message form (a template for a warning message) corresponding to the label used as the key (S6733).

An example of the warning message file is shown in FIG. 34. In this example, the warning message file contains a plurality of records, each of which includes the label name and warning form. When the label of the examined printer information is known, the corresponding warning form can be retrieved from the warning message file.

When the warning message form is retrieved, the managing PC 2 replaces the symbols "% s" in the warning form with the port name and type name to generate a warning message to be sent (S6735).

Each of the warning forms includes a character string as shown in FIG. 34. For example, the first line of the warning form reads "Exchange the drum of % s connected to % s, and exchange the toner". The symbol "% s" is included at two portions in the character string, which should be replaced with the "type" and "local port name" of the examined printer information. For example, when the type and the local port name are "Device1" and "LPT1", respectively, the resultant warning message read "Exchange the drum of Device1 connected to LPT1, and exchange the toner."

In S6737, an e-mail message having a body composed of the warning message created in S6375 is transmitted to an e-mail address that was obtained in S6731. With this configuration, the status of the printers can be centrally managed, and when an error occurs, it is notified to the administrator immediately.

When steps S6731-S6737 are finished, or when process determines that no maintenance operation is necessary (S6729: NO), the printer information subject to the examination has been processed. Then, process determines whether there remains printer information among the printer information obtained form all the managed PCs (S6739). When there remains unprocessed printer information (S6739: NO), process returns to S6727. Accordingly, steps S6727-S6739 are repeated by the number which is the same as the pieces of printer information obtained from all the managed PCs. When all the printer information has been processed (S6739: YES), the procedure shown in FIG. 32 is terminated.

When steps S6729-S6739 have been finished, which means steps S6709 of FIG. 31 has been finished and thus S6701-S6709 have been finished, and accordingly, S601 of FIG. 7 has been finished, process proceeds to S603 of FIG. 7. The following operations are similar to those in the first embodiment, and description thereof will be omitted.

As described above, according to the sixth embodiment, the managed PC 1 obtains the IEEE1284 ID (i.e., information representing the device type) from the printer 3, identifies the type of the printer 3, and selects PJL commands appropriate for the identified device type from among a plurality of PJL commands for various device types. Thus, even if there are PJL commands which do not correspond to the target printer 3 among a plurality of PJL commands, only the PJL commands corresponding to the target printer 3 can be selected and transmitted to the printer 3. Accordingly, the managed PC can receive the reply form the printer 3 and obtains the printer information thereof.

That is, it is ensured that the reply including desired printer information will be received in response to the PJL commands as transmitted. Further, since invalid PJL command for the target printer will not be transmitted, unnecessary transmitting operations of the managed PC 1 can be avoided. Furthermore, since inappropriate PJL command will not be transmitted to the printer, the managed PC will not receive inappropriate reply from the printer, and thus unnecessary operation (e.g., reception of the inappropriate information from the printer) can be avoided.

According to the sixth embodiment, the managed PC 1 obtains the IEEE1284 ID form the printer 3, and identifies the type of the printer 3. Further, the managed PC 1 transmits the JPL command to the printer 3 to request for the printer information, and obtains the printer information by receiving the reply to the transmitted PJL command. Then, the managed PC 1 stores the type of the printer 3 which is determined in accordance with the IEEE1284 ID of the printer 3, the local port name connecting the printer 3, and the obtained printer information keeping the relationship thereamong. With such a configuration, when the user refer to the printer information, the user can also refer to the type of the printer 3 and the name of the local port that connects the managed PC and the printer 3 at the same time.

Therefore, even when a plurality of printers 3 are connected to a single managed PC 1 and two or more of the plurality of the printers 3 are of the same type, the user can identify one of the printers 3 based on the type of the printer 3 and the local port name.

It should be noted that the invention is not limited to the above configuration, and various modification could be made without departing the scope of the invention.

For example, in the sixth embodiment, printers compliant with the PJL commands are exemplified as devices connected to the computer and the device information thereof is retrieved and managed. The device need not be limited to single function printers. For example, MFP (multi-function peripheral) having facsimile, copier and image scanner functions as well as a printer function may be employed in the information management system according to the invention.

Further, the device need not be limited to the printer of one having the printer function, and the command need not be one compliant with the PJL command system. Furthermore, the command requesting the device information need not be transmitted to the device through the print spooler. That is, even if the target device is not compliant with the PJL command, if commands can be transmitted, via a human-computer I/F, to the device, and the device can transmit, in response to the command from the computer, device information which may managed and/or updated on the device side, the present invention is applicable. Examples of such a device may include an image scanner, a digital camera, a USB camera, storage devices of various types, and a label printer.

In the sixth embodiment, the information management system is configured such that the printer information obtained by the managed PC 1 is transmitted to the managing PC 2, and the printer information for all the printers, which information is obtained from all the managed PCs 1, 1a, 1b, . . . . The invention need not be limited to such a configuration, and each managed PC may be configured to employ the information management system and manage the printer information of the connected devices.

It should be noted that, in the above description, the first through sixth embodiments are explained individually. However, any appropriate combination of various features of the above-described embodiments should also be considered to be within the scope of the invention.

It should be noted that, in the foregoing description, the data management system is described to manage the information of the printers. However, the invention need not be limited to such a configuration. The printers are only examples, and the information of various devices, which can be connected to a computer, such as facsimile machines, copiers, MFPs implemented with the functions of the printer and copier, and any similar device can be optionally or alternatively managed.

The present disclosure relates to the subject matters contained in Japanese Patent Applications No. 2003-339672, filed on Sep. 30, 2003, No. 2003-399688, filed on Nov. 28, 2003, No. 2003-434236, filed on Dec. 26, 2003, and No. 2004-003244, filed on Jan. 8, 2004, which are expressly incorporated herein by reference in their entireties.

What is claimed is:

1. A device information management system including a plurality of computers and a plurality of devices connected to the computers, each of the plurality of devices comprising:
   a storage that stores device information intrinsic to the device; and
   an updating system that updates the device information in association with operation of the device, each of the plurality of computers comprising:
   a recognition system that obtains information representing a type of the device from the device, and recognizes the type of the device;
   a command selecting system that selects at least one command corresponding to the type of the device recognized by the recognition system from among a plurality of commands;
   an information requesting system that requests the device, by transmitting the selected command, to provide the device information;
   an information receiving system that receives the device information which is a response to the command transmitted by the information requesting system; and
   a command storing system that stores the plurality of commands in relation with responsive type information indicative of device types that can respond to respective commands, wherein the command selecting system selects commands which are related to the device type recognized by the recognition system from among the plurality of commands stored in the command storing system referring to the responsive type information stored in the command storing system, wherein the command storing system includes a file storing the responsive type information in relation with each command, and wherein the command selecting system includes:
   a command retrieving system that retrieves the commands and the responsive type information related to the commands from the command storing system;
   a determining system that determines whether the command retrieved by the command retrieving system is a command to which the recognized type of device can respond with reference to the responsive type information retrieved by the command retrieving system; and
   a selecting system that selects a command when the determining system determines that the device of the type recognized by the recognition system is capable of replying to the command, which is retrieved by the retrieving system.

2. The device information management system according to claim 1, wherein the command includes information designating the device information.

3. The device information management system according to claim 1, wherein the device information includes information regarding used amount of an exchangeable component of the device.

4. The device information management system according to claim 1, wherein the device information includes information regarding degree of consumption of a consumable component of the device.

5. The device information management system according to claim 1, wherein the device information includes information of occurrence of errors in the device.

6. A device information management system including a plurality of computers and a plurality of devices connected to the computers,
- each of the plurality of devices comprising:
  - a storage that stores device information intrinsic to the device; and
  - an updating system that updates the device information in association with operation of the device,
- each of the plurality of computers comprising:
  - a recognition system that obtains information representing a type of the device from the device, and recognizes the type of the device:
  - a command selecting system that selects at least one command corresponding to the type of the device recognized by the recognition system from among a plurality of commands;
  - an information requesting system that requests the device, by transmitting the selected command, to provide the device information;
  - an information receiving system that receives the device information which is a response to the command transmitted by the information requesting system; and
  - a command storing system that stores the plurality of commands in relation with irresponsive type information indicative of device types that cannot respond to respective commands,
  - wherein the command selecting system selects commands which are related to the device type recognized by the recognition system from among the plurality of commands stored in the command storing system referring to the irresponsive type information stored in the command storing system.

7. The device information management system according to claim 6,
- wherein the command storing system includes a file storing the irresponsive type information in relation with each command,
- wherein the command selecting system includes:
  - a command retrieving system that retrieves the commands and the irresponsive type information related to the commands from the command storing system;
  - a determining system that determines whether the command retrieved by the command retrieving system is a command to which the recognized type of device cannot respond with reference to the irresponsive type information retrieved by the command retrieving system; and
  - a selecting system that selects a command when the determining system does not determine that the device of the type recognized by the recognition system is incapable of replying to the command, which is retrieved by the retrieving system.

8. The device information management system according to claim 1, wherein each of the plurality of computers receives a request for the device information from a requestor, the information requesting system requesting the device to provide the device information response to reception of the request from the requestor, the device information received by the information receiving system being transmitted to the requestor.

9. A computer to which a device is connected, the device having a storage that stores device information intrinsic to the device and an updating system that updates the device information in association with operation of the device, the computer is for executing a procedure to obtain device information from the device, the computer comprising:
- a recognition system that obtains information representing a type of the device from the device, and recognizes the type of the device;
- a command selecting system that selects at least one command corresponding to the type of the device recognized by the recognition system from among a plurality of commands;
- an information requesting system that requests the device, by transmitting the selected command, to provide the device information;
- an information receiving system that receives the device information which is a response to the command transmitted by the information requesting system; and
- a command storing system that stores the plurality of commands in relation with responsive type information indicative of device types that can respond to respective commands,
- wherein the command selecting system selects commands which are related to the device type recognized by the recognition system from among the plurality of commands stored in the command storing system referring to the responsive type information stored in the command storing system,
- wherein the command storing system includes a file storing the responsive type information in relation with each command, and
- wherein the command selecting system includes:
  - a command retrieving system that retrieves the commands and the responsive type information related to the commands from the command storing system;
  - a determining system that determines whether the command retrieved by the command retrieving system is a command to which the recognized type of device can respond with reference to the responsive type information retrieved by the command retrieving system; and
  - a selecting system that selects a command when the determining system determines that the device of the type recognized by the recognition system is capable of replying to the command, which is retrieved by the retrieving system.

10. A non-transitory computer readable storage medium for a device information management system including a plurality of computers and a plurality of devices connected to the computers, each device including a storage that stores device information intrinsic to the device, and an updating system that updates the device information in association with operation of the device, the non-transitory computer readable storage medium comprising computer readable instructions which cause each computer to realize:
- a recognition system that obtains information representing a type of the device from the device, and recognizes the type of the device;

a command selecting system that selects at least one command corresponding to the type of the device recognized by the recognition system from among a plurality of commands;
an information requesting system that requests the device, by transmitting the selected command, to provide the device information;
an information receiving system that receives the device information which is a response to the command transmitted by the information requesting system; and
a command storing system that stores the plurality of commands in relation with responsive type information indicative of device types that can respond to respective commands,
wherein the command selecting system selects commands which are related to the device type recognized by the recognition system from among the plurality of commands stored in the command storing system referring to the responsive type information stored in the command storing system,
wherein the command storing system includes a file storing the responsive type information in relation with each command, and
wherein the command selecting system includes:
    a command retrieving system that retrieves the commands and the responsive type information related to the commands from the command storing system;
    a determining system that determines whether the command retrieved by the command retrieving system is a command to which the recognized type of device can respond with reference to the responsive type information retrieved by the command retrieving system; and
    a selecting system that selects a command when the determining system determines that the device of the type recognized by the recognition system is capable of replying to the command, which is retrieved by the retrieving system.

* * * * *